(12) United States Patent
Schuster et al.

(10) Patent No.: US 8,846,854 B2
(45) Date of Patent: Sep. 30, 2014

(54) SULFONATED POLY(ARYLENES), POLYMER COMPOUNDS AND METHODS OF PRODUCING THE SAME

(71) Applicant: Max-Planck-Gesellschaft zur Forderung der Wissenschaften e V., Munich (DE)

(72) Inventors: Michael Schuster, Friedrichsthal (DE); Klaus-Dieter Kreuer, Boblingen (DE); Henrik Thalbitzer Andersen, Copenhagen (DK); Joachim Maier, Wiernsheim (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 13/679,415

(22) Filed: Nov. 16, 2012

(65) Prior Publication Data

US 2013/0079469 A1   Mar. 28, 2013

Related U.S. Application Data

(62) Division of application No. 11/885,904, filed as application No. PCT/EP2006/002087 on Mar. 7, 2006, now Pat. No. 8,349,993.

(30) Foreign Application Priority Data

Mar. 7, 2005 (DE) .......................... 10 2005 010 411

(51) Int. Cl.
| | |
|---|---|
| *C08G 75/00* | (2006.01) |
| *C08L 81/06* | (2006.01) |
| *C08J 5/22* | (2006.01) |
| *C08G 75/20* | (2006.01) |

(52) U.S. Cl.
CPC ............... *C08G 75/20* (2013.01); *C08L 81/06* (2013.01); *C08J 5/2256* (2013.01); *C08J 2381/06* (2013.01)
USPC ........... 528/373; 528/374; 528/391; 528/171; 521/27

(58) Field of Classification Search
USPC ...................... 528/373, 374, 391, 171; 521/27
See application file for complete search history.

(56) References Cited

U.S. PATENT DOCUMENTS

4,380,598 A * 4/1983 Robeson et al. ............... 524/163
4,942,091 A   7/1990 Umezawa et al.
(Continued)

FOREIGN PATENT DOCUMENTS

| DE | 1 938 806 A1 | 2/1970 |
|---|---|---|
| DE | 195 27 435 A1 | 1/1997 |

(Continued)

OTHER PUBLICATIONS

Kreuer, K-D., "Hydrocarbon Membranes," *Handbook of Fuel Cells—Fundamentals, Technology and Applications*, © John Wiley & Sons, Ltd, Chichester, 2003, vol. 3, Part 3, pp. 420-435.

(Continued)

*Primary Examiner* — Shane Fang
(74) *Attorney, Agent, or Firm* — DLA Piper LLP (US)

(57) ABSTRACT

A copolymer containing, in addition to recurring elements of a sulfonated poly(arylene) containing exclusively recurring structural element(s) of the general formulas —[—Ar$_1$(SO$_3$M)$_n$-X—]— and —[—Ar$_2$(SO$_3$M)$_n$-Y—]—, wherein X and Y, which are identical or different from each other, each represent an electron-acceptor group, Ar$_1$ and Ar$_2$, which are either identical or different from each other, represent an aromatic or heteroaromatic ring system with 5-18 ring atoms; wherein the aromatic or heteroaromatic ring system, in addition to the SO$_3$M and the substituents X and Y, optionally comprises additional substituents which are not electron-donor groups; M represents monovalent cation and n is an integral number between 1 and 4; and wherein X, Y, Ar$_1$, Ar$_2$, M and n can be identical or different in various structural elements, independently of each other, one or several additional elements of at least one additional monomer or macromonomer.

6 Claims, 23 Drawing Sheets

(56) References Cited

U.S. PATENT DOCUMENTS

| | | |
|---|---|---|
| 5,496,916 A | 3/1996 | Fleischer et al. |
| 5,496,917 A | 3/1996 | Fleischer et al. |
| 5,525,436 A | 6/1996 | Savinell et al. |
| 6,013,761 A | 1/2000 | Zierer et al. |
| 6,020,442 A | 2/2000 | Fleischer et al. |
| 6,096,856 A | 8/2000 | Helmer-Metzmann et al. |
| 2002/0015875 A1 | 2/2002 | Kim |
| 2004/0146768 A1* | 7/2004 | Nishihata et al. ............... 429/34 |
| 2004/0186262 A1 | 9/2004 | Maier et al. |

FOREIGN PATENT DOCUMENTS

| | | |
|---|---|---|
| DE | 102 58 175 A1 | 7/2004 |
| EP | 1 479 714 A1 | 11/2004 |
| JP | 63-152499 A | 6/1988 |
| JP | 63-254132 | 10/1988 |
| JP | 10106891 A | 4/1998 |
| JP | 2000-080166 | 3/2000 |
| JP | 2004/002794 A | 1/2004 |

OTHER PUBLICATIONS

Li, Q. et al., "Approaches and Recent Development of Polymer Electrolyte Membranes for Fuel Cells Operating above 100° C.," *Chem. Mater.*, © 2003 American Chemical Society, vol. 15, pp. 4896-4915.

Hickner, M.A. et al., "Alternative Polymer Systems for Proton Exchange Membranes (PEMs)," *Chem. Rev.*, © 2004 American Chemical Society, vol. 104, pp. 4587-4612.

Kreuer. K-D. et al., "Transport in Proton Conductors for Fuel-Cell Applications: Simulations, Elementary Reactions, and Phenomenology," *Chem. Rev.*, © American Chemical Society, vol. 104, pp. 4637-4678.

Wang, F. et al., "Direct Polymerization of Sulfonated Poly(arylene Ether Sulfone) Random (Statistical) Copolymers: Candidates for New Proton Exchange Membranes," *Journal of Membrane Science*, © 2002 Elsevier Science B.V., vol. 197, pp. 231-242.

Dang, T.D. et al., "Synthesis and Characterization of Highly Suflonated Polyarylenethioethersulfones for Fuel Cells Applications," *Polymer Preprints*, 2004, vol. 45, pp. 22-23.

Bai, Z. et al., "Properties and Proton Conductivties of Highly Sulfonated Polyarlenethioethersulfones for Fuel Cells," *Polymer Preprints*, 2004, vol. 45, pp. 60-61.

Wiles, K.B. et al., "Poly(aylene thioether sulfone) Copolymers for PEM-Based Fuel Cell Systems," *Polymer Preprints*, 2003, vol. 44, pp. 1089-1090.

Wang, F. et al., "Synthesis of Sulfonated Poly(phenylene sulfide sulfone)s via Direct Polymerization," *Polymer Preprints*, 2000, vol. 41, pp. 1401-1402.

Wiles, K.B. et al., "Synthesis and Characterization of Sulfonated Poly(arylene sulfide sulfone) Copolymers as Candidates for Proton Exchange Membranes," *Polymer Preprints*, 2002, vol. 43, pp. 993-994.

Wiles, K.B. et al., "Poly(arylene sulfide sulfone) Copolymer Composites for Proton Exchange Membrane Fuel Cell Systems: Extraction and Conductivity," *Polymer Preprints*, 2004, vol. 45, pp. 724-725.

Udea, M. et al., "Synthesis and Characterization of Aromatic Poly(ether sulfone)s Containing Pendant Sodium Sulfonate Groups," *Journal of Polymer Science: Part A: Polymer Chemistry*, © 1993 John Wiley & Sons, Inc., vol. 31, pp. 853-858.

Wang, F. et al., "Synthesis of Highly Sulfonated Poly(arylene ether sulfone) Random (Statistical) Copolymers via Direct Polymerization," *Macromol. Symp.*, © 2001 Wiley-VCH Verlag GmbH, D-69469 Weinheim, vol. 175, pp. 387-395.

Harrison, W.L. et al., "Influence of the Bisphenol Structure on the Direct Synthesis of Sulfonated Poly(arylene ether) Copolymers. I," *Journal of Polymer Science: Part A: Polymer Chemistry*, © 2003 Wiley Periodicals, Inc., vol. 41, pp. 2264-2276.

Wang, F. et al., "Synthesis of Poly(ether ether ketone) with High Content of Sodium Sulfonate Groups and its Membrane Characteristics," *Polymer*, 1999, © 1998 Elsevier Science Ltd., vol. 40, pp. 795-799.

Robello, D.R. et al., "Poly(p-phenylene sulfone)," *Macromolecules*, © 1993 American Chemical Society, vol. 26, pp. 6718-6721.

Colquhoun, H.M. et al., "Crystal and Molecular Structures of Poly(1,4-phenylenesulfone) and Its Trisulfone and Tetrasulfone Oligomers," *Macromolecules* © 2002 American Chemical Society, vol. 35, pp. 1685-1690.

Morley, J.O. et al., Molecular Modeling Studies on Aromatic Sulfonation. 1. Intermediates Formed in the Sulfonation of Tolune,: *J. Org. Chem.*, © 1997 American Chemical Society, vol. 62, pp. 7358-7363.

Bai, Z. et al., "Properties and Proton Conductivties of Highly Sulfonated Polyarylenethioethersulfones for Fuel Cells," *Polymer Preprints*, 2004, vol. 45, pp. 60-61.

Dang, T.D. et al., "Synthesis and Characterization of Highly Sulfonated Polyarylenethioethersulfones for Fuel Cells Applications," *Polymer Preprints*, 2004, vol. 45, pp. 22-23.

Wang, F. et al., "Sodium Sulfonate-Functionalized Poly(ether ether ketone)s," *Macromol. Chem. Phys.*, © 1998, Hüthig & Wepf Verlang, Zug, vol. 199, pp. 1421-1426.

Sass, O-E. et al. "Darstellung von Polyamidsulfonsäuren auf der Basis von Toluol und Schwefelsäure," *Die Angewandte Makromolekulare Chemie*, 1976, vol. 53, No. 801, pp. 93-100 (English translation of Summary on first page).

\* cited by examiner

SULFONATED POLY(ARYLENES), POLYMER COMPOUNDS AND METHODS OF PRODUCING THE SAME

RELATED APPLICATIONS

This divisional application is based upon and claims the benefit of priority from U.S. application Ser. No. 11/885,904 filed Sep. 7, 2007, which is a §371 of International Application No. PCT/EP2006/002087, with an international filing date of Mar. 7, 2006 (WO 2006/094767 A1, published Sep. 14, 2006), which is based on German Patent Application No. 10 2005 010 411.8, filed Mar. 7, 2005, the subject matter of which is incorporated herein by reference.

TECHNICAL FIELD

This disclosure relates to copolymers of sulfonated poly (arylenes), polymer compounds and methods of producing the same.

BACKGROUND

The uses of ion-conducting materials in electrochemical applications such as fuel cells, dialysis cells, electrolysis cells and electrochemical separation methods, are limited by their hydrolytic and thermo-oxidative stability zones, which are often within a range below 100° C. However, for a number of applications, such as in the case of the fuel cell, it is advantageous to achieve higher working temperatures (approx. 100-200° C.). On the one hand, this requires less cooling for the fuel cell; on the other hand, the electric performance of the cell increases with higher temperatures, due to accelerated electrode reactions and reduced electrode contamination (e.g. due to CO from a reformer).

Higher temperatures, particularly in a water- and oxygen-containing environment, require chemically, thermally, thermo-oxidatively and hydrolytically stable materials.

At the moment, essentially perfluorated sulfonated polymers (e.g. Nafion®) are used, for example, in the area of fuel cell technology; these generally have a high chemical, thermal and thermo-oxidative stability, but are expensive and time-consuming in their manufacture and disposal. A more cost-effective alternative to perfluorated polymers is presented by membrane materials based on sulfonated poly (arylenes), such as poly(arylene ether ketones), poly(arylene ether sulfones) and poly(arylene thioether sulfones), which are currently being tested for fuel cells. (General references on the state of the art of fuel cells and suitable membrane materials, as well as the synthesis of the above-mentioned and other poly(arylenes), are indicated in the literature overview on page 78-81 of the application text).

In terms of structure, poly(arylene ether ketones), poly (arylene ether sulfones) and poly(arylene thioether sulfones) share the characteristic that at least one electron-donor bridge group (such as ether —O— or thio —S—) is bound to the sulfonated aromatic ring. Since the hydrolytic stability of the sulfonic acid group at the aromatic ring is impaired by electron-donor substituents (such as ether —O— or thio —S—), these polymers tend towards decomposition reactions in the sulfonic acid group at higher temperatures. Furthermore, ether bridges in particular are not sufficiently resistant to oxidative attacks (such as peroxide radicals, Fenton's test).

Therefore, it could be helpful to provide new hydrolytically and thermo-oxidatively stable polymers that may be used advantageously, particularly for membrane and fuel cell technologies, and can be produced in a cost-effective manner, as well as providing methods for producing such polymers.

LITERATURE OVERVIEW

A general overview of the state of fuel cell technology is provided in Part 3 of the *Handbook of Fuel Cells—Fundamentals, Technology and Applications, Vol.* 3 (Eds. W. Vielstich, A. Lamm, H. A. Gasteiger), John WILEY & Sons, 2003. An overview of membrane materials for fuel cells can be found in the reviews by Q. Li, R. He, J. O. Jensen, N. J. Bjerrum *Chem. Mater.* 2003, 15, 4896 and M. A. Hickner, H. Ghassemi, Y. S. Kim, J. E. McGrath *Chem. Rev.* 2004, 104, 4587; a glimpse into the correlations between structure, morphology and transport processes in membranes for fuel cells is provided in the review by K. D. Kreuer, Paddison, E. Spohr, M. Schuster *Chem. Rev.* 2004, 104, 4637.

Polymers with the structural element —$SO_2$—Ar$(SO_3H)_n$—$SO_2$— (Ar=aromate, n=1-4) have not been not described according to CA (Chemical Abstracts). There is, however, a number of publications and patents on polymers with the structural element —$SO_2$—Ar$(SO_3H)$—O— (poly(arylene ether sulfones)), e.g. in F. Wang, M. Hickner, Y. S. Kim, T. A. Zawodzinski, J. E. McGrath *J. Membr. Sci.* 2002, 197, 231), wherein the aromate carrying the sulfonic acid group is surrounded by a sulfone group —$SO_2$—, as well as an ether group —O—. Instead of the ether group, analog polymers with a thioether group (sulfide group) —S— have also been described: poly(arylene thioether sulfones) or poly (arylene sulfide sulfones) with the structural element —$SO_2$—Ar$(SO_3H)$—S—, e.g. in T. D. Dang, Z. Bai, M. J. Dalton, E. Fossum *Polymer Preprints* 2004, 45, 22; Z. Bai, L. D. Williams, M. F. Durstock, T. D. Dang *Polymer Preprints* 2004, 45, 60; K. B. Wiles, V. A. Bhanu, F. Wang, M. A. Hickner, J. E. McGrath *Polymer Preprints* 2003, 44, 1089; F. Wang, J. Mecham, W. Harrison, J. E. McGrath *Polymer Preprints* 2000, 41, 1401; K. B. Wiles, V. A. Bhanu, F. Wang, J. E. McGrath *Polymer Preprints* 2002, 43, 993; K. B. Wiles, C. M. de Diego, J. E. McGrath *Polymer Preprints* 2004, 45, 724.

The synthesis of these polymers takes place by polycondensation of sulfonated dichlorodiphenylsulfone or difluorodiphenylsulfone with thiobisbenzenethiol. An initial mention of the sulfonated monomer of dichlorodiphenylsulfone or difluorodiphenylsulfone can be found in the patent of L. M. Robeson, M. Matzner U.S. Pat. No. 4,380,598 (1983), or in the publication by M. Udea, H. Toyota, T. Ochi, J. Sugiyama, K. Yonetake, T. Masuko, T. Teramoto *J. Polym, Sci., Polym. Chem.,* 1993, 31, 853. Consequently, a number of polymerizations based on sulfonated monomers of this kind were described, e.g. in F. Wang, M. Hickner, Q. Ji, W. Harrison, J. Mecham, T. A. Zawodzinski, J. E. McGrath *Macromol. Symp.* 2001, 175, 387 and F. Wang, M. Hickner, Y. S. Kim, T. A. Zawodzinski, J. E. McGrath *J. Membr. Sci.* 2002, 197, 231 and W. Harrison, F. Wang, J. B. Mecham, V. Bhanu, M. Hill, Y. S. Kim, J. E. McGrath *J. polym. Sci., Polym. Chem.* 2003, 41, 2264 and F. Wang, J. Li, T. Chen, J. Xu *Polymer* 1999, 40, 795 and F. Wang, T. Chen, J. Xu *Macromol. Chem. Phys.* 1998, 199, 1421.

In addition, unsulfonated polymers with the structural element —$SO_2$—Ar—$SO_2$— (Ar=aromate, unsulfonated) are the subject of several patents, for example in J. Studinka, R. Gabler, Polyarylene sulphonates from sulphonated polyarylene sulphide by two-stage oxidation in acid medium DE patent 1938806A1 (1970), and in U.S. Pat. No. 6,020,442 (2000), U.S. Pat. No. 6,013,761 (2000), U.S. Pat. No. 5,496, 916 (1996), U.S. Pat. No. 5,496,917 (1996) and several publications such as D. R. Robello, A. Ulman, E. Urankar *Mac-*

*romol.* 1993, 26, 6718 and H. M. Colquhoun, P. Aldred, F. H. Kohnke, P. L. Herbertson, I. Baxter, D. J. Williams *Macromol.* 2002, 35, 1685.

One publication on the mechanism of sulfonation at the aromate is J. O. Morley, D. W. Roberts *J. Org. Chem.* 1997, 62, 7358-7363.

SUMMARY

We provide a copolymer containing, in addition to recurring elements of a sulfonated poly(arylene) containing exclusively recurring structural element(s) of the general formulas —[—$Ar_1(SO_3M)_n$-X—]— and —[—$Ar_2(SO_3M)_n$-Y—]—, wherein X and Y, which are identical or different from each other, each represent an electron-acceptor group, $Ar_1$ and $Ar_2$, which are either identical or different from each other, represent an aromatic or heteroaromatic ring system with 5-18 ring atoms; wherein the aromatic or heteroaromatic ring system, in addition to the $SO_3M$ and the substituents X and Y, optionally comprises additional substituents which are not electron-donor groups; M represents monovalent cation and n is an integral number between 1 and 4; and wherein X, Y, $Ar_1$, $Ar_2$, M and n can be identical or different in various structural elements, independently of each other, one or several additional elements of at least one additional monomer or macromonomer.

We further provide a polymer compound including a sulfonated poly(arylene) as described above or a copolymer also described above, and at least one additional polymer.

We also provide a method for producing a sulfonated poly (arylene) containing exclusively recurring structural element(s) of the general formulas —[—$Ar_1(SO_3M)_n$-X—]— and —[—$Ar_2(SO_3M)_n$-Y—]—, wherein X and Y, which are identical or different from each other, each represent an electron-acceptor group, $Ar_1$ and $Ar_2$, which are either identical or different from each other, represent an aromatic or heteroaromatic ring system with 5-18 ring atoms; wherein the aromatic or heteroaromatic ring system, in addition to the $SO_3M$ and the substituents X and Y, optionally comprises additional substituents which are not electron-donor groups; M represents monovalent cation and n is an integral number between 1 and 4; and wherein X, Y, $Ar_1$, $Ar_2$, M and n can be identical or different in various structural elements, independently of each other, including: a) producing a sulfonated aryl monomer $F_1$-AS-$F_2$, where AS represents an aryl system comprising one or more aromatic rings, at least one of which is substituted with a sulfonic acid group, and the aryl system has functional groups $F_1$ and $F_2$, which can be identical or different from each other and can enter into a condensation reaction, or several various aryl monomers of this kind; b) polycondensing the sulfonated aryl monomer or the sulfonated aryl monomers of step a) during the formation of a sulfonated poly(arylene) having at least one electron-donor substituent at the sulfonated aromatic rings; and c) transforming the at least one electron-donor substituent into an electron-acceptor substituent during the formation of a sulfonated poly(arylene) having exclusively electron-acceptor substituents at the sulfonated aromatic rings.

We also provide a method for producing a sulfonated poly (arylene sulfone), including a) producing a sulfonated aryl monomer $F_1$-AS-$F_2$, where AS represents a sulfonated aryl system comprising one or more aromatic rings, at least one of which is substituted with a sulfonic acid group, and the aryl system has functional groups $F_1$ and $F_2$, which can be identical or different from each other and can enter into a condensation reaction with a sulfide group, or several aryl monomers; b) polycondensing the sulfonated aryl monomer or aryl monomers of step a) with an aryl disulfide or alkali sulfide during the formation of a sulfonated poly(arylene sulfide sulfone); and c) oxidizing the sulfonated poly(arylene sulfide sulfone) of step b) into a sulfonated poly(arylene sulfone).

DETAILED DESCRIPTION

Figure 1:
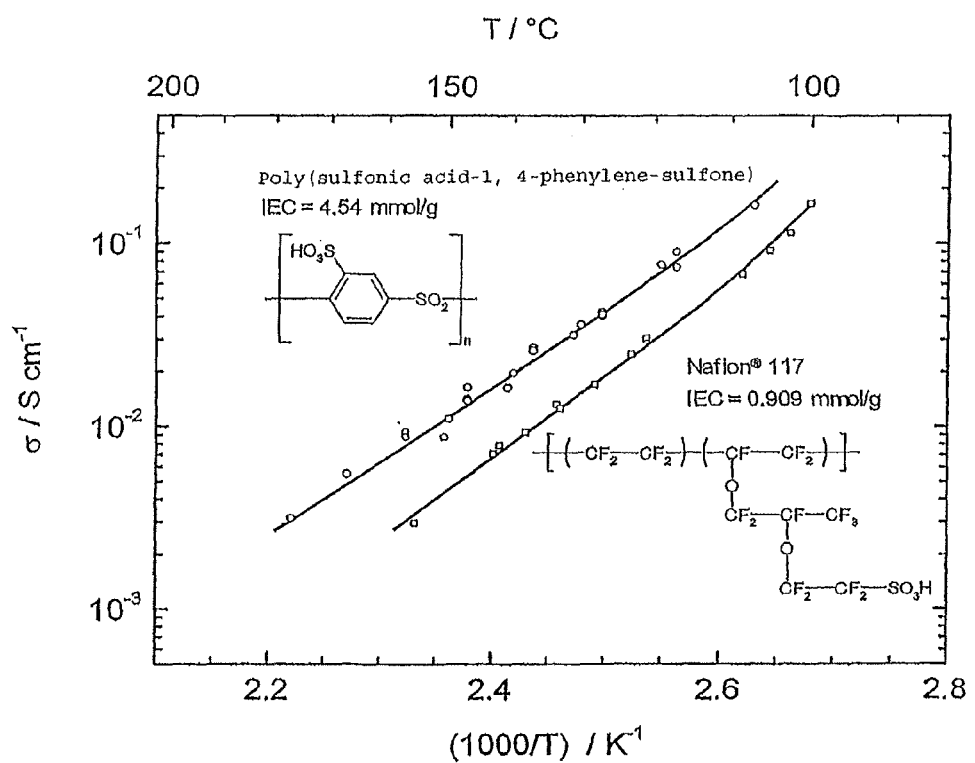
FIG. 1 shows the proton conductivity above 100° C. of poly(sulfonic acid-1,4-phenylene sulfone) compared to that of Nafion 117, measured in a water atmosphere ($p(H_2O)=10^5$ Pa).
Figure 2A:
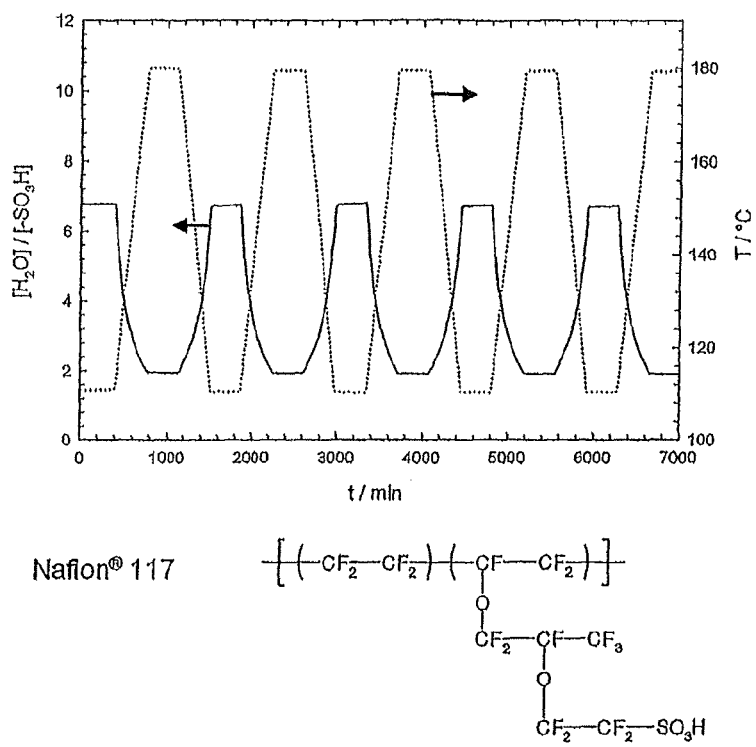
FIG. 2A shows the water absorption of Nafion 117 in a water atmosphere ($p(H_2O)=10^5$ Pa).
Figure 2B:
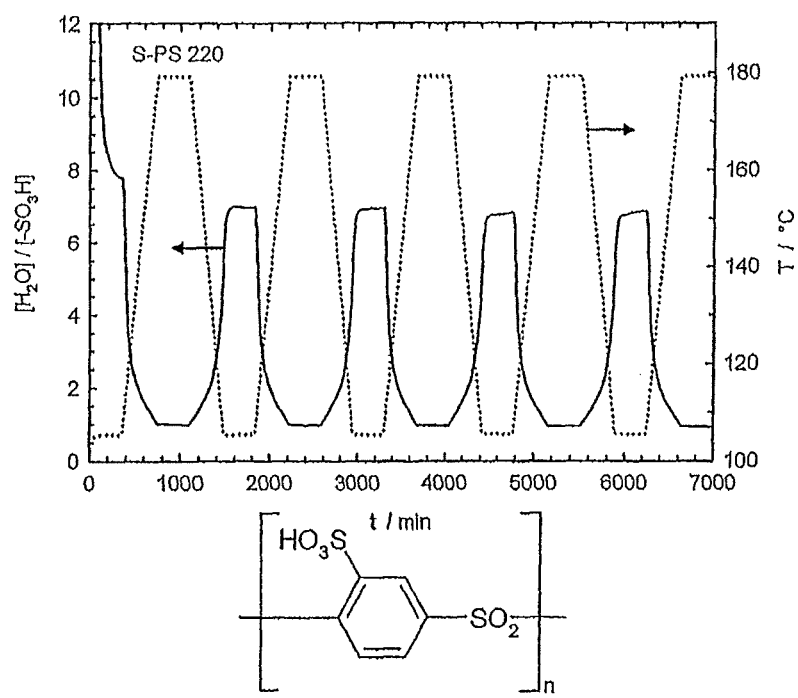
FIG. 2B shows the water absorption of poly(sulfonic acid-1,4-phenylene sulfone) in a water atmosphere ($p(H_2O)=10^5$ Pa).

We provide sulfonated poly(arylenes) featuring the structural element —X—Ar(SO$_3$M)$_n$—Y—, wherein the aromatic ring carrying the sulfonic acid group is exclusively substituted by electron-acceptor bridge groups (strongly deactivating groups, e.g. sulfones —SO$_2$— or ketones —CO—) X and Y, and, if applicable, by additional non-electron-donor substituents, as well as their synthesis and use.

Compared to aromates substituted by electron-donor groups (activating groups, e.g. sulfide —S— or ether —O—) or electron-donor and electron-acceptor-substituted aromates, the hydrolytic stability of sulfonic acid should be notably increased in an electron-acceptor-substituted aromate that does not feature an electron-donor substituent. This follows from theoretical considerations on the mechanism of the hydrolysis of sulfonated aromates and the reverse reaction, electrophile aromatic sulfonation. This reaction is generally reversible; the speed-determining step is the formation of the σ-complex as an intermediate stage of the electrophile aromatic substitution. With increased temperature and high water activity, the sulfonic acid group is separated with relative ease from the aromate (reversal of sulfonation), which limits the applicability of sulfonated poly(arylenes) to lower temperatures. All substituents that destabilize the intermediate stage of the electrophile aromatic substitution (σ-complex), such as deactivating electron-acceptor substituents in ortho or para position to the sulfonic acid, impede the reverse reaction (hydrolysis) and thus stabilize the sulfonic acid group at the aromate. However, this also extremely aggravates, or renders virtually impossible, the electrophile sulfonation of electron-acceptor-substituted aromates without additional electron-donor substituents.

This issue can be addressed using a method in which initially a sulfonated polymer is produced wherein the aromatic ring substituted with a sulfonic acid group still carries at least one electron-donor substituent. Only afterwards is the electron-donor substituent chemically transformed into an electron-acceptor substituent. This transformation can be effected, for example, by oxidation of a sulfide group —S— (electron-donor) into a sulfone group —SO$_2$— (electron-acceptor).

Electron-acceptor groups like the ones used herein are electron-attracting groups that, as substituents, reduce the electron density on an aromatic ring (also referred to as deactivating groups). Electron-attracting groups have an –M- and/or –I-effect.

The resonance effect (M-effect, mesomerism effect) generally only works if the group is bound directly to an unsaturated (e.g. aromatic) system. It acts through π-electrons, as opposed to the field effect (I-effect, inductive effect), which acts through space or solvency molecules or preferably through the σ-bonds of a system.

–M-Effect (negative resonance effect): A group has an –M-effect if the electron density in this group is greater than expected and the electron density in the unsaturated system is less than expected. Some preferred examples, without limitation, for bridge groups with an –M-effect are: —SO$_2$—, —SO$_2$O—, —CO—, —COO—, —CONH—, —CONR— and —POR—.

Electron-donor groups like the ones used herein are therefore groups that, as substituents, increase the electron density in an aromatic ring (also referred to as activating groups). Electron-donor groups have a +M- and/or +I-effect. Examples for such bridge groups are ether —O— and sulfides (thioether) —S—.

The poly(arylenes) sulfonated contain one or several structural elements of the formula —[—X—Ar(SO$_3$M)$_n$-Y—]—, wherein X and Y, which are identical or different from each other, each mean one electron-acceptor group, Ar represents an aromatic or heteroaromatic ring system with preferably 5-18 ring atoms, M represents a monovalent cation, and n means an integral number between 1 and 4, and wherein X, Y, Ar, M and n can be identical or different in various structural elements, independently of each other.

The bridge groups X and Y can be present at an aromatic ring in the para, meta and ortho position, the para position being generally preferred. Suitable examples, without limitation, for the electron-acceptor bridge groups X and Y are —SO$_2$—, —SO—, —SO$_2$O—, —CO—, —COO—, —CONN—, —CONR— and —POR—, wherein —SO$_2$— and —CO— are preferred and —SO$_2$— is especially preferred.

Specific examples, without limitation, for suitable aromatic or heteroaromatic ring systems are phenylene, naphthylene, anthracene, phenanthrene, biphenylene, furan, thiophene, pyrrole, thiazole, triazole, pyridine, imidazole and benzimidazole.

The aromatic or heteroaromatic ring can be substituted with one to four sulfonic acid groupings —SO$_3$M, i.e. in the above formulas, n=1-4, and for Ar=phenylene, n is preferably 1 or 2. The counterion M of the sulfonate group is either a proton, i.e. sulfonic acid is present, or a conventional monovalent cation. Typical examples of such a cation are metal ions such as Li$^+$, Na$^+$, K$^+$ and NR$_4^+$, PR$_4^+$, wherein R represents an organic residue, preferably alkyl.

Apart from the sulfonic acid group and the bridge substituents X and Y, the aromatic or heteroaromatic rings can also contain additional non-electron-donor substituents. Some specific examples, without limitation, for such substituents are halogen, e.g. F, Cl, Br, or unsubstituted or substituted alkyl groups, e.g. —CH$_3$ or —CF$_3$.

Preferably, Ar is phenylene, and the sulfonated poly(arylene) contains one or several of the following structural elements I, II or III

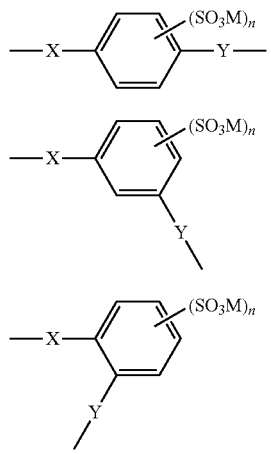

wherein X and Y, as defined above, are identical or different.

Typically, the structural element(s) of the general formula —X—Ar(SO$_3$M)$_n$-Y— is/are formed by recurring elements of the formulas —[—Ar$_1$(SO$_3$M)$_n$-X—]— or —[—Ar$_2$(SO$_3$M)$_n$-Y—]—, wherein X and Y, which are identical or varying, mean one electron-acceptor group each, Ar$_1$ and Ar$_2$, which are identical or different from each other, represent an aromatic or heteroaromatic ring system Ar with preferably 5-18 ring atoms, as defined above; M represents a monovalent cation, as defined above; and n means an integral number between 1 and 4; and wherein X, Y, Ar$_1$, Ar$_2$, M and n can be identical or different in various structural elements, independently of each other; and the sulfonated aromatic or heteroaromatic ring systems Ar$_1$(SO$_3$M)$_n$ or Ar$_2$(SO$_3$M)$_n$ are not substituted by electron-donor groups. The elements —[—Ar$_1$(SO$_3$M)$_n$-X—]— and —[—Ar$_2$(SO$_3$M)$_n$-Y—]— can be identical or different in the type of the aromatic ring and/or in the degree of substitution and/or in the substitution positions.

The sulfonated poly(arylene) may contain exclusively recurring elements of the formulas —[—Ar$_1$(SO$_3$M)$_n$-X—]— or —[—Ar$_2$(SO$_3$M)$_n$-Y—]—. Even more specifically, the sulfonated poly(arylene) contains exclusively one or more of the above structural elements I, II or III.

Especially preferred sulfonated poly(arylenes) are sulfonated poly(arylene sulfones), in particular poly(sulfonic acid phenylene sulfones), and their copolymers. Other examples, without limitation, for sulfonated poly(arylenes) are poly(sulfonic acid phenylene ether ketones), poly(sulfonic acid phenylene sulfone ketones) and their copolymers.

However, sulfonated poly(arylenes) also encompasses such copolymer poly(arylenes) which, in addition to the elements forming the structural element(s) of the general formula —X—Ar(SO$_3$M)$_n$-Y—, contain one or more elements of the formula —[—Ar$_3$—Z—]—, wherein Z can be an electron-donor group or an electron-acceptor group or neither, Ar$_3$ represents an aromatic or heteroaromatic ring system with preferably 5-18 ring atoms without SO$_3$M substituents, and the groups Ar$_3$ and Z can be identical or different in various elements —[—Ar$_3$—Z—]—, provided that the Z group can only be bound to a sulfonated aromatic or heteroaromatic ring system of the formula Ar(SO$_3$M)$_n$ if Z does not represent an electron-donor.

Some suitable examples, without limitation, for the bridge group Z are —SO$_2$—, —SO—, SO$_2$O—, —CO—, —COO—, —CONH—, —CONR—, —POR—, —S—, —O— and alkylene. Other suitable groups are not difficult to discern for one skilled in the art of polymer chemistry.

Specific examples, without limitation, for suitable aromatic or heteroaromatic Ar$_3$ ring systems are phenylene, naphthylene, anthracene, phenanthrene, biphenylene, furan, thiophene, pyrrole, thiazole, triazole, pyridine, imidazole, benzimidazole, etc. These ring systems may contain additional substituents in addition to the bridge substituents, if desired.

We also provide copolymers that, in addition to recurring elements of a sulfonated poly(arylene), as described above, also contain (preferably recurring) elements of at least one additional monomer or macromonomer.

Basically, any compound that can be copolymerized with the aryl monomers is suitable as an additional monomer or macromonomer. Typically, this will be a α,ω-dihydroxy compound or a α,ω-dihalogen compound. Preferably, the α,ω-dihydroxy compound will feature the formula HO—W—OH, and the α,ω-dihalogen compound the formula Hal-W-Hal, wherein W is selected from the group consisting of —(CH$_2$)$_n$—, —(CF$_2$)$_n$—, —(CF$_2$CH$_2$)$_n$—, —(CH$_2$—CH$_2$—O)$_n$—CH$_2$—CH$_2$—, —(CH(CH$_3$)—CH$_2$—O)$_n$—CH(CH$_3$)—CH$_2$—, —(CF$_2$—CF$_2$—O)$_n$—CF$_2$—CF$_2$—, polyarylene ether sulfones, polyarylene ether ketones, polysiloxanes (e.g. —(SiR$_2$—O)$_n$—). Hal in the dihalogen compound represents a halogen residue, e.g. F, Cl, Br and I.

The pure, sulfonated poly(arylenes) or copolymers can also be mixed with one or more conventional polymers in a known manner in order to obtain a polymer mixture that combines the advantageous characteristics of its individual components. For example, the polymers can be mixed on the basis of a sulfonated poly(arylene) with "softener components" to provide the resulting mixed polymer with greater flexibility and/or formability. Suitable polymers are known and can be selected, for example, from the group of PBI (polybenzimidazole), PTFE (polytetrafluoroethylene), PVDF (polyvinylidene fluoride), PSU (polysulfones), PES (polyether sulfones), PEK (polyether ketones), PPO (polyphenylene oxides), PPS (polyphenylene sulfides), PI (polyimides), PC (polycarbonates), PMMA (polymethyl methacrylates), polyphosphazenes.

The pure, sulfonated poly(arylenes) or copolymers or polymer compounds of the invention can be integrated into an inert porous matrix, such as an organic (porous PE, PP, PVDF, PTFE, etc.) or anorganic matrix (porous boronitride, silicon dioxide, etc.).

The pure, sulfonated poly(arylenes) or copolymers or polymer compounds can be reinforced with fiber materials, such as glass fibers, ceramic fibers, textile fibers, carbon fibers, microporous polypropylene or polytetrafluoroethylene, etc.

Furthermore, the pure, sulfonated poly(arylenes) or copolymers or the above polymer compounds can be combined with active or inactive fillers, including, but not limited to, $TiO_2$, $ZrO_2$ or $SiO_2$ particles, zirconium phosphates and phosphonates, tungstic or molybdic acid, etc., to form the corresponding composite materials. A combination with other conventional additives is also easily possible.

The sulfonated poly(arylenes) have molecular weights in the range of 2,000 to 2,000,000, typically in the range of 2,000 to 1,000,000, more frequently in the range of 10,000 to 1,000,000, preferably in the range of 2,000 to 200,000, especially preferably in the range of 10,000 to 100,000.

The synthesis of the sulfonated poly(arylenes) takes place by a multi-stage reaction: First, a sulfonated polymer is produced, which carries at least one electron-donor substituent at the sulfonated aromatic ring, which is subsequently transformed into an electron-acceptor substituent.

The first step may involve an already existing electron-donor-substituted polyarylene, produced by a conventional method or commercially available, being sulfonated by a known method, for example, by reacting with $SO_3$ and/or $H_2SO_4$ (see Example 11).

More frequently, however, production of the sulfonated polymer involves a polycondensation of already sulfonated monomers. In this way, the composition and properties of the resulting sulfonated polyarylene can be adjusted as desired.

In general, such a production method involves the following steps:

a) Production of a sulfonated aryl monomer, $F_1$-AS-$F_2$, where AS represents an aryl system comprised of one or more aromatic rings, at least one of which is substituted with a sulfonic acid group, and the aryl system features functional groups $F_1$ and $F_2$, which may be identical or different from each other and can enter into a condensation reaction, or several various aryl monomers of this kind;

b) Polycondensation of the sulfonated aryl monomer or the sulfonated aryl monomers of step a) during formation of a sulfonated poly(arylene) featuring at least one electron-donor substituent at the sulfonated aromatic rings;

c) Transformation of the (at least) one electron-donor substituent into an electron-acceptor substituent during formation of a sulfonated poly(arylene) featuring exclusively electron-acceptor substituents at the sulfonated aromatic rings.

The polycondensation, in addition to one or more sulfonated aryl monomers $F_1$-AS-$F_2$, as defined above, may also involve one or more aryl monomers $F_1$-ANS-$F_2$, ANS representing an aryl system comprised of one or more aromatic rings not substituted with a sulfonic acid group, and the aryl system featuring functional groups $F_1$ and $F_2$, as defined above, which may be identical or different from each other. This involves formation of a partially sulfonated poly (arylene) featuring at least one electron-donor substituent at the sulfonated aromatic rings, and the electron-donor substituent is subsequently transformed into an electron-acceptor substituent; in the course of this, a partially sulfonated poly (arylene) is formed which features exclusively electron-acceptor substituents at the sulfonated aromatic rings.

The production of a sulfonated poly(arylene sulfone) may involve the following steps:

a) Production of a sulfonated aryl monomer, $F_1$-AS-$F_2$ featuring functional groups $F_1$ and $F_2$ which may be identical or different from each other and can react with a sulfide group in a condensation reaction, or several such aryl monomers, as defined above;

b) Polycondensation of the sulfonated aryl monomer or the sulfonated aryl monomers of step a) with an aryl disulfide or alkali sulfide during formation of a sulfonated poly(arylene sulfide sulfone);

c) Oxidation of the sulfonated poly(arylene sulfide sulfone) of step b) into a sulfonated poly(arylene sulfone).

The functional groups $F_1$ and $F_2$ of the aryl monomers, identical or different, are preferably selected from the group consisting of fluorine, chlorine, bromine or iodine.

The sulfonated aryl monomers may follow the structural formula $F_1$—$Ar_1$—$SO_2$—$Ar_2$—$F_2$, i.e. AS=$Ar_1$—$SO_2$—$Ar_2$—, where $Ar_1$ and $Ar_2$ can be identical or different and each represents an aromatic or heteroaromatic ring system with 5-18 ring atoms, provided that $Ar_1$ and/or $Ar_2$ is/are substituted by at least one $SO_3M$ group in at least one of the aryl monomers used, M being defined as described above.

The following Reaction Scheme I shows the basic steps of the method based on the concrete, non-limiting example of the production of the homopolymer poly(sulfonic acid-1,4-phenylene sulfone) (detailed description in Examples 1 and 2).

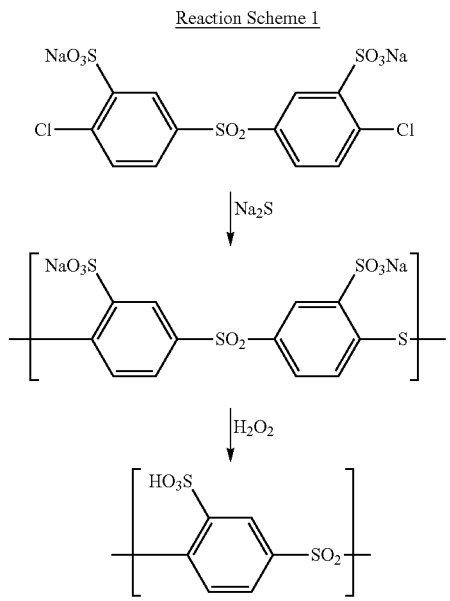

Reaction Scheme 1

As already discussed above, only one aryl monomer can be used for this method, leading to the formation of a homopolymer poly(arylene sulfone), or two or more various aryl (co) monomers can be produced and subjected to a co-polycondensation and subsequent oxidation. The $Ar_1$ and/or $Ar_2$ residues may be substituted by at least one $SO_3M$ group in at least one of the aryl (co)monomers, M being defined as described above, and the $Ar_1$ and/or $Ar_2$ residues are not substituted with an $SO_3M$ group in at least one other aryl monomer.

The functional groups $F_1$ and $F_2$ of the aryl monomers, identical or different, are preferably selected from the group consisting of fluorine, chlorine, bromine or iodine.

The following Reaction Scheme II shows the basic steps of the production of a copolymer sulfonated poly(arylene sulfone), using the initial monomers disodium-3,3'-disulfonate-4.4'-difluorodiphenylsulfone and 4,4'-difluorodiphenyl-sulfone (Example 3). By specifying the ratio between the two initial monomers, the composition of the resulting polymer can be adjusted. In the above-mentioned Reaction Scheme II and the diagrams relating to Examples 3-10, the reaction product of the polycondensation is represented as a block copolymer of the two different initial monomers, for better clarity. However, the present invention also encompasses, equally or even preferably, the corresponding statistic copolymers, which can be produced by the method described in Example 3. Other statistic or block copolymers according to the invention can be produced in an analogous manner without much difficulty (see Examples 4-10).

Preferred solvents for the polymerization reaction or copolymerization reaction are aprotic, polar, high-boiling solvents, such as 1-methyl-2-pyrrolidone (NMP), dimethyl sulfoxide (DMSO), dimethylformamide (DMF), dimethyl acetamide (DMAc), sulfolane, diphenyl sulfone, 1,3-dimethyl-2-imidazolidinone.

The reaction temperature is typically 100-250° C., preferably 140-200° C.

The reaction with alkali sulfide (e.g. sodium sulfide) generally takes place in the presence of additives such as alkali metal carboxylates (e.g. sodium acetate, lithium acetate), alkali metal carbonates (e.g. lithium carbonate), alkali metal sulfonates, lithium borate, lithium chloride.

The alkali sulfide (e.g. sodium sulfide) can also be used as a hydrate (e.g. $Na_2S.9H_2O$).

offers the possibility of systematically producing copolymers with adjustable, variable ion exchange capacities (IEC=ion exchange capacity [mequiv/g], EW=equivalent weight [g/equiv]) by controlling the reaction process accordingly, using certain initial monomers and certain monomer ratios.

For the copolymer examples produced according to or analogous to the above scheme, the calculation formulas are indicated in the corresponding examples. For other copolymers according to the invention, the corresponding formulas may be empirically determined without difficulty.

In any case, when using the new membrane materials, a significantly increased hydrolytic and thermo-oxidative stability can be expected.

The sulfonated poly(arylene sulfones) can be characterized by various methods, e.g. by elementary analysis, NMR, solubilities, GPC, MALDI-TOF, DSC, x-ray, IEC through titration, density, IR, swelling in water and methanol, water absorption isotherms, water diffusion and electro-osmotic flow tests, conductivity measurements, particularly under higher temperatures when wetted, water absorption and hydrolytic stability tests (TGA under 1 atm water vapor) and thermo-oxidative stability (TGA in an oxygen atmosphere, e.g. 80% $N_2$ and 20% $O_2$). Some results of more recent tests are shown in FIGS. 1-4. Represented in FIGS. 5-11 are additional results of tests performed to study the properties of the polymers of the invention in more detail and compare them to those of sulfonated poly(arylene ether sulfones) and sulfonated poly(arylene sulfide sulfones) known from the literature.

In characterization tests, the results of which are shown in FIG. 1-4, the conductivity in a water atmosphere ($p(H_2O)=10^5$ Pa) was determined by impedance spectroscopy, the water absorption of the polymers in a water atmosphere ($p(H_2O)=10^5$ Pa) by TGA (thermogravimetric analysis), and the thermo-oxidative stability by TGA in an oxygen-containing atmosphere.

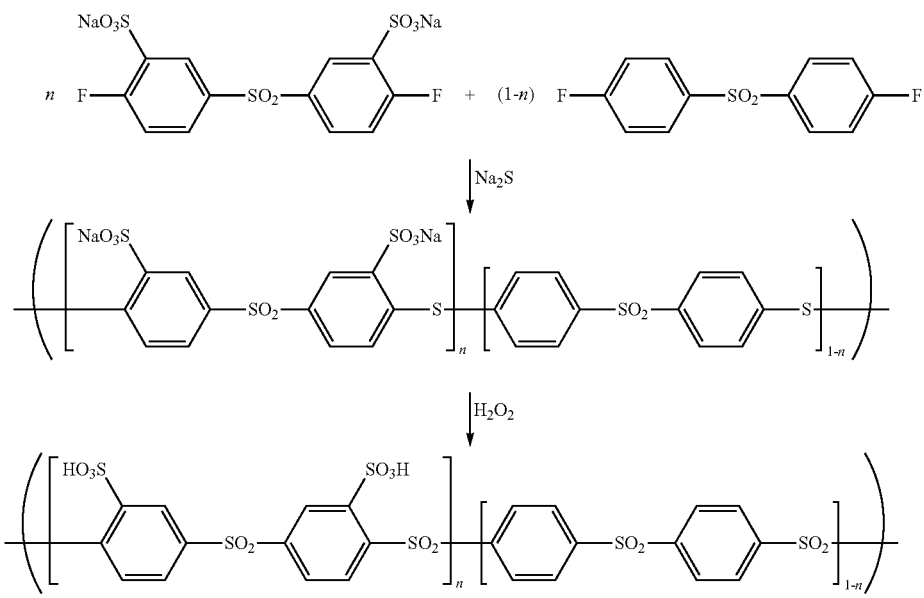

Figure 3A:
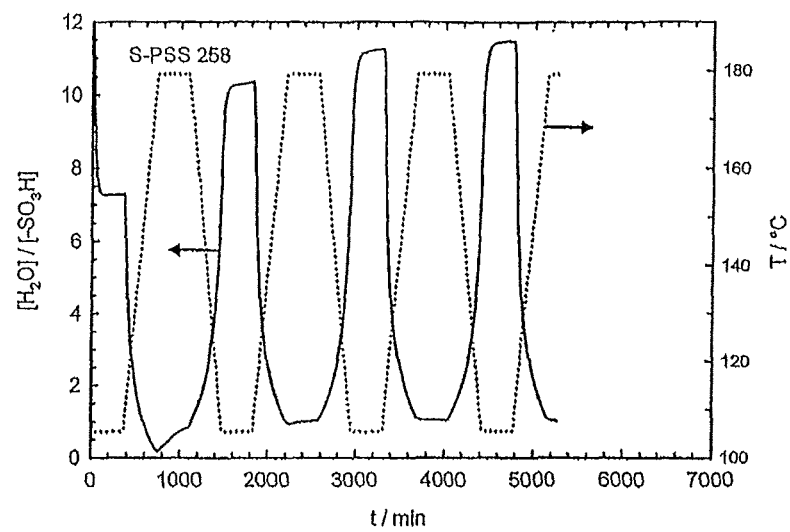
FIG. 3A shows the water absorption of sulfonated poly(1,4-phenylene-sulfone-1,4-phenylene-sulfide-1,3-phenylene-sulfide) in a water atmosphere ($p(H_2O)=10^5$ Pa).
Figure 3A:
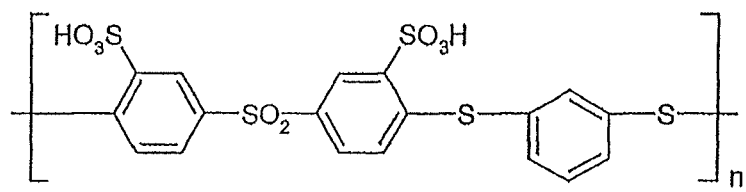
Figure 3B:
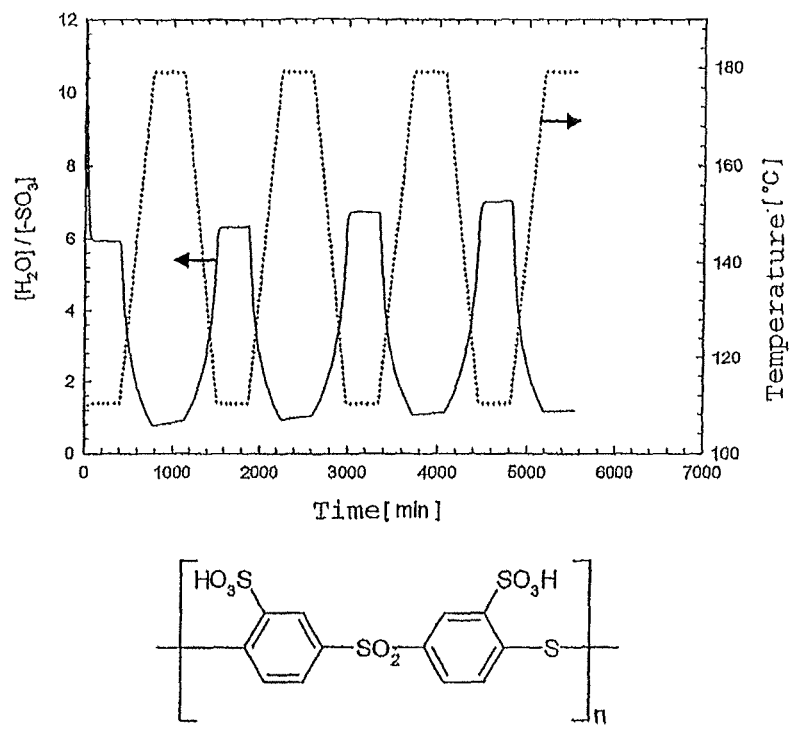
FIG. 3B shows the water absorption of sulfonated poly(1,4-phenylene-sulfone-1,4-phenylene-sulfide) in a water atmosphere ($p(H_2O)=10^5$ Pa).
Figure 4:
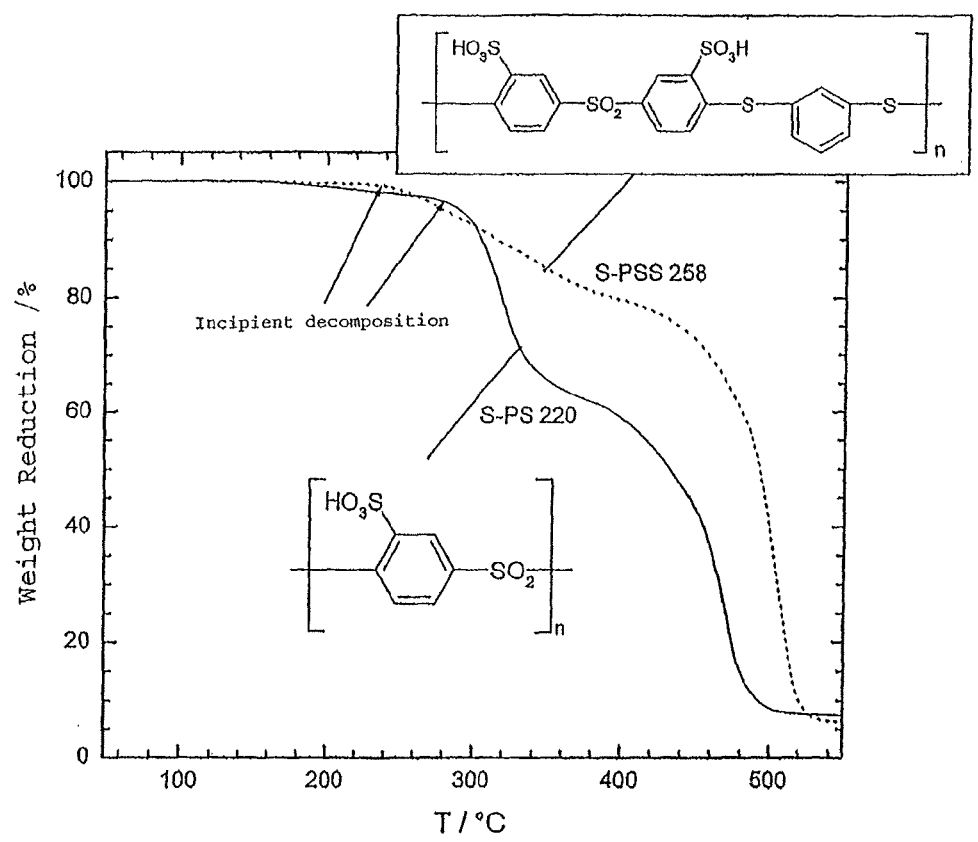
FIG. 4 shows the increased thermo-oxidative stability of a sulfonated poly(arylene sulfone) (S-PS 220) compared to the corresponding sulfonated poly(arylene sulfide sulfone) through thermogravimetric measurements in an oxygen-containing atmosphere (20% $O_2$ and 80% $N_2$).

Such copolymers of different composition also feature different ion exchange capacities. The method described above Through cyclic measurements between T=105 and 180° C. in a water atmosphere ($p(H_2O)=10^5$ Pa; heating and cooling rate 12° C./h), the hydrolytic stability of the sulfonic acid group at the aromate can be estimated. Reversible weight changes due to water desorption and absorption during the heating and cooling phases indicate a high stability of the sulfonic acid group in the tested temperature range, while an irreversible weight change indicates a hydrolytic decomposition of the aromatic sulfonic acid. Since hydrolysis produces sulfuric acid as a reaction product and the sulfuric acid is more strongly hygroscopic than the corresponding sulfonic acid, an increasing water absorption can be observed during decomposition. Sulfonated poly(arylene sulfones) (FIG. 2A) and Nafion (FIG. 2B) are stable under these conditions, while the corresponding sulfonated poly(arylene sulfide sulfones) show decomposition reactions (FIGS. 3A and 3B).

To demonstrate the notable difference between our sulfonated poly(arylene sulfones) sPS and the known sulfonated poly(arylene ether ketones) and sulfonated poly(arylene sulfide sulfones) sPSS [Ref.: 1-6], several of these reference polymers were produced, their properties examined in detail and compared to our polymers.

Structural element in our sulfonated poly(arylene sulfones) sPS:

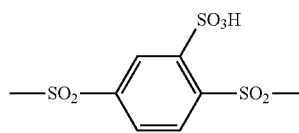

Structural elements in sulfonated poly(arylene ether sulfones) and sulfonated poly(arylene sulfide sulfones) sPSS:

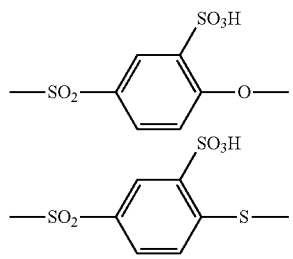

Another common name for poly(arylene sulfide sulfones) is poly(arylene thioether sulfones).

Apart from the differences in molecular structure between sulfonated poly(arylene ether sulfones) and/or sulfonated poly(arylene sulfide sulfones) and the pure, sulfonated poly(arylene sulfones), one can observe substantial differences in the thermal, thermo-oxidative and hydrolytic stability, as well as the solubility, swelling capacity and the conductivity of these polymers, all of which facilitates a distinctive classification.

Figure 5A:
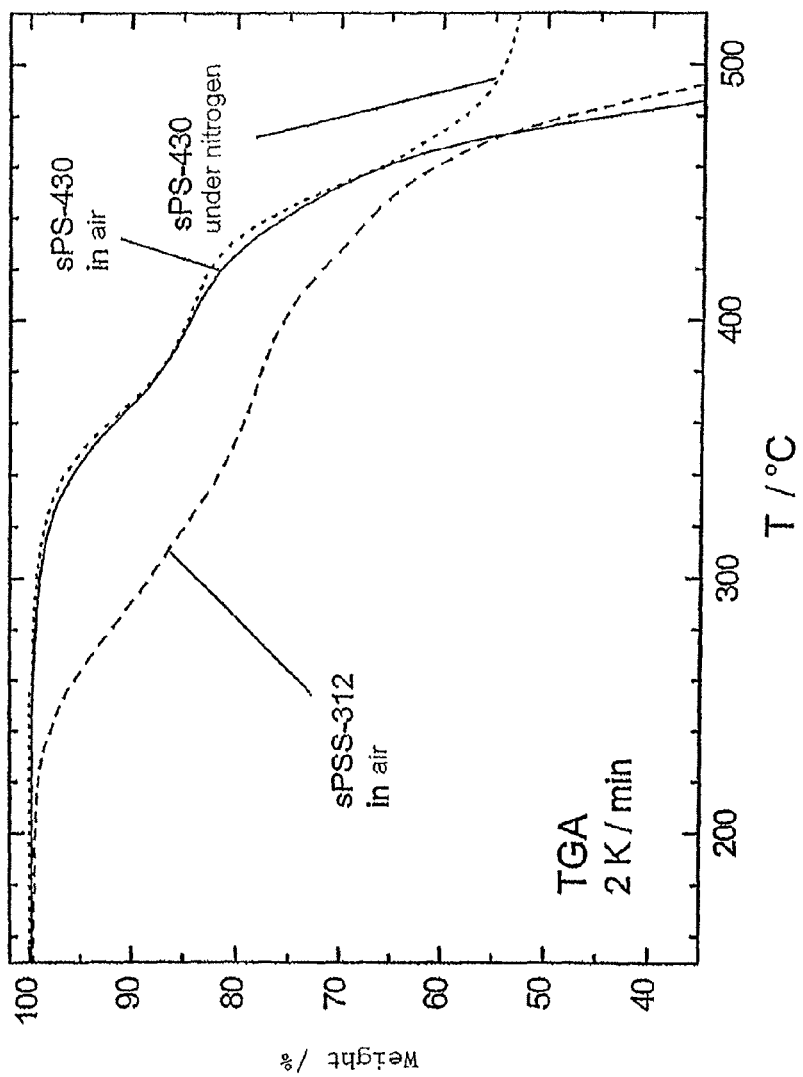
FIG. 5A shows the increased thermo-oxidative stability of a sulfonated poly(arylene sulfone) (sPS-430, n=0.8, Example 4) compared to a sulfonated poly(arylene sulfide sulfone) (sPSS-312, n=1.0, Example 4) through thermogravimetric measurements in an oxygen-containing atmosphere (20% $O_2$ and 80% $N_2$, heating rate 2 K/min). The purely thermal stability of sPS-430 in a nitrogen atmosphere is also shown.
Figure 5B:
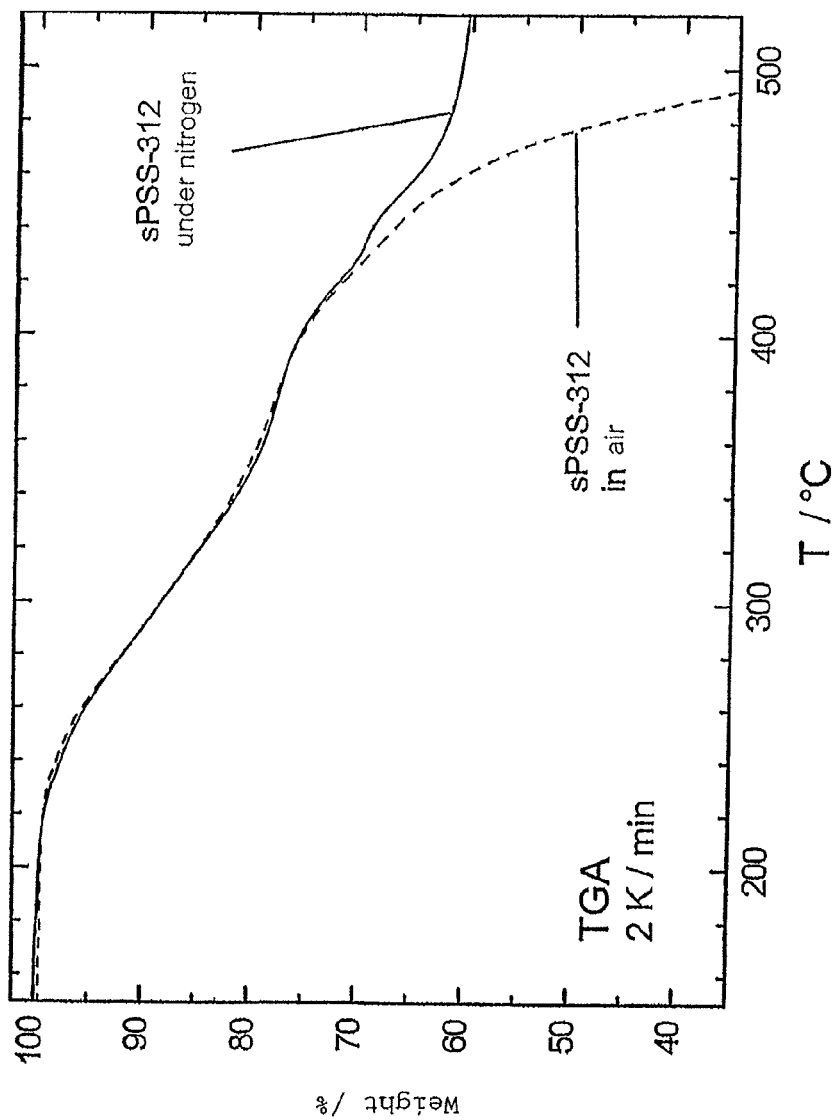
FIG. 5B shows that, in an oxygen-containing atmosphere, sulfonated poly(arylene sulfide sulfones) do not undergo a spontaneous transformation (oxidation) of the sulfide groups —S— into sulfone groups —$SO_2$— during the formation of sulfonated poly(arylene sulfones).
Figure 6A:
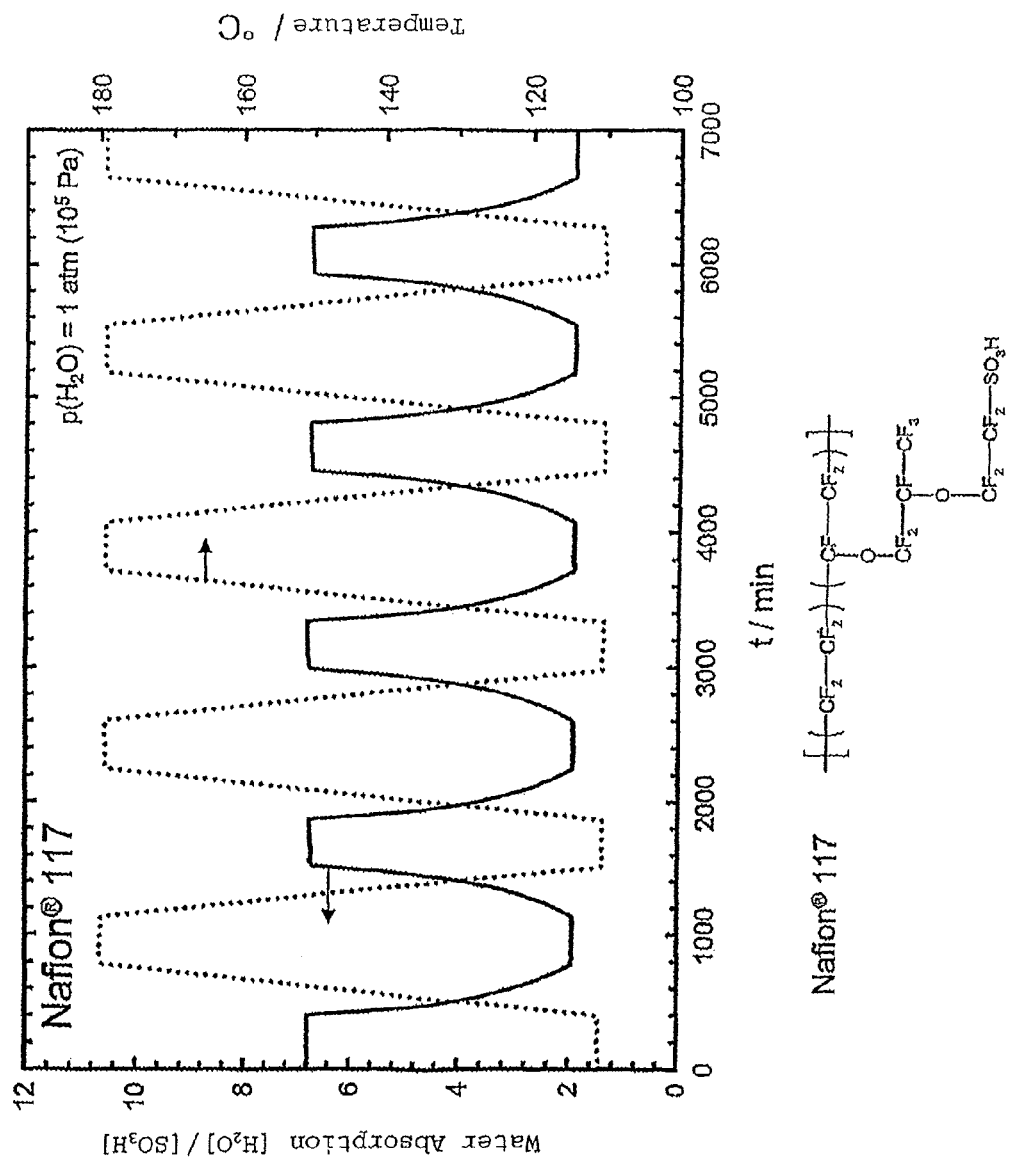
FIG. 6A shows the temperature-dependent water absorption and water desorption of Nafion® 117 in a water atmosphere ($p(H_2O)=10^5$ Pa, heating and cooling rate 12° C./h).
Figure 6B:
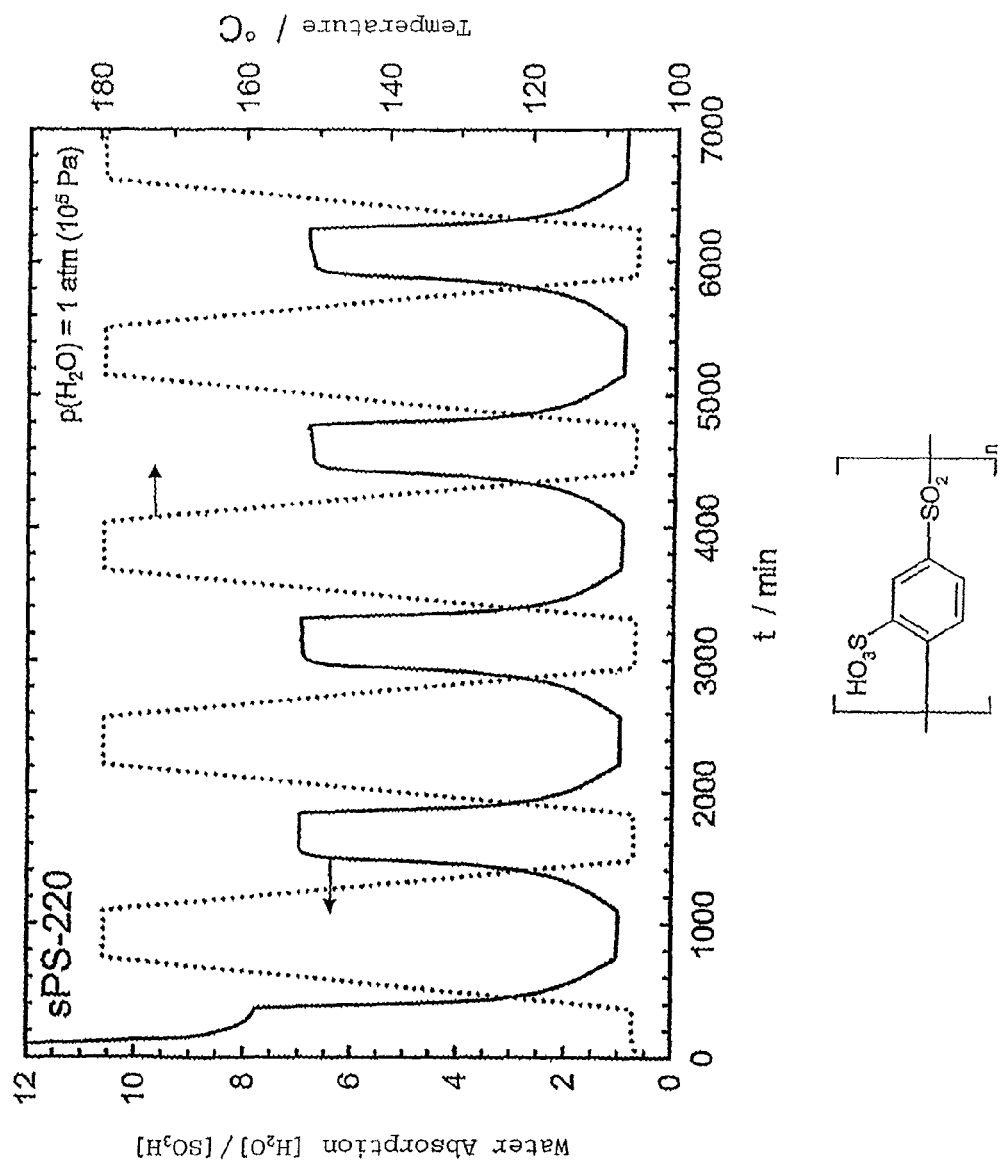
FIG. 6B shows the temperature-dependent water absorption and water desorption of a sulfonated poly(arylene sulfone) (sPS-220, n=1.0, Example 2) in a water atmosphere ($p(H_2O)=10^5$ Pa, heating and cooling rate 12° C./h). Reversible weight changes due to water desorption and absorption during the heating and cooling phases indicate the high hydrolytic stability of the sulfonic acid group.
Figure 6C:
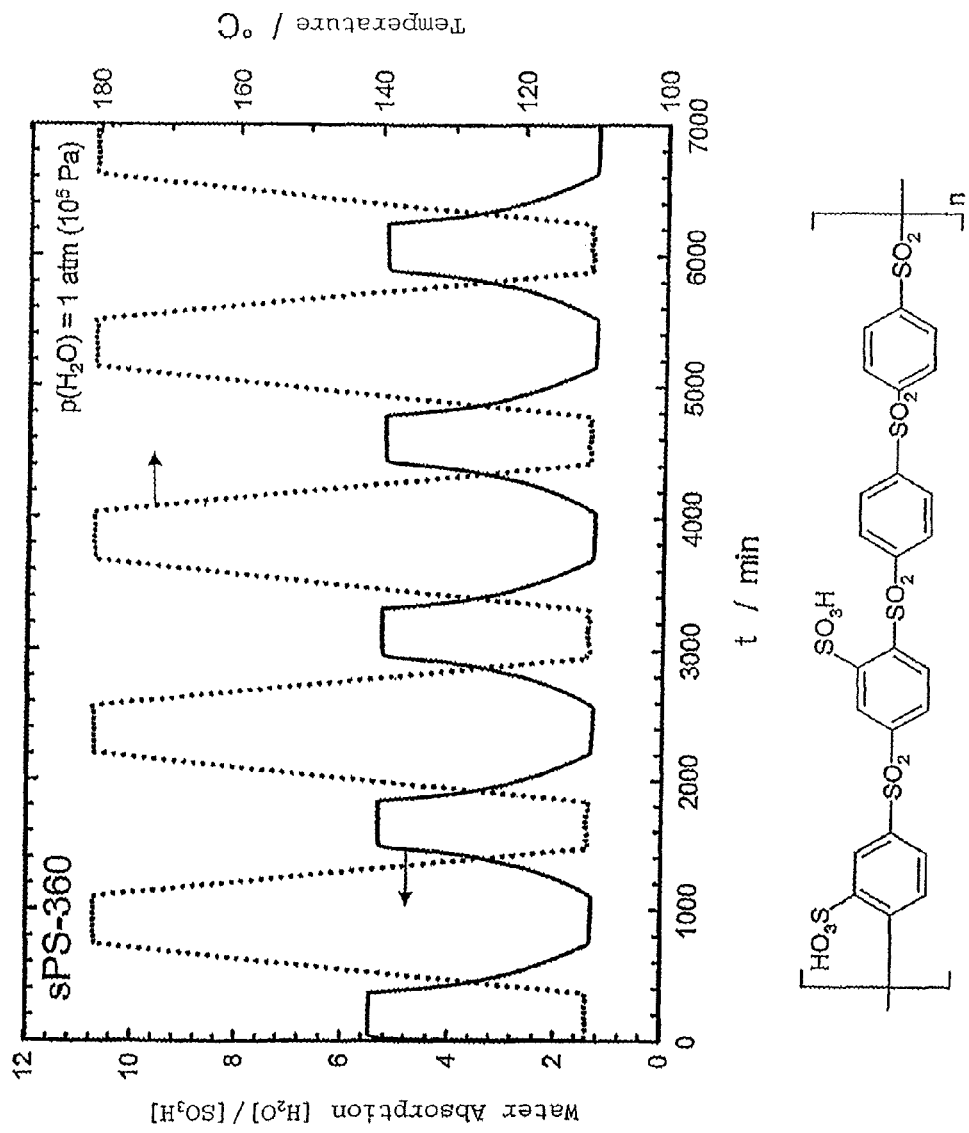
FIG. 6C shows the temperature-dependent water absorption and water desorption of a sulfonated poly(arylene sulfone) (sPS-360, n=1.0, Example 4) in a water atmosphere ($p(H_2O)=10^5$ Pa, heating and cooling rate 12° C./h). Reversible weight changes due to water desorption and absorption during the heating and cooling phases indicate the high hydrolytic stability of the sulfonic acid group.
Figure 6D:
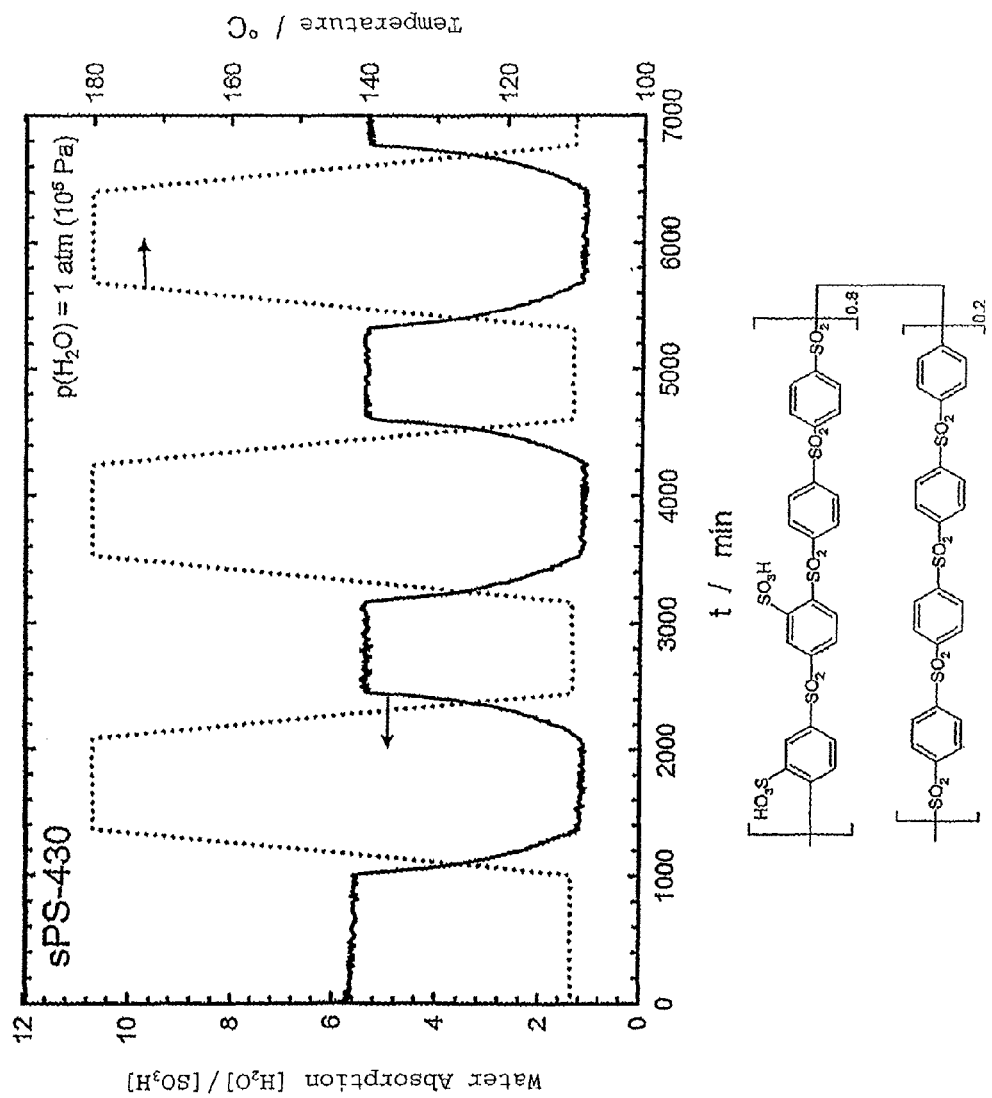
FIG. 6D shows the temperature-dependent water absorption and water desorption of a sulfonated poly(arylene sulfone) (sPS-430, n=0.8, Example 4) in a water atmosphere ($p(H_2O)=10^5$ Pa, heating and cooling rate 12° C./h). Reversible weight changes due to water desorption and absorption during the heating and cooling phases indicate the high hydrolytic stability of the sulfonic acid group.
Figure 6E:
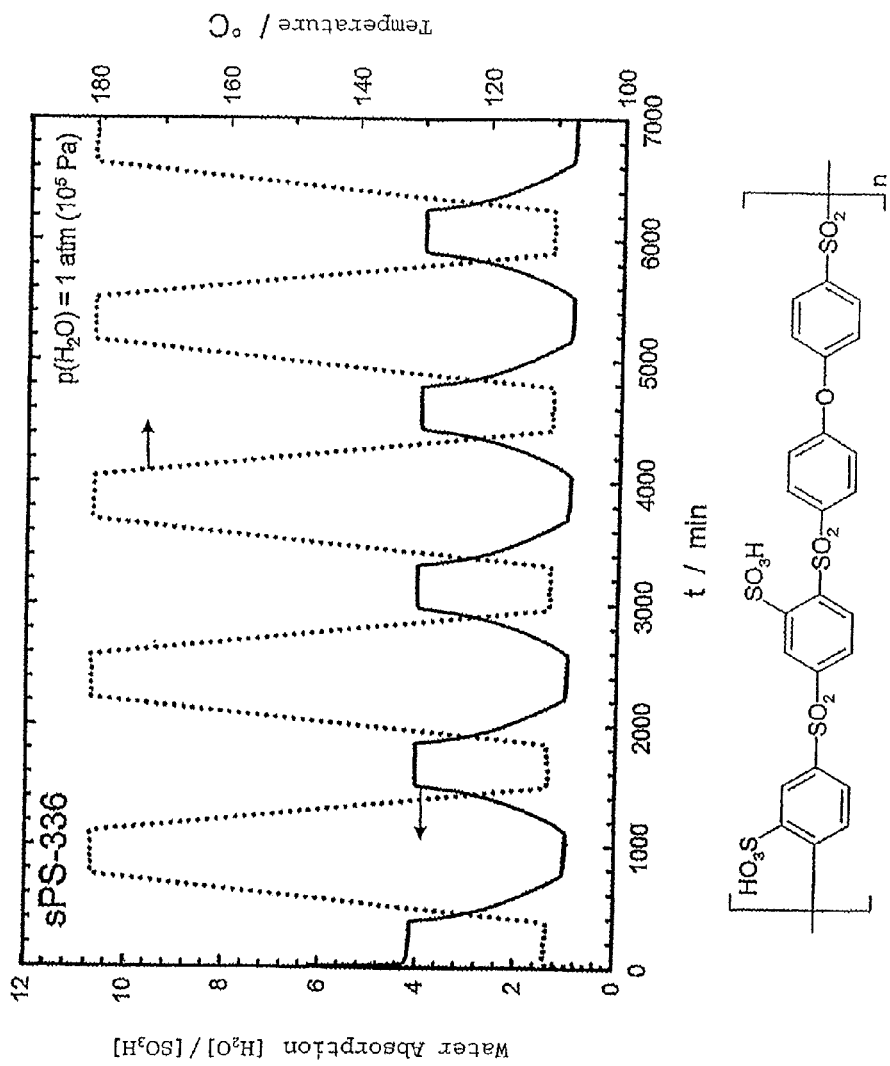
FIG. 6E shows the temperature-dependent water absorption and water desorption of a sulfonated poly(arylene sulfone) (sPS-336, n=1.0, Example 6) in a water atmosphere ($p(H_2O)=10^5$ Pa, heating and cooling rate 12° C./h). Reversible weight changes due to water desorption and absorption during the heating and cooling phases indicate the high hydrolytic stability of the sulfonic acid group.
Figure 6F:
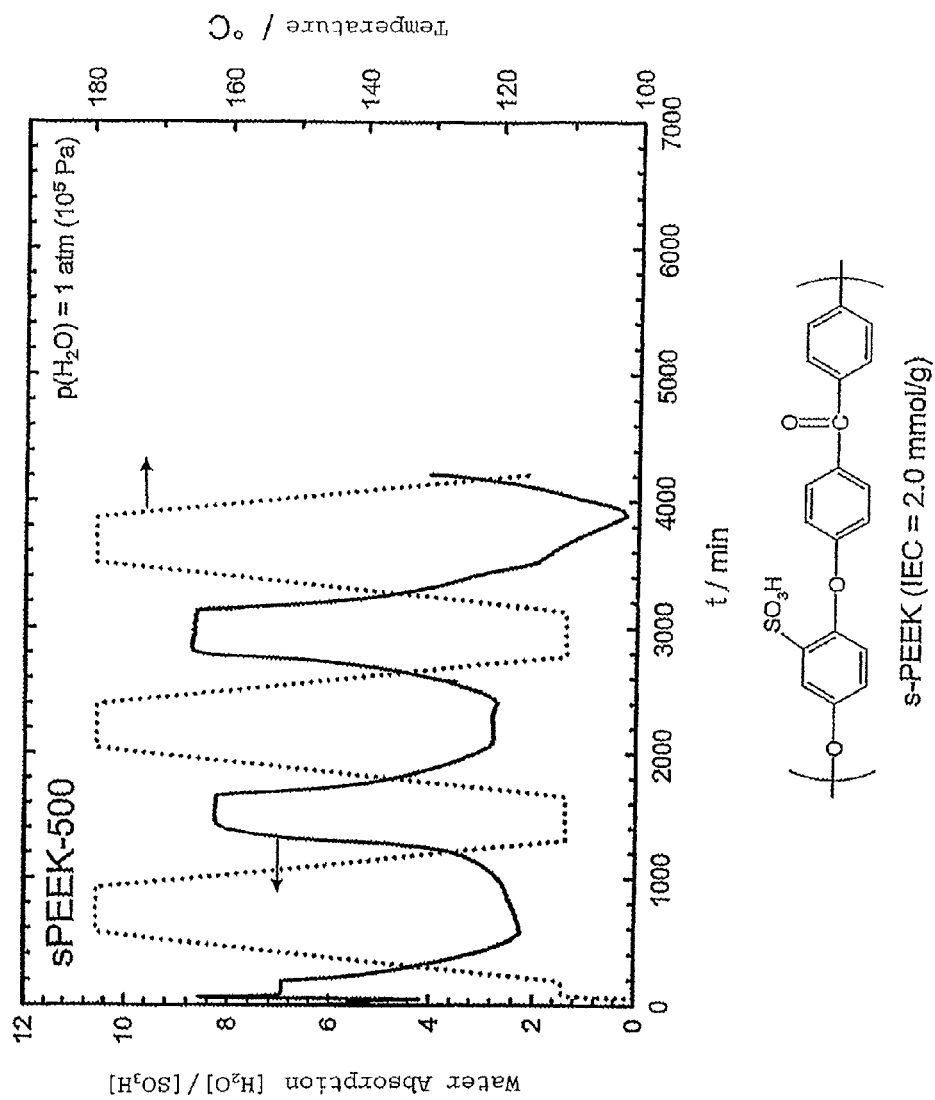
FIG. 6F shows the temperature-dependent water absorption and water desorption of a sulfonated poly(arylene-ether-ether-ketone) (sPEEK-500, IEC=2.0 mmol/g) in a water atmosphere ($p(H_2O)=10^5$ Pa, heating and cooling rate 12° C./h). Irreversible weight changes indicate the hydrolytic decomposition of the sulfonic acid at the aromate.
Figure 6G:
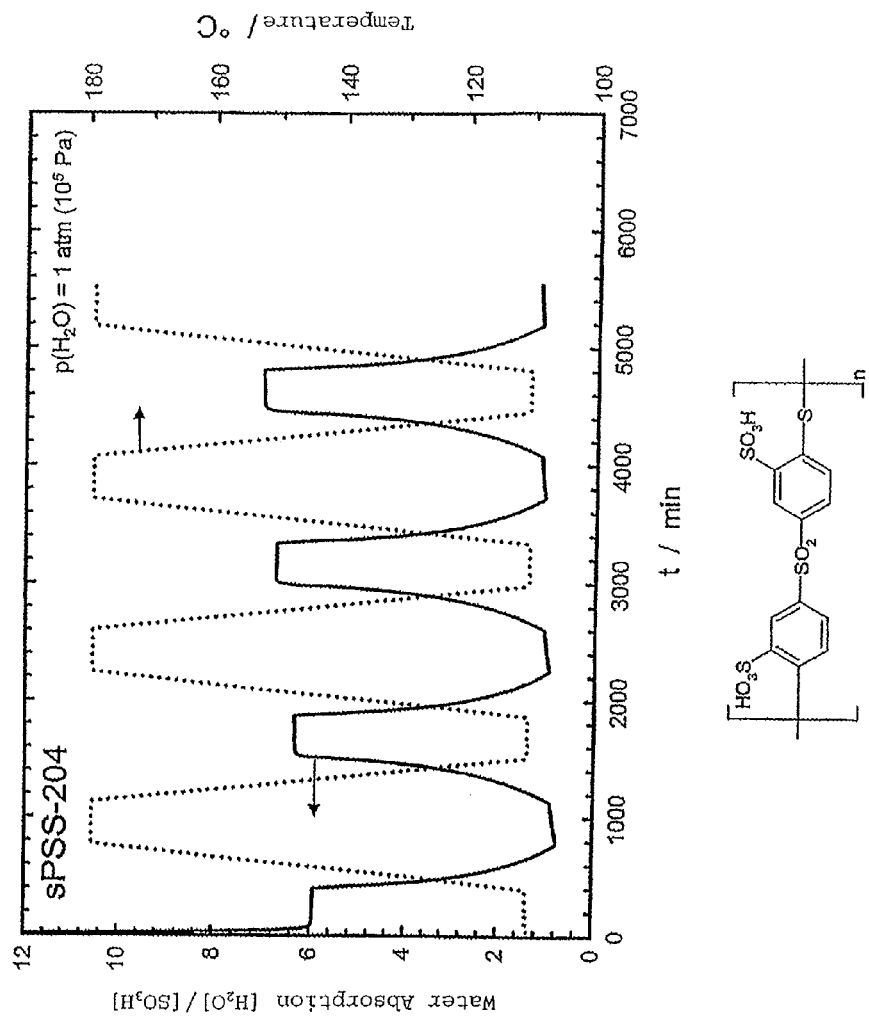
FIG. 6G shows the temperature-dependent water absorption and water desorption of a sulfonated poly(arylene sulfide sulfone) (sPS-204, n=1.0, Example 2) in a water atmosphere ($p(H_2O)=10^5$ Pa, heating and cooling rate 12° C./h). Irreversible weight changes prove the hydrolytic decomposition of the sulfonic acid at the aromate.
Figure 6H:
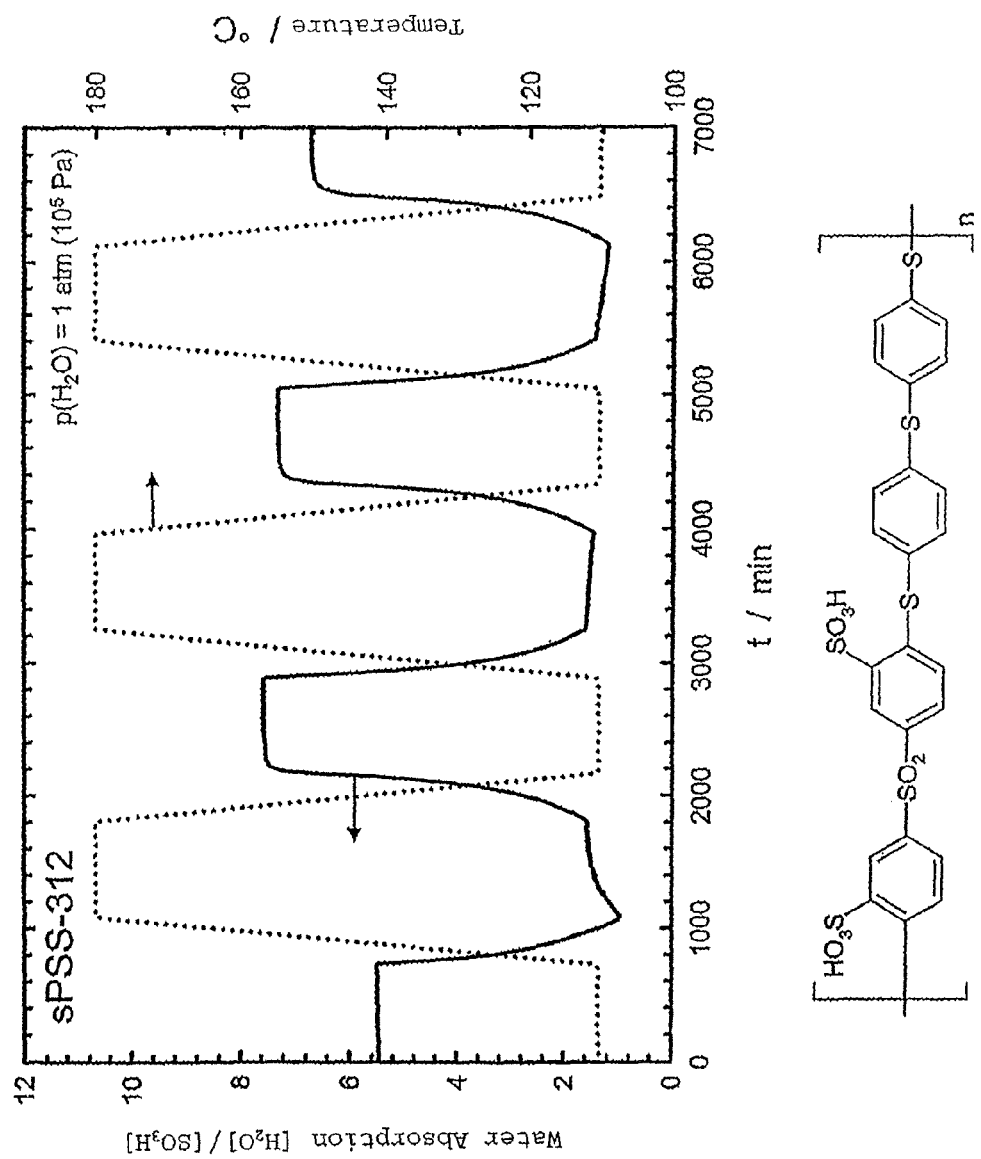
FIG. 6H shows the temperature-dependent water absorption and water desorption of a sulfonated poly(arylene sulfide sulfone) (sPS-312, n=1.0, Example 4) in a water atmosphere ($p(H_2O)=10^5$ Pa, heating and cooling rate 12° C./h). Irreversible weight changes indicate the hydrolytic decomposition of the sulfonic acid at the aromate.
Figure 6I:
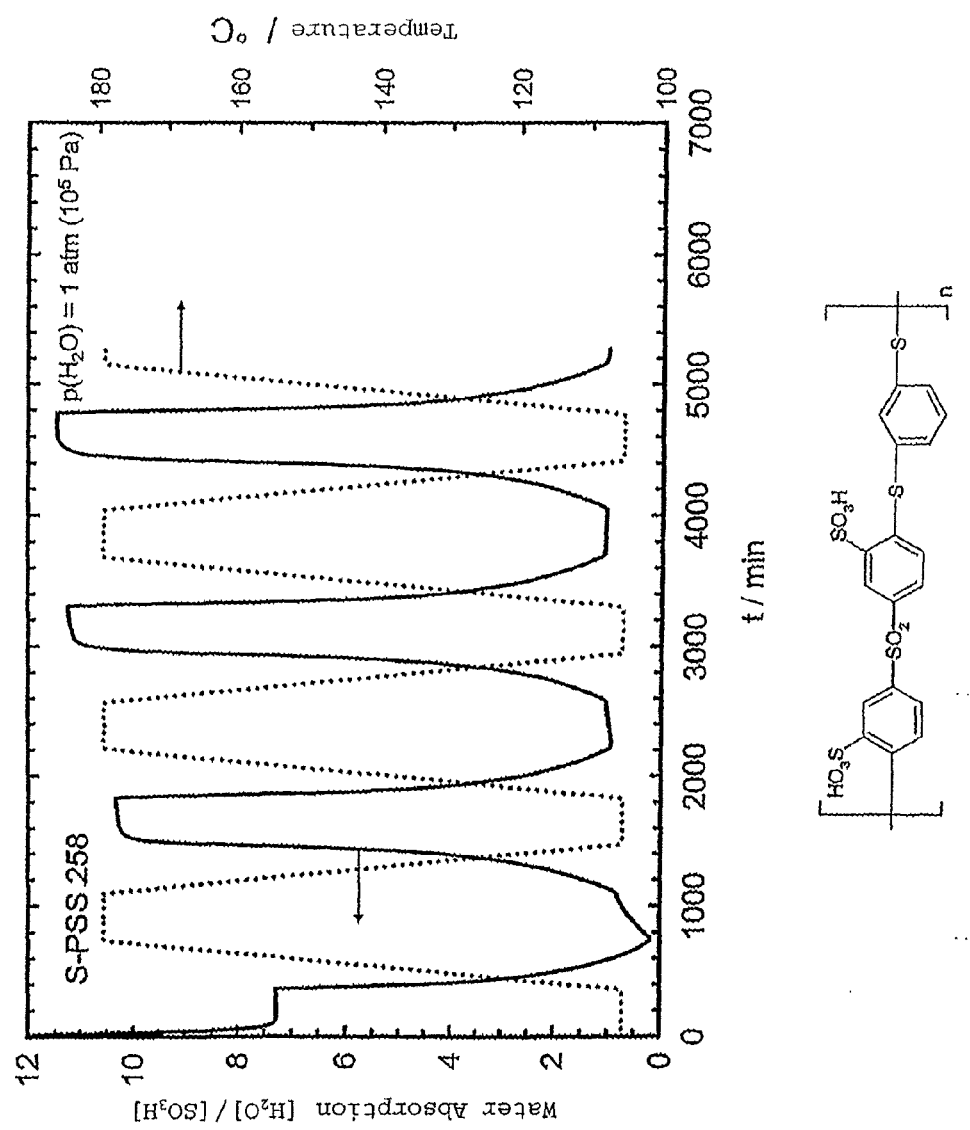
FIG. 6I shows the temperature-dependent water absorption and water desorption of a sulfonated poly(arylene sulfide sulfone) (sPS-258, n=1.0, Example 5) in a water atmosphere ($p(H_2O)=10^5$ Pa, heating and cooling rate 12° C./h). Irreversible weight changes indicate the hydrolytic decomposition of the sulfonic acid at the aromate.
Figure 6J:
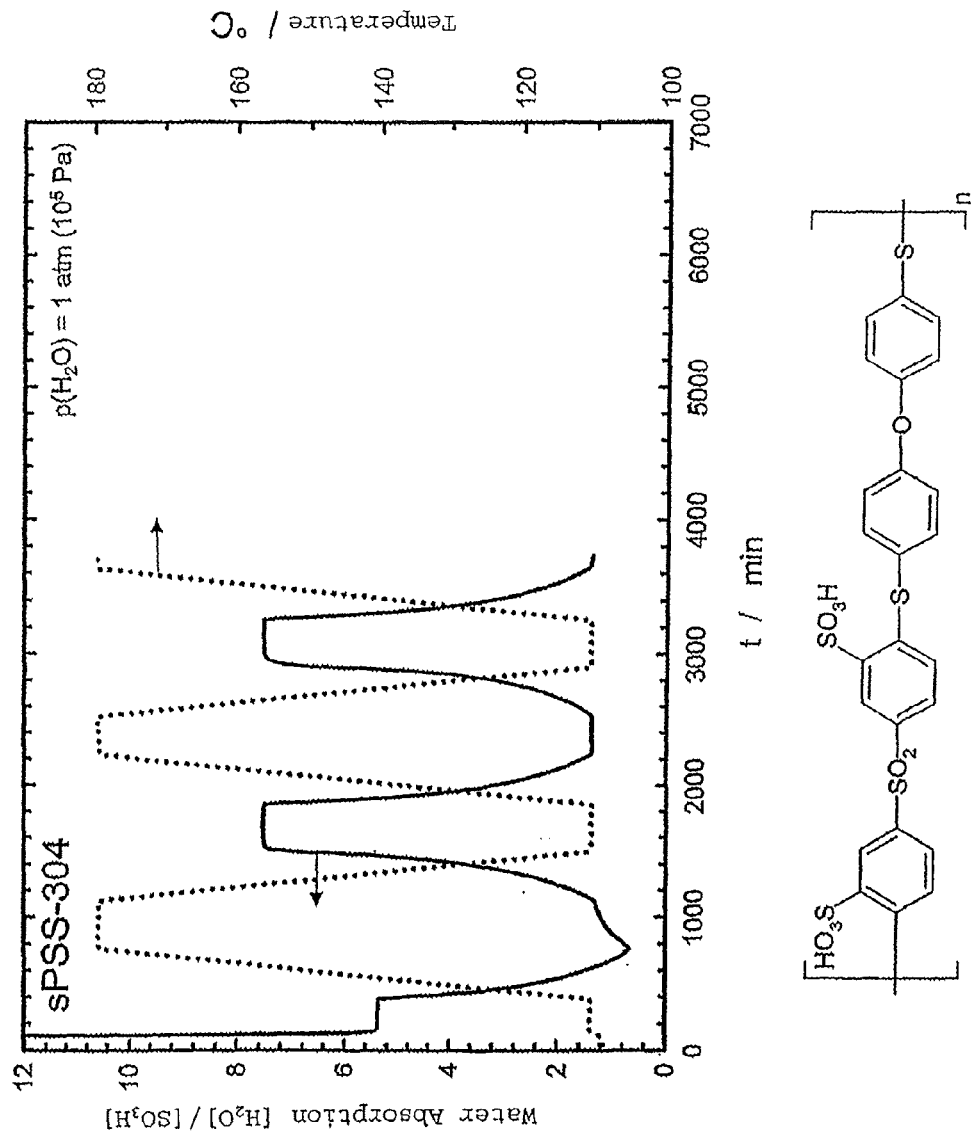
FIG. 6J shows the temperature-dependent water absorption and water desorption of a sulfonated poly(arylene sulfide sulfone) (sPS-304, n=1.0, Example 6) in a water atmosphere ($p(H_2O)=10^5$ Pa, heating and cooling rate 12° C./h). Irreversible weight changes indicate the hydrolytic decomposition of the sulfonic acid at the aromate.
Figure 7:
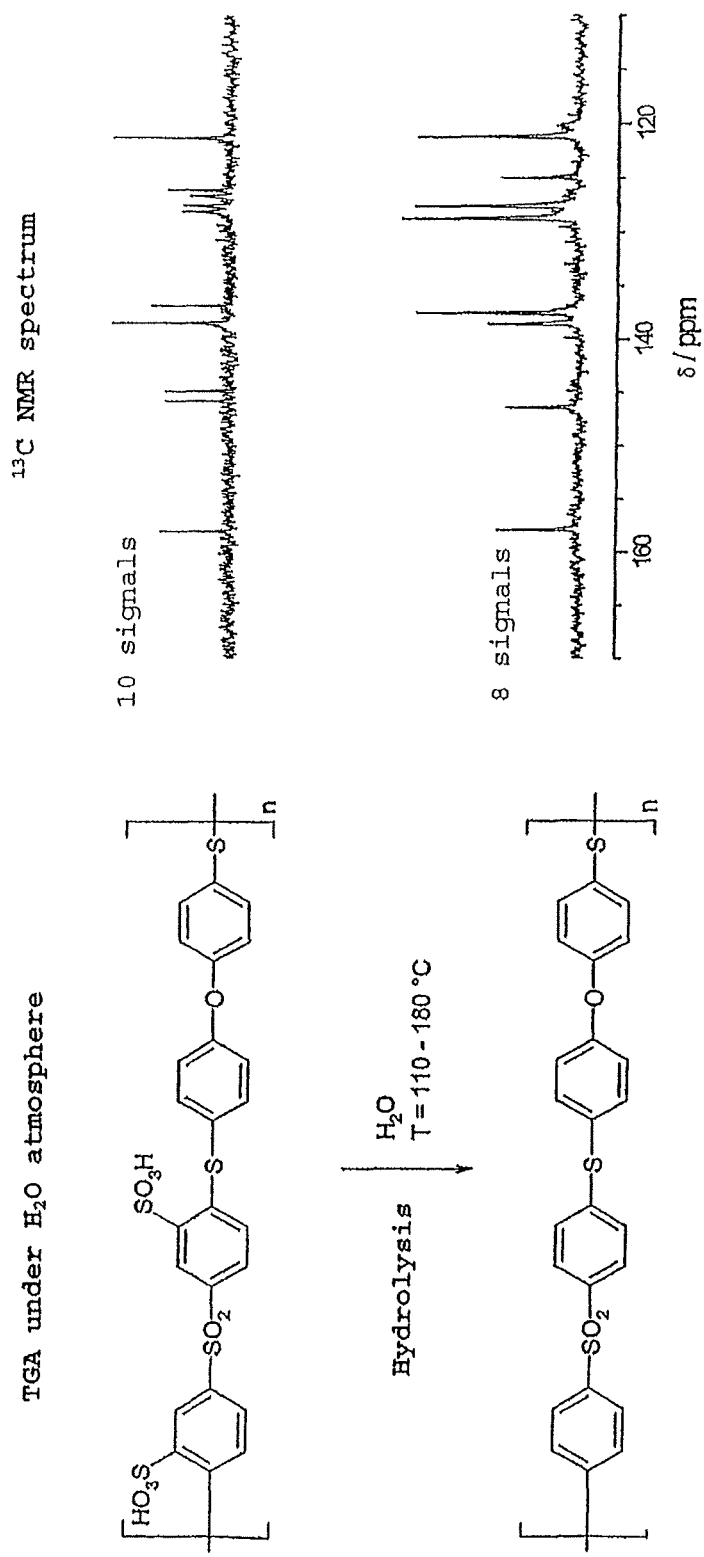
FIG. 7 shows the $^{13}$C-NMR spectra of a sample of a sulfonated poly(arylene sulfide sulfone) (sPSS-304, n=1.0, Example 6) before and after the TGA in a water atmosphere ($p(H_2O)=10^5$ Pa). The spectra indicate the quantitative separation of the sulfonic acid group of the aromate.
Figure 8:
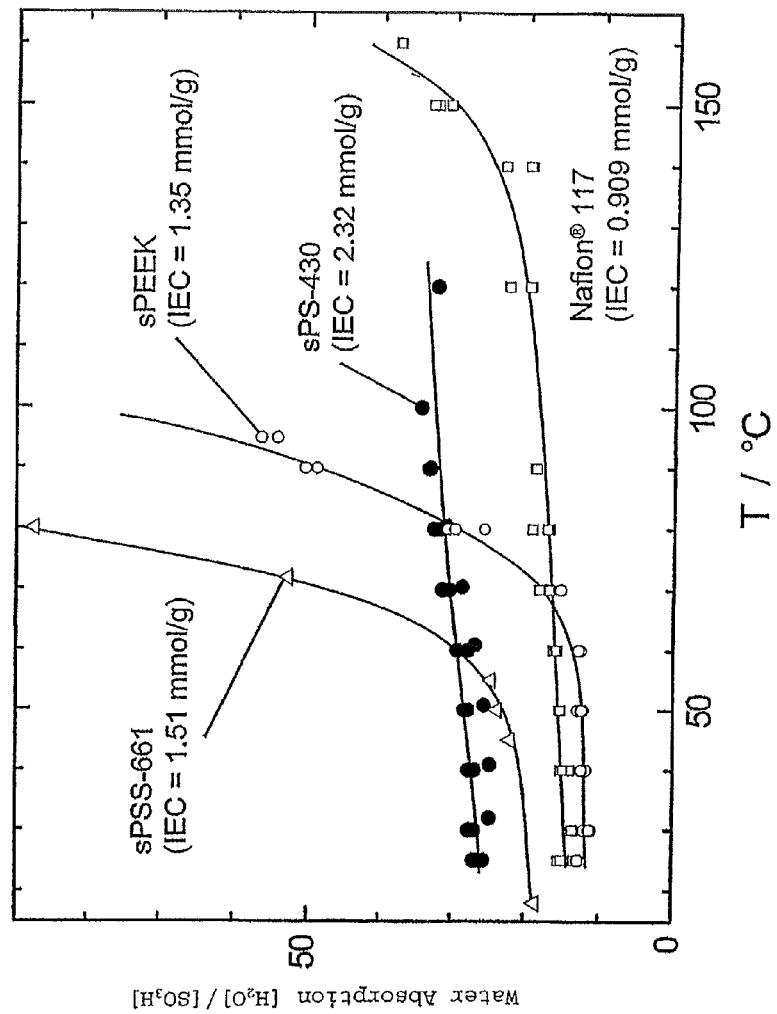
FIG. 8 shows the temperature-dependent water absorption from liquid water of a sulfonated poly(arylene sulfone) (sPS-430, n=0.8, Example 4) compared to Nafion® 117, a sulfonated poly(arylene-ether-ether-ketone) (sPEEK, IEC=1.35 mmol/g) and a sulfonated poly(arylene sulfide sulfone) known from literature (sPSS-661, n=0.4, IEC=1.51 mmol/g).

For a thermal or thermo-oxidative stability comparison, thermogravimetric analyses (TGA with 2 K/min) were performed on the sulfonated poly(arylene sulfones) and the reference polymers in a nitrogen or oxygen-containing atmosphere (20% $O_2$ and 80% $N_2$, or pure $O_2$ atmosphere). These measurements resulted in a significantly larger stability range for sulfonated poly(arylene sulfones) sPS as compared to poly(arylene sulfide sulfones) sPSS. As shown in FIG. 5A, the decomposition reaction (probably separation of sulfonic acid groups from the aromate) already starts below 250° C. for poly(arylene sulfide sulfones) sPSS, while this reaction only starts above 300° C. for sulfonated poly(arylene sulfones) sPS with comparable exchange capacities. FIG. 5A illustrates the TGA of a sulfonated poly(arylene sulfone) sPS-430 (Example 4, n=0.8) and a sulfonated poly(arylene sulfide sulfone) sPSS-312 (Example 4, n=0.8) in an oxygen-containing atmosphere. The purely thermal stability of sPS-430 (Example 4, n=0.8) in a nitrogen atmosphere is comparable to the thermo-oxidative stability or slightly higher, as is also shown in FIG. 5A.

In particular, a comparison of measurements in an inert atmosphere (nitrogen) and in an oxygen-containing atmosphere on sulfonated poly(arylene sulfide sulfones) sPSS (see FIG. 5B) shows that a transformation (oxidation) of the sulfide group into a sulfone group —$SO_2$— during the formation of pure, sulfonated poly(arylene sulfones) does not take place in a nitrogen-containing atmosphere. In an inert atmosphere, as well as in an oxygen-containing atmosphere, the decomposition of sulfonated poly(arylene sulfide sulfones) takes place at the same temperature, i.e. no stabilization effect can be observed in an oxygen-containing atmosphere when compared to an inert atmosphere. Therefore, this is not to be expected in a fuel cell either.

Even more clearly apparent is the difference between our sulfonated poly(arylene sulfones) and known sulfonated poly(arylene sulfide sulfones) [1-6] in the hydrolytic stability of the sulfonic acid group at the aromate. Through cyclic measurements between T=110° C. and 180° C. in a full water atmosphere (p($H_2O$)=$10^5$ Pa, heating and cooling rate 12° C./h), the hydrolytic stability of the sulfonic acid group at the aromate could be proven. Reversible weight changes due to water desorption and absorption during the heating and cooling phases indicate a high hydrolytic stability of the sulfonic acid group in the tested temperature range, while an irreversible weight change indicates a hydrolytic decomposition of the aromatic sulfonic acid.

Since hydrolysis produces sulfuric acid as a reaction product and the sulfuric acid is more strongly hygroscopic than the corresponding sulfonic acid at the aromate, an increasing water absorption can initially be observed; during further decomposition, a weight reduction may occur. Only PFSA polymers such as Nafion® 117 (FIG. 6A) and sulfonated poly(arylene sulfones) sPS (FIGS. 6B, 6C, 6D, 6E) are stable under these conditions, while the corresponding known sulfonated poly(arylene-ether-ether-ketones) sPEEK (FIG. 6F) and the sulfonated poly(arylene sulfide sulfones) sPSS (FIGS. 6G, 6H, 6I, 6J) [1-6] clearly show decomposition reactions. Through $^{13}$C-NMR tests, it could even be shown that a quantitative separation of the sulfonic acid groups of sulfonated poly(arylene sulfide sulfones) takes place under these reaction conditions (see FIG. 7).

Another significant difference appears in the water solubility of the sulfonated polymers. Typically, there is a clear correlation between the water solubility or swelling capacity (=water absorption) and the exchange capacity of a sulfonated polymer. Generally, the water solubility or swelling capacity of a sulfonated polymer increases with increasing exchange capacity (=ion exchange capacity, IEC). However, a high exchange capacity generally also results in a high ion conductivity. The goal, therefore, is to obtain a polymer that has the highest possible exchange capacity while at the same time being water-insoluble or not swelling too strongly. A comparison between sulfonated poly(arylenes) shows that the water solubility of sulfonated poly(arylene sulfones) as compared with sulfonated poly(arylene sulfide sulfones), sulfonated poly(arylene ether sulfones), sulfonated poly(arylene ether ketones) and sulfonated poly(arylene sulfides) with comparable exchange capacities is significantly reduced. Thus, sulfonated poly(arylene ether ketones) and poly (arylene sulfide sulfones), with an IEC of more than approximately 1.8-2.0 mmol/g, are nearly completely water-soluble (see polymers sPSS-312 (n=1.0) and sPSS-370 (n=0.8) in Example 4), and/or also show excessive swelling with lower IECs in the range between 1.3-1.7 mmol/g starting at a temperature of about 50-70° C. (see FIG. 8).

Figure 9:
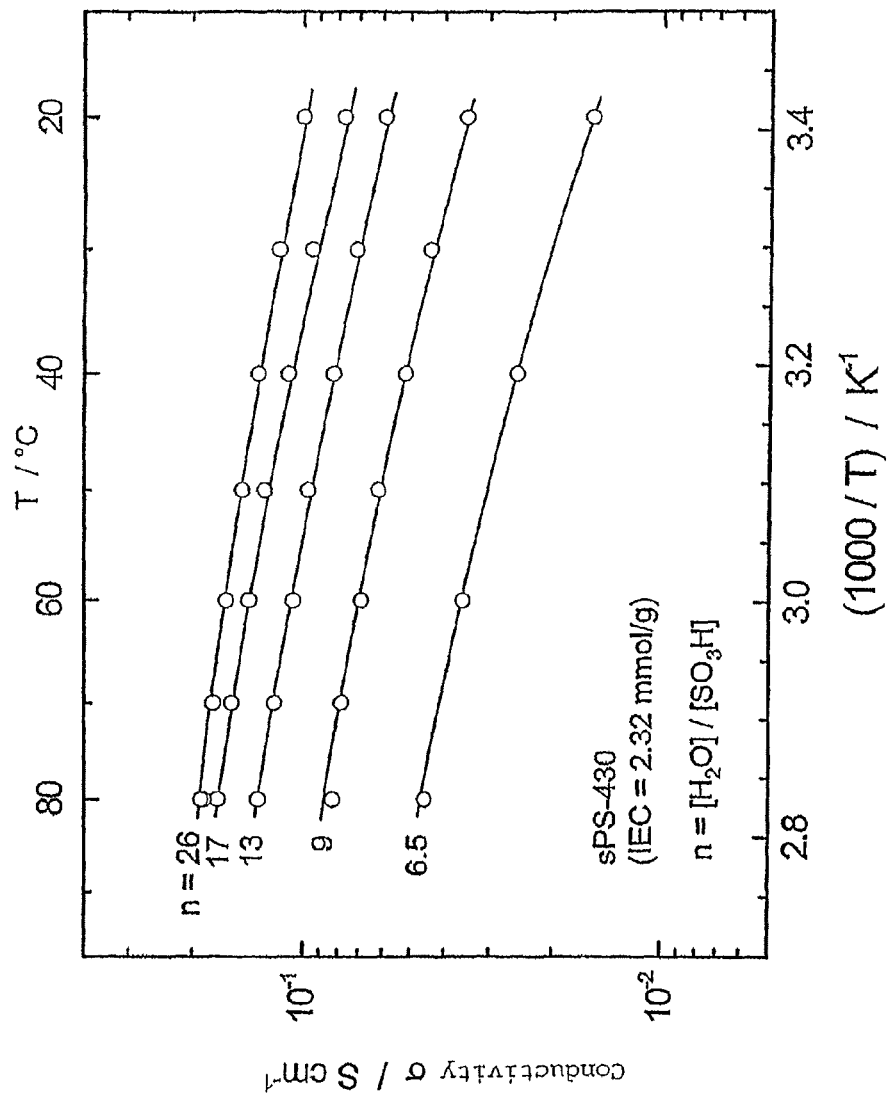
FIG. 9 shows the temperature- and swelling-dependent proton conductivity of a sulfonated poly(arylene sulfone) (sPS-430, n=0.8, Example 4), measured by impedance spectroscopy.
Figure 10:
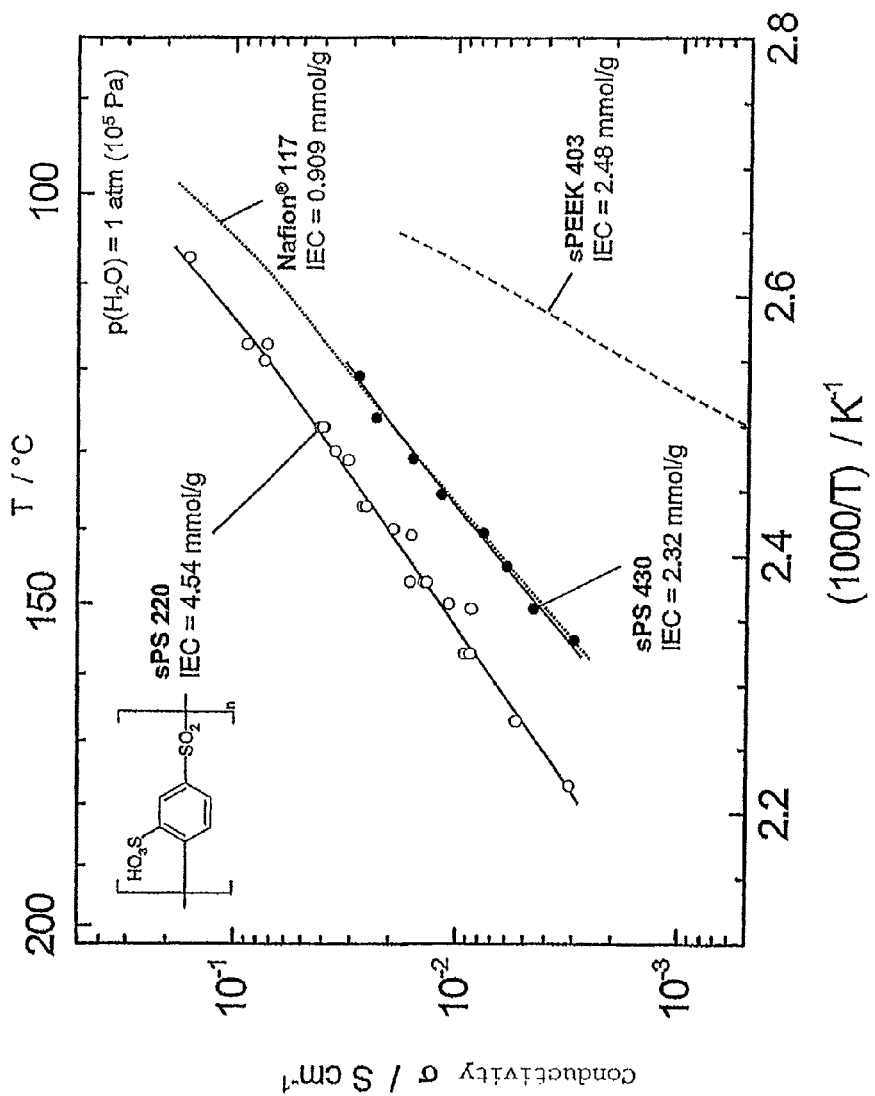
FIG. 10 shows the temperature-dependent proton conductivity of two sulfonated poly(arylene sulfones) (sPS-220, n=1.0, Example 2, and sPS-430, n=0.8, Example 4) compared to Nafion® 117 and a sulfonated poly(arylene-ether-ether-ketone) sPEEK, measured in a water atmosphere ($p(H_2O)=10^5$ Pa) by impedance spectroscopy.
Figure 11:
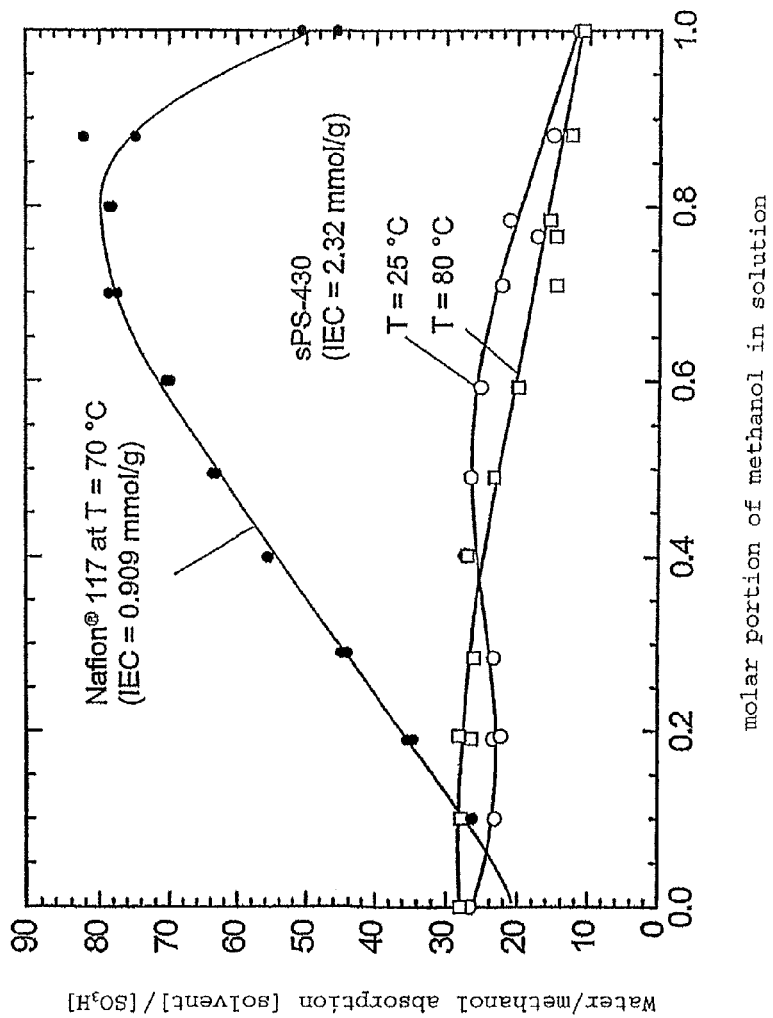
FIG. 11 shows the temperature- and mole-fraction-dependent swelling of a sulfonated poly(arylene sulfone) (sPS-430, n=0.8, Example 4) in water/methanol compounds compared to Nafion® 117.

These polymers are therefore virtually useless for a fuel cell application or other applications in case of a high IEC or high temperatures: By contrast, analog polysulfones are water-insoluble even with an IEC of 2.5 mmol/g and above. In addition, they exhibit a nearly constant swelling behavior in water with temperatures up to 120° C. with average exchange capacities (<2.5 mmol/g) and high molecular weights (see FIG. 8), approximately comparable to Nafion® 117, which makes them interesting for applications in a broad temperature range up to far above 100° C. A significant advantage of the sulfonated poly(arylene sulfones) is thus presented by their potentially high exchange capacity and the associated high proton conductivity with simultaneous water-insolubility and low swelling rate in water. High proton conductivities in liquid water (□=130 mS/cm at 25° C.) could be measured for the polymer sPS-430 (Example 4, n=0.8) by impedance spectroscopy; FIG. 9 also shows the temperature- and swelling-dependent conductivity data of sPS-430 (Example 4, n=0.8). Conductivities at T>100° C. in a water atmosphere also show comparable to better results as compared with Nafion® 117 as a reference polymer (see FIG. 10), as well as clearly improved conductivities compared to sulfonated poly(arylene-ether-ether-ketones) sPEEK.

Another difference appears in the swelling and solubility of sulfonated poly(arylene sulfones) in water/methanol compounds. PFSA (=perfluoro sulfonic acid) membranes, such as Nafion® or sulfonated poly(arylene sulfide sulfones) swell very strongly in methanol solutions; sulfonated poly(arylene sulfide sulfones) even become methanol-soluble with higher exchange capacities (see sPSS-312 (n=1.0) and sPSS-370 (n=0.8) in Example 4). By contrast, sulfonated poly(arylene sulfones) in methanol/water compounds show a significantly lower swelling even with high methanol concentrations and high temperatures (demonstrated on sPS-430 in Example 4, n=0.8, see FIG. 11), which also makes them very interesting for direct methanol fuel cells (DMFC). Compared to a Nafion® 117 membrane, the methanol flow through the membrane is also reduced by approximately half (with identical thickness), measured with a diffusion cell at 60° C. (half cells: 1 M methanol solution—water).

In addition, other interesting characteristics, such as a high ion permselectivity, can also be expected, which opens an application of these polymers up for various electromembrane processes. Thus, sulfonated poly(arylene sulfones) can be used for electrodialysis, Donnan dialysis and electrolysis. The high chemical and hydrolytic stability also facilitates their use in water electrolysis. Due to the possibility of producing membranes with very high exchange capacities and therefore charge densities, other interesting fields of application can be expected. For example, membranes made of hydrolytically stable poly(arylene sulfones) are also suitable for the humidification and dehumidification of gases. This property is as important for anode and cathode gas humidification as for simple applications such as air conditioning, especially in low-energy households. Furthermore, highly charged cation exchange membranes are suitable for electromagnetic screening, particularly in the GHz range, especially for WLAN applications. In addition, transparent films of highly charged sulfonated poly(arylene sulfones) can be used in the electrostatic coating of screens, especially LCD displays, for example laptops.

It has also been shown that a synthesis of sulfonated poly (arylene sulfones) via already sulfonated monomers with subsequent oxidation is preferable to an oxidation of already sulfonated poly(arylene sulfides). The latter method results in materials that have significantly worse coat-forming properties. (see Example 11).

A similar result can be observed in the oxidation of poly (p-phenylene sulfides) with $H_2O_2$ in concentrated sulfuric acid, as described in the patent by J. Studinka, R. Gabler, Polyarylene sulphonates from sulphonated polyarylene sulphide by two-stage oxidation in acid medium DE 1938806A1 (1970) [7]. This involves formation of a material insoluble in all known solvents, as well as infusible and, therefore, cannot be thermally processed. Even if one assumes a sulfonation of the aromate through the use of concentrated sulfuric acid during oxidation, any coat-forming properties are lost. Moreover, the possibility of achieving higher exchange capacities (>0.1 mmol/g) by this method can be virtually excluded. The production of sulfonated poly(arylene sulfones) through the polymerization of already sulfonated monomers with subsequent oxidation is preferred to the sulfonation of an already existing poly(arylene sulfide) with subsequent or simultaneous oxidation.

The following examples are to illustrate our sulfonated poly(arylenes), copolymers and methods in more detail, without limiting the disclosure to these examples.

Example 1

Production of a Bifunctional Sulfonated Aryl Monomer a) Disodium-3,3'-disulfonate-4,4'-dichlorodiphenyl-sulfone (DSDCS)

In a flask provided with a cooler, 4,4'-dichlorodiphenylsulfone (30 g, 0.104 mol, Aldrich) and oleum (60 mL, 60% $SO_3$ in $H_2SO_4$, Aldrich) were heated to 110° C. and agitated for 12 h. After cooling the reaction mixture to room temperature, it was poured into 1000 mL of ice water. Then, sodium chloride (350 g) was added to precipitate the product. The white precipitate was obtained through filtration and dissolved again in 800 mL of water. After neutralizing the solution with NaOH, the product was once again precipitated with sodium chloride (200 g), filtrated and purified by means of recrystallization from a water/isopropanol mixture (2:8). Finally, the white product was vacuum-dried at 50° C. for 24 h ($2 \cdot 10^{-3}$ mbar). The yield was 30.5 g (59%) of disodium-3,3'-disulfonate-4, 4'-dichloro-diphenyl-sulfone-monohydrate. The water content was dependent on the drying conditions and was determined by means of $^1$H-NMR and elementary analysis.

$^1$H-NMR (300 MHz, DMSO-$d_6$): δ=8.24 (d, 2H, CH, J=2.4 Hz), 7.77 (dd, 2H, CH, J=2.4, 8.3 Hz), 7.58 (d, 2H, CH, J=8.3 Hz), 3.24 (s, 2H, $H_2O$), $^{13}$C-NMR (75.5 MHz, DMSO-$d_6$): δ=141.6 (s), 138.3 (s), 138.0 (s), 133.5 (s), 131.6 (s), 128.3 (s).

b) Disodium-3,3'-disulfonate-4,4'-difluorodiphenyl-sulfone (DSDFS)

This compound was produced analog to disodium-3,3'-disulfonate-4,4'-dichlorodiphenylsulfone (DSDCS) as a monohydrate to trihydrate (depending on the drying conditions). $^1$H-NMR (300 MHz, DMSO-$d_6$): δ=8.06 (dd, 2H, CH, $J_{HH}$=2.5 Hz, $J_{HF}$=6.4 Hz), 7.87 (ddd, 2H, CH, $J_{HH}$=2.6, 8.7 Hz, $J_{HF}$=4.3 Hz), 7.32 (dd, 2H, CH, $J_{HH}$=8.8 Hz, $J_{HF}$=9.2 Hz), 3.23 (s, 2H, $H_2O$); $^{13}$C NMR (75.5 MHz, DMSO-$d_6$):

δ=162.1 (d, $J_{CF}$=259.2 Hz), 137.4 (d, $J_{CF}$=18.9 Hz), 136.7 (d, $J_{CF}$=2.0 Hz), 131.5 (d, $J_{CF}$=10.0 Hz), 128.9 (d, $J_{CF}$=4.6 Hz), 119.0 (d, $J_{CF}$=24.6 Hz).

Instead of the sodium salt of the sulfonated monomers, the corresponding potassium salt was also produced and used for polymerizations.

Example 2

Production of poly(sulfonic acid 1,4-phenylene sulfone)

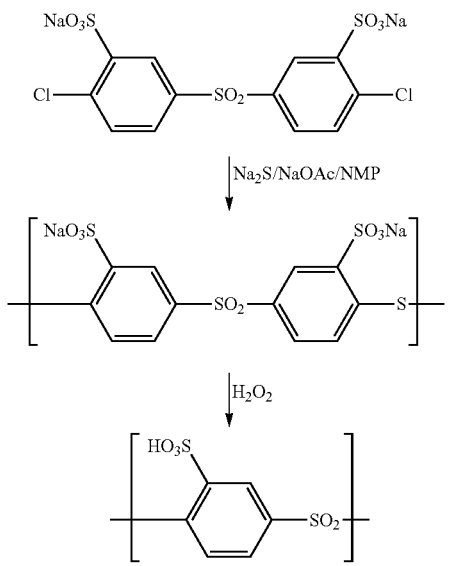

I. Polymerization:

Sulfonated poly(1,4-phenylene-sulfone-1,4-phenylene-sulfide): The polymerization was carried out in a heated 100 mL round flask filled with argon and equipped with an argon inlet, a magnetic agitator and a Dean-Stark trap provided with a cooler. 3.8591 g (7.578 mmol) of disodium-3,3'-disulfonate-4,4'-dichloro-diphenyl-sulfone-monohydrate (M=509.25 g/mol), 0.5914 g (7.578 mmol) of sodium sulfide ($Na_2S$) and 0.6216 g (7.578 mmol) of dried sodium acetate were filled into this flask. This mixture was vacuum-dried for 2 h at 100° C. (2·10$^{-3}$ mbar). Then, 20 ml of dried 1-methyl-2-pyrrolidone (NMP) and 35 ml of dried toluene were added under argon, and the reaction mixture was heated in an oil bath for 4 h until it had reached 145° C., in order to remove all traces of water (dehydrator). The toluene was then removed by draining the Dean-Stark trap (distilled) and the reaction was continued for 18 h at 190° C. After cooling it to room temperature, the black suspension was slowly dripped into isopropanol (800 mL) to precipitate the polymer. The gray precipitate was filtrated and rinsed with isopropanol. The product was then dissolved again in 50 mL of water (black solution), once again precipitated in isopropanol (800 mL), filtrated and rinsed with isopropanol and vacuum-dried (2·10$^{-3}$ mbar). To remove all byproducts, the polymer was purified using 24-hour dialysis (dialysis tube by Sigma-Aldrich, molecular weight exclusion=8000); after removing the solvent and vacuum-drying at 50° C. (2·10$^{-3}$ mbar), a dark brown solid (4.346 g, M=452.39 g/mol Na$^+$-form=9.62 mmol, M=596.51 g/mol Na$^+$-form and 4$H_2O$/$SO_3H$=7.286 mmol, M=408.43 g/mol H$^+$-form) was obtained. A portion of the sodium salt (approx. 0.2 g) was transformed by an ion exchanger (Dowex® Marathon® C) into the H$^+$-form.

Solubility:
Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, acetone, ethyl acetate, trifluoroacetic acid.

Exchange Capacity:
experimental: 4.890 mmol/g (204.50 g/mol) for H$^+$-form
theoretical: 4.500 mmol/g (222.24 g/mol) assumption: 1.0$H_2O$/$SO_3H$
theoretical: 4.897 mmol/g (204.22 g/mol) assumption: 0.0$H_2O$/$SO_3H$ Density: 1.6601 g/cm$^3$ for H$^+$-form $^1$H-NMR (300 MHz, DMSO-d$_6$): δ=8.20 (d, 2H, CH, $J_{HH}$=1.7 Hz), 7.70 (dd, 2H, CH, $J_{HH}$=1.9, 8.0 Hz), 7.18 (d, 2H, CH, $J_{HH}$=8.3 Hz), 3.24 (s, 20H, $H_2O$).

$^{13}$C-NMR (75.5 MHz, DMSO-d$_6$): δ=148.6 (s), 141.6 (s), 139.0 (s), 135.0 (s), 129.1 (s), 127.1 (s).

Molecular Weight:
$M_n$=1672, $M_w$=2767 g/mol, D=1.6551 (batch 41, GPC)
$M_n$=46832, $M_w$=81145 g/mol, D=1.7327 (batch 19, GPC)

II. Oxidation:

Sulfonated poly(1,4-phenylene-sulfone): 4.34 g (9.62 mmol) of poly(sodium-sulfonate-phenylene-thio-sulfone) were dissolved in 50 mL of concentrated sulfuric acid, yielding a dark brown solution. Hydrogen peroxide (4.5 ml of 36% $H_2O_2$ in water, approx. 45 mmol $H_2O_2$) was slowly added. Then the reaction mixture was agitated for 2 days at room temperature. After diluting the mixture with 200 mL of water, the sulfuric acid was removed by means of dialysis (dialysis tube by Sigma-Aldrich, molecular weight exclusion=3000). The water was removed using a rotary evaporator and the product vacuum-dried at 50° C. (2·10$^{-3}$ mbar). The yield was 2.3 g (5.22 mmol, M=440.42 g/mol) of a slightly brown-colored polymer.

Solubility:
Soluble in water, dimethyl sulfoxide (DMSO), dimethylformamide (DMF), 1-methyl-2-pyrrolidone (NMP), N,N'-dimethyl acetamide (DMAc); insoluble in aqueous 1M-NaCl solution, methanol, ethanol, isopropanol, toluene, tetrahydrofuran (THF), chloroform, acetone, ethyl acetate, trifluoroacetic acid.

Exchange Capacity:
experimental: 4.270 mmol/g (234.19 g/mol) for H$^+$-form
theoretical: 4.198 mmol/g (238.22 g/mol) assumption: 1.0$H_2O$/$SO_3H$
theoretical: 4.541 mmol/g (220.21 g/mol) assumption: 0.0$H_2O$/$SO_3H$ Density: 1.745 g/cm$^3$ for H$^+$-form Analysis:
experimental: C: 24.25; H: 3.84; S: 20.85, Cl: 0.70
theoretical: C: 32.72; H: 1.83; S: 29.11, Cl: 0.00 with 0.0$H_2O$/$SO_3H$
theoretical: C: 23.91; H: 4.35; S: 21.28, Cl: 0.00 with 4.5$H_2O$/$SO_3H$
theoretical: C: 23.73; H: 4.32; S: 21.11, Cl: 0.78 with 4.5$H_2O$/$SO_3H$ and
polymerization rate=30, Cl end groups $^1$H-NMR (300 MHz, DMSO-d$_6$): δ=8.32 (s, 2H, CH), 8.19 (d, 2H, CH, $J_{HH}$=8.2 Hz), 7.99 (d, 2H, CH, $J_{HH}$=8.4 Hz), between 6 and 4 ppm (br s, $SO_3H$×n $H_2O$, depending on water content). $^{13}$C-NMR (75.5 MHz, DMSO-$d_6$): δ=147.7 (s), 144.0 (s), 143.3 (s), 133.1 (s), 128.9 (s), 128.5 (s).

Example 3

Synthesis of a poly(sulfonic acid phenylene sulfone) with variable exchange capacity: Sulfonated poly(1,4-phenylene-sulfone) with n=0.7 and 0.8 was continued for 19 h at 180° C. After cooling it to room temperature, the dark purple suspension was slowly dripped into isopropanol (600 mL) to precipitate the polymer. The gray precipitate was filtrated and rinsed with isopropanol. The product was then dissolved again in 50 mL of water (dark brown solution), once again precipitated in isopropanol (800 mL), filtrated and rinsed with isopropanol and vacuum-dried ($2 \cdot 10^{-3}$ mbar). To remove all byproducts, the polymer was

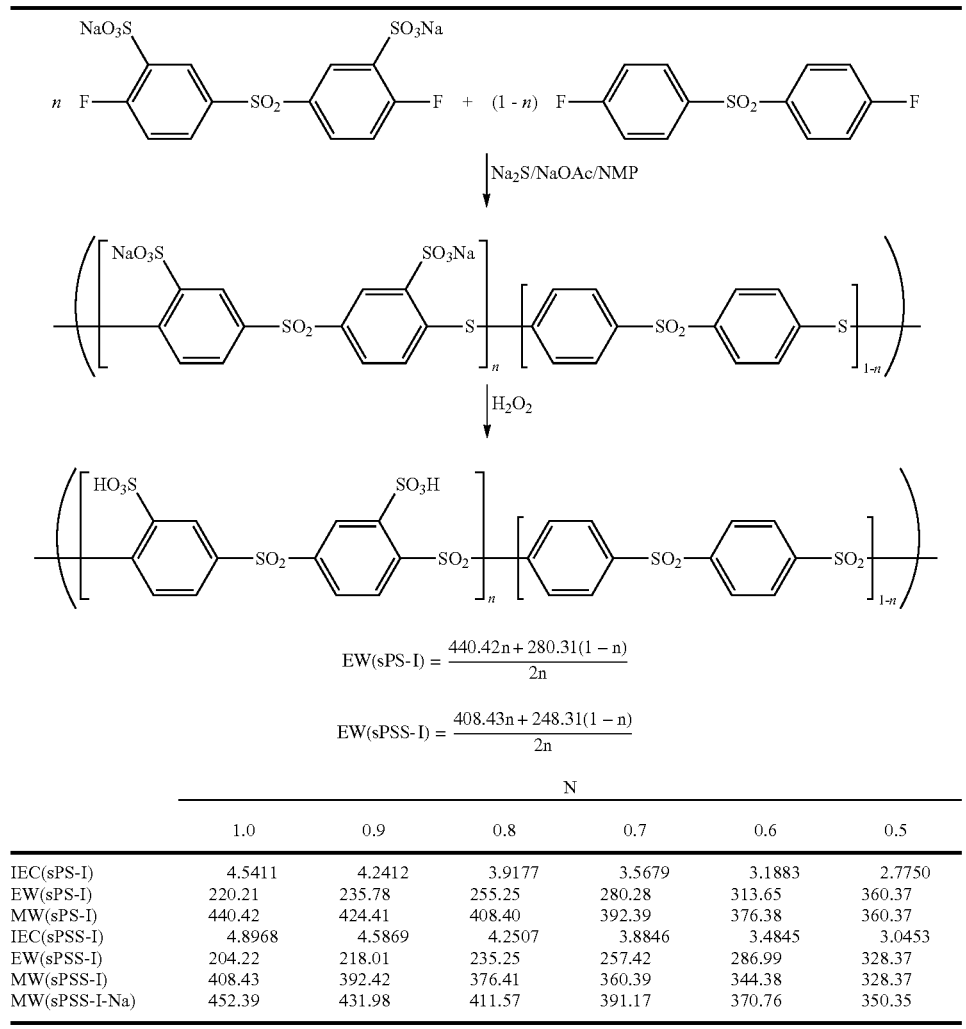

$$EW(sPS\text{-}I) = \frac{440.42n + 280.31(1-n)}{2n}$$

$$EW(sPSS\text{-}I) = \frac{408.43n + 248.31(1-n)}{2n}$$

| | N | | | | | |
|---|---|---|---|---|---|---|
| | 1.0 | 0.9 | 0.8 | 0.7 | 0.6 | 0.5 |
| IEC(sPS-I) | 4.5411 | 4.2412 | 3.9177 | 3.5679 | 3.1883 | 2.7750 |
| EW(sPS-I) | 220.21 | 235.78 | 255.25 | 280.28 | 313.65 | 360.37 |
| MW(sPS-I) | 440.42 | 424.41 | 408.40 | 392.39 | 376.38 | 360.37 |
| IEC(sPSS-I) | 4.8968 | 4.5869 | 4.2507 | 3.8846 | 3.4845 | 3.0453 |
| EW(sPSS-I) | 204.22 | 218.01 | 235.25 | 257.42 | 286.99 | 328.37 |
| MW(sPSS-I) | 408.43 | 392.42 | 376.41 | 360.39 | 344.38 | 328.37 |
| MW(sPSS-I-Na) | 452.39 | 431.98 | 411.57 | 391.17 | 370.76 | 350.35 |

I. Polymerization (n=0.7):

Sulfonated poly(1,4-phenylene-sulfone-1,4-phenylene-sulfide): The polymerization was carried out in a heated 100 mL round flask filled with argon and equipped with an argon inlet, a magnetic agitator and a Dean-Stark trap provided with a cooler. 3.8233 g (8.026 mmol, M=476.34 g/mol) of disodium-3,3'-disulfonate-4,4'-difluorodiphenylsulfone-monohydrate, 0.9299 g (3.657 mmol, M=254.25 g/mol) of 4,4'-difluorodiphenylsulfone, 0.8948 g (11.466 mmol) of sodium sulfide ($Na_2S$) and 0.958 g (11.466 mmol) of dried sodium acetate were filled into this flask. This mixture was vacuum-dried for 2 h at 70° C. ($2 \cdot 10^{-3}$ mbar). Then, 20 ml of dried 1-methyl-2-pyrrolidone (NMP) and 40 ml of dried toluene were added under argon, and the reaction mixture was heated in an oil bath for 2 h until it had reached 140° C., to remove all traces of water (dehydrator). The toluene was then removed by draining the Dean-Stark trap (distilled) and the reaction was continued for 19 h at 180° C. After cooling it to room temperature, the dark purple suspension was slowly dripped into isopropanol (600 mL) to precipitate the polymer. The gray precipitate was filtrated and rinsed with isopropanol. The product was then dissolved again in 50 mL of water (dark brown solution), once again precipitated in isopropanol (800 mL), filtrated and rinsed with isopropanol and vacuum-dried ($2 \cdot 10^{-3}$ mbar). To remove all byproducts, the polymer was purified using 24-hour dialysis (dialysis tube by Sigma-Aldrich, molecular weight exclusion=3000); after removing the solvent and vacuum-drying at 50° C. ($2 \cdot 10^{-3}$ mbar), a dark brown solid (3.80 g, M=391.17 g/mol $Na^+$-form=9.71 mmol) was obtained.

Solubility:

Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, acetone.

$^1$H-NMR (300 MHz, DMSO-$d_6$): δ=8.21 (d, 2H, CH, $J_{HH}$=1.6 Hz), 7.83 (br d, 1.6H, CH, $J_{HH}$=6.7 Hz), 7.70 (d, 2H, CH, $J_{HH}$=8.4 Hz), 7.45 (d, 1.6H, CH, $J_{HH}$=6.7 Hz), 7.17 (d, 2H, CH, $J_{HH}$=8.4 Hz), 3.25 (br s, 6H, $H_2O$).

$^{13}$C-NMR (75.5 MHz, DMSO-$d_6$): δ=148.6 (s), 141.6 (s), 141.3 (s), 140.5 (s), 139.0 (s), 135.0 (s), 132.1 (s), 129.4 (s), 129.0 (s), 127.1 (s).

Molecular weight: $M_n$=19612, $M_w$=27043 g/mol, D=1.3789 (GPC) for Na$^+$-form II. Oxidation (n=0.7):

Sulfonated poly(1,4-phenylene-sulfone): 2.188 g (approx. 5.59 mmol) of poly(sodium-sulfonate-phenylene-thio-sulfone) from the above reaction were dissolved in 50 mL of concentrated sulfuric acid, yielding a brown solution. Hydrogen peroxide (4.0 ml of 36% $H_2O_2$ in water, approx. 40 mmol $H_2O_2$) was slowly added. Then the reaction mixture was agitated for 2 days at room temperature. After diluting the mixture with 250 mL of water, the sulfuric acid was removed by dialysis (dialysis tube by Sigma-Aldrich, molecular weight exclusion=3000). The water was removed using a rotary evaporator and the product vacuum-dried at 50° C. ($2 \cdot 10^{-3}$ mbar). The yield was 1.93 g (M=392.39 g/mol H$^+$-form=4.92 mmol) of a slightly yellowish polymer.

Solubility:
Soluble in water, dimethyl sulfoxide (DMSO), dimethylformamide (DMF), 1-methyl-2-pyrrolidone (NMP), N,N'-dimethyl acetamide (DMAc); insoluble in methanol, ethanol, isopropanol, toluene, tetrahydrofuran (THF), chloroform, acetone.

Exchange Capacity:
experimental: 3.260 mmol/g (306.75 g/mol) for H$^+$-form
theoretical: 3.161 mmol/g (316.31 g/mol) assumption: 2.0$H_2O/SO_3H$
theoretical: 3.568 mmol/g (280.27 g/mol) assumption: 0.0$H_2O/SO_3H$ Density: 1.6835 g/cm$^3$ for H$^+$-form Analysis:
experimental: C: 29.92; H: 3.41; S: 22.80 for H$^+$-form
theoretical: C: 36.73; H: 2.05; S: 27.77 with 0.0$H_2O/SO_3H$
theoretical: C: 29.21; H: 3.92; S: 22.09 with 4.0$H_2O/SO_3H$ $^1$H-NMR (300 MHz, DMSO-d$_6$): δ=8.29 (br s and br d, together 4H, CH), 8.08 (m, 0.6H, CH), 7.97 (d, 2H, CH, $J_{HH}$=8.4 Hz), 7.85 (m, 0.6H, CH), 6.35 (br s, 12H, SO$_3$H×n $H_2O$).

$^{13}$C-NMR (75.5 MHz, DMSO-d$_6$): δ=147.9 (s), 144.1 (s), 143.2 (s), 133.5 (s), 130.2 (weak s), 129.8 (weak s), 128.7 (s), 128.0 (s).

Molecular weight: $M_n$=33362, $M_w$=61256 g/mol, D=1.8361 (GPC) for H$^+$-form

I. Polymerization (n=0.8):

Sulfonated poly(1,4-phenylene-sulfone-1,4-phenylene-sulfide): The polymerization was carried out in a heated 100 mL round flask filled with argon and equipped with an argon inlet, a magnetic agitator and a Dean-Stark trap provided with a cooler. 3.6073 g (7.040 mmol) of disodium-3,3'-disulfonate-4,4'-difluoro-diphenyl-sulfone-trihydrate, 0.4475 g (1.760 mmol) of 4,4'-difluorodiphenylsulfone, 0.6868 g (8.801 mmol) of sodium sulfide (Na$_2$S) and 0.7938 g (9.680 mmol) of dried sodium acetate were filled into this flask. This mixture was vacuum-dried for 2 h at 70° C. ($2 \cdot 10^{-3}$ mbar). Then, 18 ml of dried 1-methyl-2-pyrrolidone (NMP) and 40 ml of dried toluene were added under argon, and the reaction mixture was heated in an oil bath for 12 h until it had reached 145° C., to remove all traces of water (dehydrator). The toluene was then removed by draining the Dean-Stark trap (distilled) and the reaction was continued for 24 h at 175° C. After cooling it to room temperature, the black suspension was slowly dripped into isopropanol (600 mL) to precipitate the polymer. The gray precipitate was filtered out and rinsed with isopropanol. The product was then dissolved again in 50 mL of water (black solution), once again precipitated in isopropanol (800 mL), filtered out and rinsed with isopropanol and vacuum-dried ($2 \cdot 10^{-3}$ mbar). To remove all byproducts, the polymer was purified using 12-hour dialysis (dialysis tube by Sigma-Aldrich, molecular weight exclusion=8000); after removing the solvent and vacuum-drying at 50° C. ($2 \cdot 10^{-3}$ mbar), a dark brown solid (2.69 g, M=411.57 g/mol Na$^+$-form=6.54 mmol) was obtained.

Solubility:
Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, acetone.

$^1$H-NMR (300 MHz, DMSO-d$_6$): δ=8.23 (s, 2H, CH), 7.83 (s, 1H, CH), 7.71 (d, 2H, CH), 7.45 (s, 1H, CH), 7.17 (d, 2H, CH), 3.33 (br s, $H_2O$).

$^{13}$C-NMR (75.5 MHz, DMSO-d$_6$): δ=148.6 (s), 141.6 (s), 141.0 (s), 140.4 (s), 139.0 (s), 135.0 (s), 132.1 (s), 129.4 (s), 129.1 (s), 127.1 (s).

II. Oxidation (n=0.8):

Sulfonated poly(1,4-phenylene-sulfone): 2.26 g (approx. 5.49 mmol) of poly(sodium-sulfonate-phenylene-thio-sulfone) from the above reaction were suspended in 30 mL of pure acetic acid, and then 10 mL of concentrated sulfuric acid added. Hydrogen peroxide (2.5 ml of 36% $H_2O_2$ in water, approx. 25 mmol $H_2O_2$) was slowly added. Then, the reaction mixture was agitated for 24 h at 55° C. After diluting the mixture with 200 mL of pure acetic acid, the colorless, slightly yellowish precipitate was filtered out. The product was cleaned by dialysis (dialysis tube by Sigma-Aldrich, molecular weight exclusion=8000) and vacuum-dried at 50° C. ($2 \cdot 10^{-3}$ mbar). The yield was 1.80 g (M=408.40 g/mol Na$^+$-form=4.41 mmol) of a slightly yellowish polymer.

Solubility:
Soluble in water, dimethyl sulfoxide (DMSO), dimethylformamide (DMF), 1-methyl-2-pyrrolidone (NMP), N,N'-dimethyl acetamide (DMAc); insoluble in methanol, ethanol, isopropanol, toluene, tetrahydrofuran (THF), chloroform, acetone.

Exchange Capacity:
experimental: 2.640 mmol/g (378.79 g/mol) for H$^+$-form
theoretical: 2.752 mmol/g (363.34 g/mol) assumption: 6.0$H_2O/SO_3H$
theoretical: 3.918 mmol/g (255.25 g/mol) assumption: 0.0$H_2O/SO_3H$ Density: 1.707 g/cm$^3$ for H$^+$-form $^1$H-NMR (300 MHz, DMSO-d$_6$): δ=8.31 (br s, 2H, CH), 8.19 (br s, 2H, CH), 8.08 (br s, 0.4H, CH), 7.98 (br s, 2H, CH), 7.88 (s, 0.4H, CH), 5.16 (br s, SO$_3$H×n $H_2O$).

$^{13}$C-NMR (75.5 MHz, DMSO-d$_6$): δ=147.7 (s), 144.0 (s), 143.3 (s), 133.1 (s), 130.2 (weak s), 129.8 (weak s), 128.8 (s), 128.4 (s).

Analog to the reactions described in EXAMPLE 3, additional copolymers with different exchange capacities were produced using various ratios of the initial monomers disodium-3,3'-disulfonate-4,4'-difluorodiphenylsulfone and 4,4'-difluorodiphenylsulfone, or disodium-3,3'-disulfonate-4,4'-dichlorodiphenylsulfone and 4,4'-dichlorodiphenylsulfone. The reaction conditions were analog.

Example 4

Synthesis of a poly(sulfonic acid arylene sulfone) with variable exchange capacity: Sulfonated poly(1,4-phenylene-sulfone) with n=1.0 and n=0.8

Dithiol component: 4,4'-thiobisbenzolthiol (bis-(4-mercapto-phenyl)sulfide)

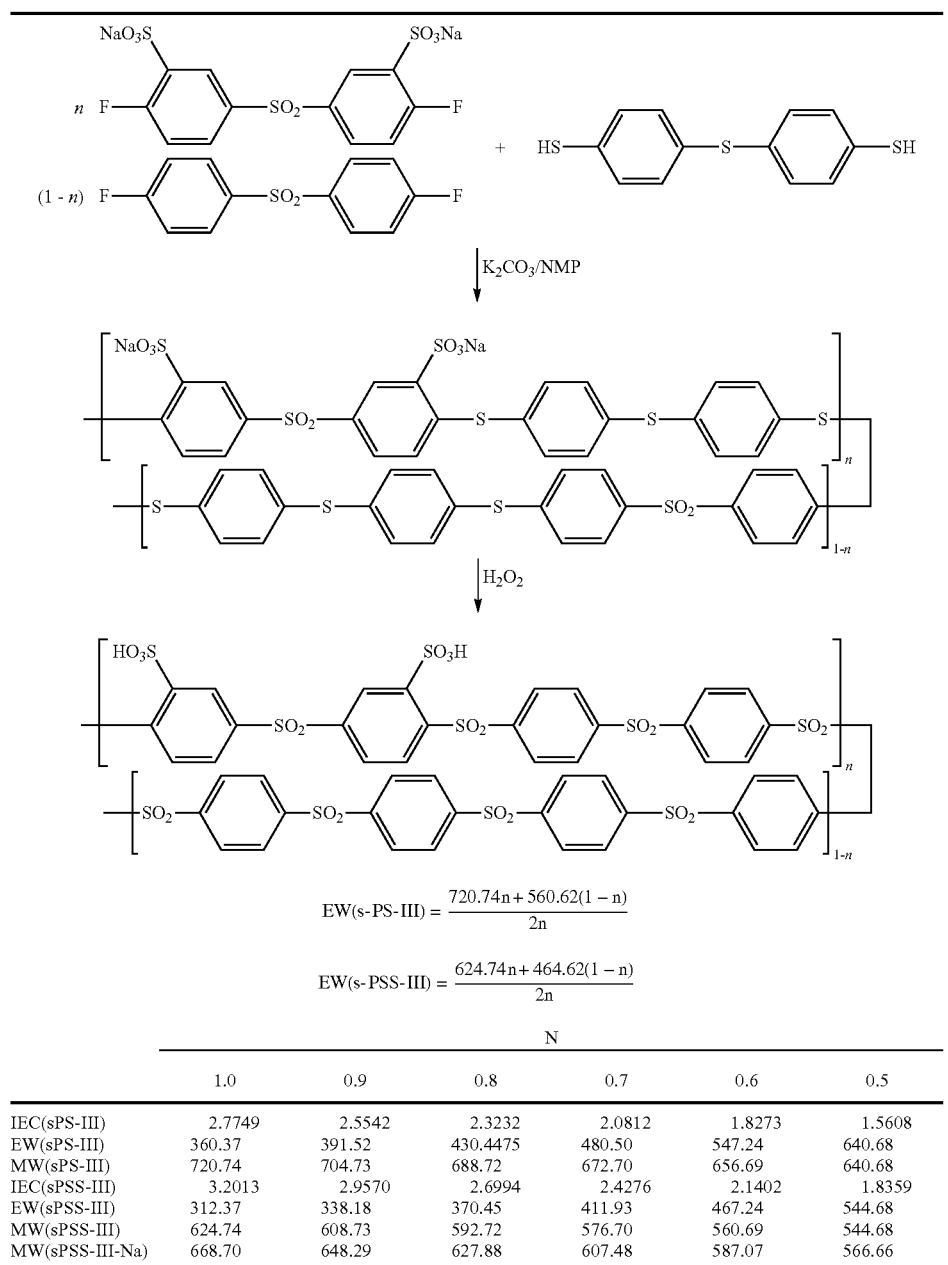

$$EW(s\text{-}PS\text{-}III) = \frac{720.74n + 560.62(1-n)}{2n}$$

$$EW(s\text{-}PSS\text{-}III) = \frac{624.74n + 464.62(1-n)}{2n}$$

|  | N | | | | | |
|---|---|---|---|---|---|---|
|  | 1.0 | 0.9 | 0.8 | 0.7 | 0.6 | 0.5 |
| IEC(sPS-III) | 2.7749 | 2.5542 | 2.3232 | 2.0812 | 1.8273 | 1.5608 |
| EW(sPS-III) | 360.37 | 391.52 | 430.4475 | 480.50 | 547.24 | 640.68 |
| MW(sPS-III) | 720.74 | 704.73 | 688.72 | 672.70 | 656.69 | 640.68 |
| IEC(sPSS-III) | 3.2013 | 2.9570 | 2.6994 | 2.4276 | 2.1402 | 1.8359 |
| EW(sPSS-III) | 312.37 | 338.18 | 370.45 | 411.93 | 467.24 | 544.68 |
| MW(sPSS-III) | 624.74 | 608.73 | 592.72 | 576.70 | 560.69 | 544.68 |
| MW(sPSS-III-Na) | 668.70 | 648.29 | 627.88 | 607.48 | 587.07 | 566.66 |

1. Batch

I. Polymerization:

Sulfonated poly(1,4-phenylene-sulfone-1,4-phenylene-sulfide-1,4-phenylene-sulfide-1,4-phenylene-sulfide): The polymerization was carried out in a heated 100 mL round flask filled with argon and equipped with an argon inlet, a magnetic agitator and a Dean-Stark trap provided with a cooler. 3.276 g (6.394 mmol) of disodium-3,3'-disulfonate-4,4'-difluorodiphenylsulfone-trihydrate, 1.601 g (6.394 mmol) of 4,4'-thiobisbenzolthiol and 1.060 g (7.673 mmol) of dried potassium carbonate were filled into this flask. This mixture was vacuum-dried for 2 h at 70° C. (2·10$^{-3}$ mbar). Then, 18 ml of dried 1-methyl-2-pyrrolidone (NMP) and 40 ml of dried toluene were added under argon, and the reaction mixture was heated in an oil bath for 4 h until it had reached 145° C., to remove all traces of water (dehydrator). The toluene was then removed by draining the Dean-Stark trap (distilled) and the reaction was continued for 15 h at 185° C. After cooling it to room temperature, the black suspension was slowly dripped into isopropanol (600 mL) to precipitate the polymer. The gray precipitate was filtrated and rinsed with isopropanol. The product was then dissolved again in 100 mL of water (brown solution), once again precipitated in isopropanol (600 mL), filtrated and rinsed with isopropanol and vacuum-dried ($2 \cdot 10^{-3}$ mbar). To remove all byproducts, the polymer was purified using 24-hour dialysis (dialysis tube by Sigma-Aldrich, molecular weight exclusion=8000); after removing the solvent and vacuum-drying at 50° C. ($2 \cdot 10^{-3}$ mbar), a dark brown solid (4.056 g, M=668.70 g/mol $Na^+$-form=6.07 mmol) was obtained.

Solubility:
Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, acetone.

$^1$H-NMR (300 MHz, DMSO-$d_6$): δ=8.09 (s, 2H, CH), 7.57 (d, 2H, CH, $J_{HH}$=8.3 Hz), 7.44 (d, 4H, CH, $J_{HH}$=7.9 Hz), 7.37 (d, 4H, CH, $J_{HH}$=7.9 Hz), 6.80 (d, 2H, CH, $J_{HH}$=8.3 Hz).

$^{13}$C-NMR (75.5 MHz, DMSO-$d_6$): δ=144.7 (s), 144.1 (s), 136.5 (s), 136.2 (s), 135.9 (s), 132.0 (s), 130.8 (s), 127.6 (s), 126.0 (s).

Molecular weight: $M_n$=8378, $M_w$=34670 g/mol, D=4.1383 (GPC) for $Na^+$-form

II. Oxidation:

Sulfonated poly(1,4-phenylene-sulfone): 3.22 g (4.82 mmol, M=668.70 g/mol) finely mortared solid from the above reaction were suspended in 50 mL of pure acetic acid and 10 mL of concentrated sulfuric acid. The dark brown reaction mixture was heated to 55° C., and then 8 mL of a 36% hydrogen peroxide solution (approx. 80 mmol $H_2O_2$) were slowly dripped in. This mixture was agitated for 5 h at 55° C., during which time the solid gradually lost its color. Subsequently, the mixture was briefly heated to 110° C. to remove any excess peroxide. Then the mixture was diluted with 150 mL of pure acetic acid. The pale yellow to colorless solid was filtered out and rinsed several times in pure acetic acid. To remove all byproducts, the polymer was purified using 48-hour dialysis (dialysis tube by Sigma-Aldrich, molecular weight exclusion=8000); after removing the solvent and vacuum-drying at 50° C. ($2 \cdot 10^{-3}$ mbar), a pale yellow solid (2.83 g, M=720.74 g/mol=3.93 mmol) was obtained.

Solubility:
Soluble in dimethyl sulfoxide (DMSO), dimethylformamide (DMF), 1-methyl-2-pyrrolidone (NMP), N,N'-dimethyl acetamide (DMAc); insoluble in water (only swelling), methanol, ethanol, isopropanol, toluene, tetrahydrofuran (THF), chloroform, acetone.

Exchange Capacity:
experimental: 2.210 mmol/g (452.49 g/mol) for $H^+$-form
theoretical: 2.211 mmol/g (452.25 g/mol) assumption: 5.1$H_2O/SO_3H$
theoretical: 2.775 mmol/g (360.37 g/mol) assumption: 0.0$H_2O/SO_3H$
Density: 1.693 g/cm$^3$ for $H^+$-form $^1$H-NMR (300 MHz, DMSO-$d_6$): δ=8.44 (br, 4H, CH), 8.16 (br, 2H, CH), 7.94 (br, 4H, CH), 7.89 (br, 4H, CH), 5.01 (br, 9H, $H_2O$).

$^{13}$C-NMR (75.5 MHz, DMSO-$d_6$): δ=150.0 (s), 146.9 (s), 144.7 (s), 144.1 (s), 141.2 (s), 134.2 (s), 129.9 (s), 128.6 (s).

2. Batch
I. Polymerization (n=1.0):

sPSS-312 (n=1.0) Sulfonated poly(1,4-phenylene-sulfone-1,4-phenylene-sulfide-1,4-phenylene-sulfide-1,4-phenylene-sulfide): The polymerization was carried out in a heated 1000 mL flask filled with argon and equipped with an argon inlet, a magnetic agitator and a Dean-Stark trap provided with a cooler. 30.170 g (0.0658 mol) of disodium-3,3'-disulfonate-4,4'-difluoro-diphenyl-sulfone, 16.482 g (0.0658 mol) of 4,4'-thiobisbenzolthiol and 19.1 g (0.138 mol) of dried potassium carbonate were filled into this flask. Then, 200 mL of dried 1-methyl-2-pyrrolidone (NMP) and 80 mL of dried toluene were added and the reaction mixture agitated for 30 minutes at room temperature under low current argon. Finally, the reaction mixture was heated in an oil bath for 3 h until it had reached 150° C., to remove all traces of water (dehydrator). Afterwards, the toluene was removed (distilled) by draining the Dean-Stark trap and the reaction continued for 36 h at 185° C.; after 24 h, another 100 mL of NMP were added. After cooling it to room temperature, the dark purple suspension was slowly dripped into isopropanol (1200 mL) to precipitate the polymer. The purple precipitate was filtrated and rinsed with isopropanol. The product was then dissolved in 600 mL of water (dark purple solution) and once again precipitated in isopropanol (1200 mL), before the gray precipitate was filtrated and rinsed with isopropanol. To remove all byproducts, the polymer was purified using 36-hour dialysis (dialysis tube by Sigma-Aldrich, molecular weight exclusion=12,000-14,000); after removing the solvent and vacuum-drying at 60° C., a dark purple solid (38.46 g, M=700.94 g/mol $K^+$-form, 83.4%) was obtained. A portion (7.93 g) of the polymer was transformed by means of an ion exchanger (Dowex® Marathon® C) into the $H^+$-form. The result was a light brown polymer (6.96 g, 98.5%), which was vacuum-dried for 12 h at 60° C. According to the $^1$H-NMR spectrum, the polymer still contains 3.7$H_2O/SO_3H$, i.e. the measured ion exchange capacity (IEC), after deducting these 3.7$H_2O/SO_3H$ (IEC=3.116 mmol/g), approximately matches the theoretically expected IEC of 3.201 mmol/g, Solubility:
Soluble in water, methanol ($H^+$-form), dimethyl sulfoxide (DMSO), dimethylformamide (DMF), 1-methyl-2-pyrrolidone (NMP), N,N'-dimethyl acetamide (DMAc), concentrated sulfuric acid. Insoluble in methanol ($Na/K^+$-form), ethanol, isopropanol, toluene, tetrahydrofuran (THF), chloroform, acetone.

Exchange Capacity:
experimental: 2.580 mmol/g (387.60 g/mol) for $H^+$-form
theoretical: 2.638 mmol/g (379.03 g/mol) assumption: 3.7$H_2O/SO_3H$
theoretical: 3.201 mmol/g (312.37 g/mol) assumption: 0.0$H_2O/SO_3H$
Density: 1.560 g/cm$^3$ for $H^+$-form with 3.7$H_2O/SO_3H$ $^1$H-NMR (300 MHz, DMSO-$d_6$): δ=8.09 (s, 2H, CH), 7.57 (d, 2H, CH, $J_{HH}$=8.3 Hz), 7.44 (d, 4H, CH, $J_{HH}$=7.9 Hz), 7.37 (d, 4H, CH, $J_{HH}$=7.9 Hz), 6.80 (d, 2H, CH, $J_{HH}$=8.3 Hz).

$^{13}$C-NMR (75.5 MHz, DMSO-$d_6$): δ=144.7 (s), 144.1 (s), 136.5 (s), 136.2 (s), 135.9 (s), 132.0 (s), 130.8 (s), 127.6 (s), 126.0 (s).

Molecular weight: $M_n$=21229 g/mol, $M_w$=52025 g/mol, D=2.45 (GPC in DMF/60° C./salt additive/relative to polystyrol standard) for $Na/K^+$-form II. Oxidation (n=1.0):

sPS-360 (n=1.0) Sulfonated poly(1,4-phenylene-sulfone): 20.0 g (28.5 mmol, M=700.92 g/mol for potassium form) finely mortared purple solid from the above reaction (sPSS-312, n=1.0) were suspended in 400 mL of pure acetic acid and 15 mL of concentrated sulfuric acid. 26 mL of a hydrogen peroxide solution (30%, approx. 0.26 mol $H_2O_2$) were slowly dripped into the dark brown reaction mixture. This mixture was agitated for 36 h at room temperature, during which time the solid gradually lost its color. Then the mixture was diluted with 200 mL of pure acetic acid. The pale yellow to colorless solid was filtrated and rinsed several times in pure acetic acid. To remove all byproducts, the polymer was purified using 48-hour dialysis (dialysis tube by Sigma-Aldrich, molecular weight exclusion=12,000-14,000); after removing the solvent and vacuum-drying at 60° C., a pale yellow solid (18.25 g, M=720.74 g/mol=88.9%) was obtained. Transparent films could be obtained from DMAc, DMSO and NMP solutions (20 wt %).

Solubility:
Soluble in dimethyl sulfoxide (DMSO), dimethylformamide (DMF), 1-methyl-2-pyrrolidone (NMP), N,N'-dimethyl acetamide (DMAc); insoluble in water (only swelling), methanol, ethanol, isopropanol, toluene, tetrahydrofuran (THF), chloroform, acetone.

Conductivity at 25° C.: 128 mS/cm (in liquid water)
E-modulus at 30° C.: 600 MPa (DMA with 1 Hz, measured in air, previously swelled in water)
Relative viscosity: 2.972 at 25° C., c=1 g/dL in DMSO
Inherent viscosity: 1.089 dL/g at 25° C., c=1 g/dL in DMSO
Exchange Capacity:
experimental: 2.730 mmol/g (366.30 g/mol) for $H^+$-form
theoretical: 2.775 mmol/g (360.37 g/mol) assumption: $0.0H_2O/SO_3H$
Density: g/cm³ for $H^+$-form (no data)
$^1$H-NMR (300 MHz, DMSO-$d_6$): δ=8.44 (br, 4H, CH), 8.16 (br, 2H, CH), 7.94 (br, 4H, CH), 7.89 (br, 4H, CH), 5.01 (br, 9H, $H_2O$).
$^{13}$C-NMR (75.5 MHz, DMSO-$d_6$): δ=150.0 (s), 146.9 (s), 144.7 (s), 144.1 (s), 141.2 (s), 134.2 (s), 129.9 (s), 128.6 (s).

3. Batch
I. Polymerization (n=0.8):
sPSS-370 (n=0.8) Sulfonated poly(1,4-phenylene-sulfone-1,4-phenylene-sulfide-1,4-phenylene-sulfide-1,4-phenylene-sulfide):

The polymerization was carried out in a heated 1000 mL flask filled with argon and equipped with an argon inlet, a magnetic agitator and a Dean-Stark trap provided with a cooler. 30.090 g (65.65 mmol) of disodium-3,3'-disulfonate-4,4'-difluoro-diphenyl-sulfone, 4.173 g (16.40 mmol) of 4,4'-difluorodiphenylsulfone, 20.548 g (82.06 mmol) of 4,4'-thio-bisbenzolthiol and 17.0 g (0.123 mol) of dried potassium carbonate were filled into this flask. Then, 200 mL of dried 1-methyl-2-pyrrolidone (NMP) and 80 mL of dried toluene were added and the reaction mixture agitated for 30 minutes at room temperature under current argon. Finally, the reaction mixture was heated in an oil bath for 3 h until it had reached 150° C., to remove all traces of water (dehydrator). Afterwards, the toluene was removed (distilled) by draining the Dean-Stark trap and the reaction continued for 36 h at 185° C.; after 24 h, another 100 mL of NMP were added. After cooling it to room temperature, the dark purple suspension was slowly dripped into isopropanol (1200 mL) to precipitate the polymer. The purple precipitate was filtrated and rinsed with isopropanol. The product was then dissolved in 600 mL of water (dark purple solution) and once again precipitated in isopropanol (1200 mL), before the gray precipitate was filtrated and rinsed with isopropanol. To remove all byproducts, the polymer was purified using 36-hour dialysis (dialysis tube by Sigma-Aldrich, molecular weight exclusion=12,000-14,000); after removing the solvent and vacuum-drying at 60° C., a dark purple solid (33.07 g, M=653.66 g/mol $K^+$-form, 61.7%) was obtained. A portion (7.47 g) of the polymer was transformed by means of an ion exchanger (Dowex® Marathon® C) into the $H^+$-form. The result was a light brown solid (6.50 g, 96.0%), which was vacuum-dried for 12 h at 60° C.

Solubility:
Soluble in water, methanol ($H^+$-form), dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol (Na/$K^+$-form), ethanol, isopropanol, toluene, tetrahydrofuran (THF), chloroform, acetone.

Exchange Capacity:
experimental: 2.175 mmol/g (459.77 g/mol) for $H^+$-form
theoretical: 2.175 mmol/g (459.77 g/mol) assumption: $5.0H_2O/SO_3H$
theoretical: 2.699 mmol/g (370.45 g/mol) assumption: $0.0H_2O/SO_3H$
Density: 1.526 g/cm³ for $H^+$-form
$^1$H-NMR (300 MHz, DMSO-$d_6$): δ=8.09, 7.70, 7.57, 7.44, 7.37, 7.20, 6.80.
$^{13}$C-NMR (75.5 MHz, DMSO-$d_6$): δ=144.7 (s), 144.4 (weak s), 144.2 (s), 138.5 (weak s), 136.5 (s), 136.2 (s), 135.9 (s), 135.6 (weak s), 132.0 (s), 130.8 (s), 130.2 (weak s), 128.4 (s), 127.6 (s), 126.0 (s).

Molecular weight: $M_n$=169680 g/mol, $M_w$=315424 g/mol, D=1.86 (GPC in DMF/60° C./salt additive/relative to polystyrol standard) for Na/$K^+$-form II. Oxidation (n=0.8):
sPS-430 (n=0.8) Sulfonated poly(1,4-phenylene-sulfone): 20.0 g (28.5 mmol, M=700.92 g/mol for potassium form) finely mortared purple solid from the above reaction (sPSS-370, n=0.8) were suspended in 400 mL of pure acetic acid and 15 mL of concentrated sulfuric acid. 26 mL of a hydrogen peroxide solution (30%, approx. 0.26 mol $H_2O_2$) were slowly dripped into the dark brown reaction mixture. This mixture was agitated for 36 h at room temperature, during which time the solid gradually lost its color. Then the mixture was diluted with 200 mL of pure acetic acid. The pale yellow to colorless solid was filtrated and rinsed several times in pure acetic acid. To remove all byproducts, the polymer was purified using 48-hour dialysis (dialysis tube by Sigma-Aldrich, molecular weight exclusion=12,000-14,000); after removing the solvent and vacuum-drying at 60° C., a pale yellow solid (18.25 g, M=720.74 g/mol=88.9%) was obtained. Transparent films could be obtained from DMSO, DMAc, and NMP solutions (20 wt %).

Solubility:
Soluble (after heating) in dimethyl sulfoxide (DMSO), dimethylformamide (DMF), 1-methyl-2-pyrrolidone (NMP), N,N'-dimethyl acetamide (DMAc); insoluble in water (only swelling), methanol, ethanol, isopropanol, toluene, tetrahydrofuran (THF), chloroform, acetone.

Conductivity at 25° C.: 130 mS/cm (in liquid water)
E-modulus at 60° C.: 600 MPa (DMA with 1 Hz, measured in air, previously swelled in water)
Exchange Capacity:
experimental: 1.970 mmol/g (507.61 g/mol) for $H^+$-form
theoretical: 1.970 mmol/g (507.61 g/mol) assumption: $4.3H_2O/SO_3H$
theoretical: 2.323 mmol/g (430.45 g/mol) assumption: $0.0H_2O/SO_3H$
Density: 1.66 g/cm³ for $H^+$-form
$^1$H-NMR (300 MHz, DMSO-$d_6$): δ=8.48 (d), 8.44 (s), 8.16 (d), 8.10 (s), 7.94 (d), 7.89 (d), 5.0 ($H_2O$).

$^{13}$C-NMR (75.5 MHz, DMSO-d$_6$): δ=150.1 (s), 146.9 (s), 145.1 (weak s), 144.7 (s), 144.1 (s), 143.6 (weak s), 141.2 (s), 134.2 (s), 130.2 (s), 129.9 (s), 128.6 (s).

Molecular weight: M$_n$=44151, M$_w$=679752 g/mol, D=15.4 (GPC in DMF/60° C./salt additive/relative to polystyrol standard) for H$^+$-form (low solubility in DMF).

Example 5

Synthesis of a poly(sulfonic acid phenylene sulfone) with variable exchange capacity: Sulfonated poly(1,4-phenylene-sulfone-1,4-phenylene-sulfone-1,3-phenylene-sulfone) with n=1.0 and 0.8

Dithiol component: benzene-1,3-dithiol

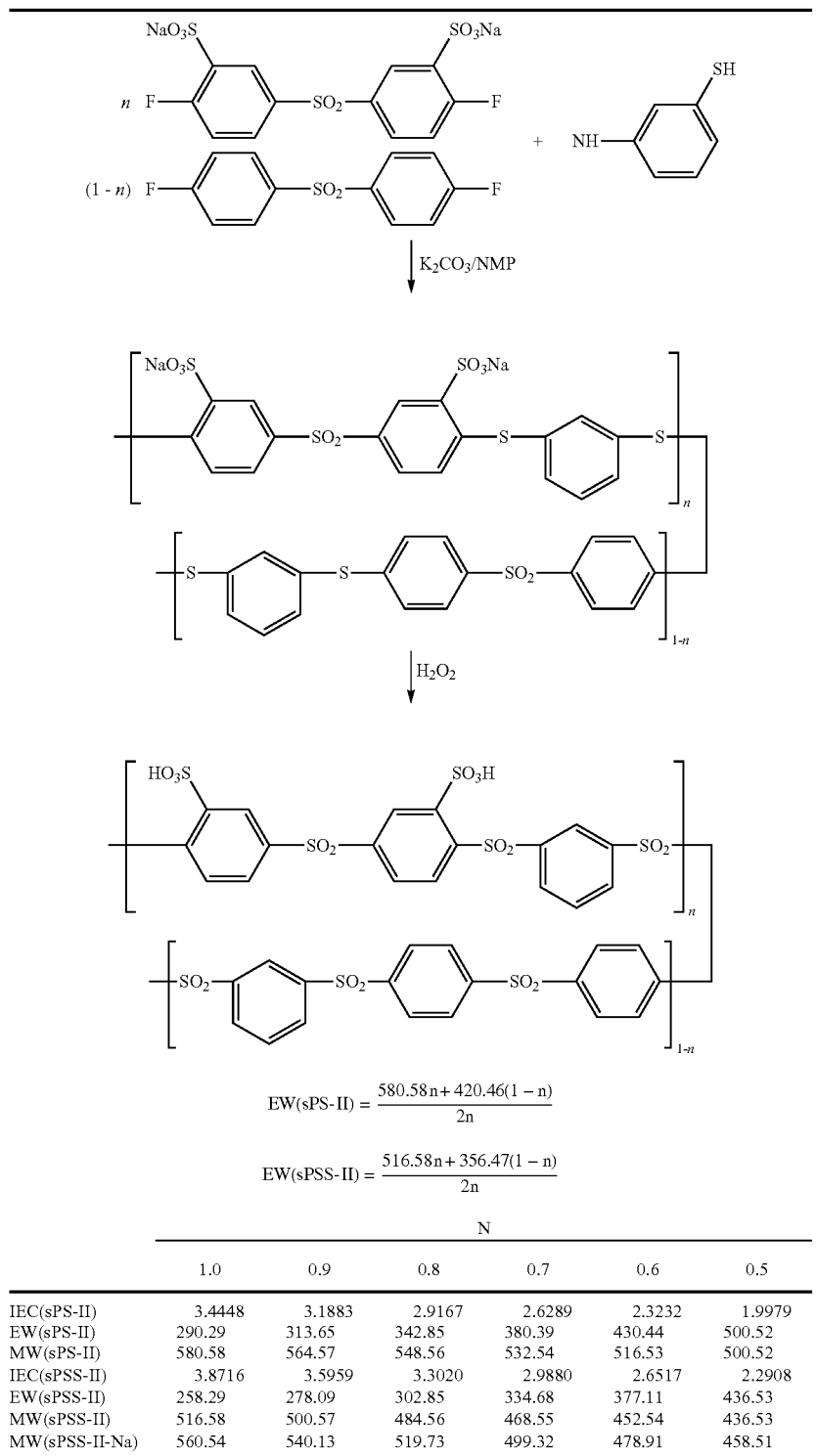

$$EW(sPS\text{-}II) = \frac{580.58n + 420.46(1-n)}{2n}$$

$$EW(sPSS\text{-}II) = \frac{516.58n + 356.47(1-n)}{2n}$$

| | N | | | | | |
|---|---|---|---|---|---|---|
| | 1.0 | 0.9 | 0.8 | 0.7 | 0.6 | 0.5 |
| IEC(sPS-II) | 3.4448 | 3.1883 | 2.9167 | 2.6289 | 2.3232 | 1.9979 |
| EW(sPS-II) | 290.29 | 313.65 | 342.85 | 380.39 | 430.44 | 500.52 |
| MW(sPS-II) | 580.58 | 564.57 | 548.56 | 532.54 | 516.53 | 500.52 |
| IEC(sPSS-II) | 3.8716 | 3.5959 | 3.3020 | 2.9880 | 2.6517 | 2.2908 |
| EW(sPSS-II) | 258.29 | 278.09 | 302.85 | 334.68 | 377.11 | 436.53 |
| MW(sPSS-II) | 516.58 | 500.57 | 484.56 | 468.55 | 452.54 | 436.53 |
| MW(sPSS-II-Na) | 560.54 | 540.13 | 519.73 | 499.32 | 478.91 | 458.51 |

I. Polymerization (n=1.0):

Sulfonated poly(1,4-phenylene-sulfone-1,4-phenylene-sulfide-1,3-phenylene-sulfide): The polymerization was carried out in a heated 100 mL round flask filled with argon and equipped with an argon inlet, a magnetic agitator and a Dean-Stark trap provided with a cooler. 4.8537 g (9.531 mmol, M=509.25 g/mol) of disodium-3,3'-disulfonate-4,4'-dichlorodiphenylsulfone-monohydrate, 1.3557 g (9.531 mmol) of benzene-1,3-dithiol and 1.449 g (10.5 mmol) of dried potassium carbonate were filled into this flask. This mixture was vacuum-dried for 2 h at 70° C. ($2 \cdot 10^{-3}$ mbar). Then, 15 mL of dried 1-methyl-2-pyrrolidone (NMP) and 25 mL of dried toluene were added under argon, and the reaction mixture was heated in an oil bath for 4 h until it had reached 150° C., to remove all traces of water (dehydrator). The toluene was then removed by draining the Dean-Stark trap (distilled) and the reaction was continued for 20 h at 190° C. After cooling it to room temperature, the slightly yellowish suspension was slowly dripped into isopropanol (500 mL) to precipitate the polymer. The slightly pink precipitate was filtrated and rinsed with isopropanol. The product was then dissolved again in 50 mL of water, once again precipitated in isopropanol (800 mL), filtrated, rinsed with isopropanol and vacuum-dried ($2 \cdot 10^{-3}$ mbar). To remove all byproducts, the polymer was purified using 24-hour dialysis (dialysis tube by Sigma-Aldrich, molecular weight exclusion=8000); after removing the solvent and vacuum-drying at 50° C. ($2 \cdot 10^{-3}$ mbar), a pink-colored solid (5.10 g, M=560.54 g/mol Na$^+$-form=9.10 mmol) was obtained. A portion of the sodium salt (approx. 1.0 g) was transformed by an ion exchanger (Dowex® Marathon® C) into the H$^+$-form.

Solubility:
Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in aqueous 1M-NaCl solution, methanol, ethanol, isopropanol, toluene, tetrahydrofuran (THF), chloroform, acetone, ethyl acetate, trifluoroacetic acid.

Exchange Capacity:
experimental: 3.940 mmol/g (253.81 g/mol) for H$^+$-form
theoretical: 3.619 mmol/g (276.31 g/mol) assumption: 1.0H$_2$O/SO$_3$H
theoretical: 3.872 mmol/g (258.29 g/mol) assumption: 0.0H$_2$O/SO$_3$H
Density: 1.5778 g/cm$^3$ for H$^+$-form Analysis:
experimental: C: 31.27; H: 4.28; S: 21.61; Cl: 0.67
theoretical: C: 41.85; H: 2.34; S: 31.03; Cl: 0.00 with 0.0H$_2$O/SO$_3$H
theoretical: C: 31.02; H: 4.63; S: 23.00; Cl: 0.00 with 5.0H$_2$O/SO$_3$H
theoretical: C: 30.87; H: 4.61; S: 22.89; Cl: 0.51 with 5.0H$_2$O/SO$_3$H and polymerization rate=20, Cl end groups $^1$H-NMR (300 MHz, DMSO-d$_6$): δ=8.08 (d, 2H, CH, J$_{HH}$=1.7 Hz), 7.61 (s, 1H, CH), 7.56 (dd, 2H, CH, J$_{HH}$=1.7, 7.2 Hz), 7.48 (s, 3H, CH), 6.85 (d, 2H, CH, J$_{HH}$=7.2 Hz), 4.96 (s, H$_2$O).
$^{13}$C-NMR (75.5 MHz, DMSO-d$_6$): δ=145.4 (s), 144.5 (s), 141.3 (s), 137.3 (s), 136.7 (s), 134.2 (s), 132.7 (s), 128.6 (s), 128.5 (s), 126.8 (s).

II. Oxidation (n=1.0):

Sulfonated poly(1,4-phenylene-sulfone-1,4-phenylene-sulfone-1,3-phenylene-sulfone): 3.08 g (5.49 mmol, M=560.54 g/mol) of solid from the above reaction were dissolved in 50 mL of concentrated sulfuric acid 5 mL of a 36% hydrogen peroxide solution (appox. 50 mmol H$_2$O$_2$) were slowly dripped into this slightly greenish solution, resulting in a color shift towards pale yellow. This mixture was agitated for 1 d at room temperature. After diluting the mixture with 200 mL of water, the sulfuric acid was removed by dialysis (dialysis tube by Sigma-Aldrich, molecular weight exclusion=3000). The water was removed using a rotary evaporator and the product vacuum-dried at 50° C. ($2 \cdot 10^{-3}$ mbar). The yield was 2.40 g (4.13 mmol, M=580.58 g/mol) of a pale yellow solid.

Solubility:
Soluble in water, dimethyl sulfoxide (DMSO), dimethylformamide (DMF), 1-methyl-2-pyrrolidone (NMP), N,N'-dimethyl acetamide (DMAc); insoluble in aqueous 1M-NaCl solution, methanol, ethanol, isopropanol, toluene, tetrahydrofuran (THF), chloroform, acetone, ethyl acetate, trifluoroacetic acid.

Exchange Capacity:
experimental: 2.270 mmol/g (440.53 g/mol) for H$^+$-form
theoretical: 2.302 mmol/g (434.41 g/mol) assumption: 8.0H$_2$O/SO$_3$H
theoretical: 3.445 mmol/g (290.29 g/mol) assumption: 0.0H$_2$O/SO$_3$H
Density: 1.6503 g/cm$^3$ for H$^+$-form $^1$H-NMR (300 MHz, DMSO-d$_6$): δ=8.45 and 8.44 (two s, together 4H, CH), 8.16 (d, 2H, CH, J$_{HH}$=7.2 Hz), 7.88 (d, 2H, CH, J$_{HH}$=7.2 Hz), 7.46 (t, 1H, CH, J$_{HH}$=6.5 Hz), 3.87 (s, H$_2$O).
$^{13}$C-NMR (75.5 MHz, DMSO-d$_6$): δ=149.6 (s), 144.4 (s), 142.4 (s), 141.9 (s), 134.2 (s), 133.4 (s), 130.1 (s), 129.9 (s), 129.8 (s), 128.4 (s).

I. Polymerization (n=0.8):

Sulfonated poly(1,4-phenylene-sulfone-1,4-phenylene-sulfide-1,3-phenylene-sulfide): The polymerization was carried out in a heated 100 mL round flask filled with argon and equipped with an argon inlet, a magnetic agitator and a Dean-Stark trap provided with a cooler. 4.4466 g (9.335 mmol) of disodium-3,3'-disulfonate-4,4'-difluorodiphenylsulfone-monohydrate, 0.5933 g (2.334 mmol) of 4,4'-difluorodiphenylsulfone, 1.6596 g (11.668 mmol) of benzene-1,3-dithiol and 3.225 g (23.336 mmol) of dried potassium carbonate were filled into this flask. This mixture was vacuum-dried for 2 h at 90° C. ($2 \cdot 10^{-3}$ mbar). Then, 20 ml of dried 1-methyl-2-pyrrolidone (NMP) and 35 ml of dried toluene were added under argon, and the reaction mixture was heated in an oil bath for 4 h until it had reached 145° C., to remove all traces of water (dehydrator). The toluene was then removed by draining the Dean-Stark trap (distilled) and the reaction was continued for 24 h at 180° C. After cooling it to room temperature, the dark purple suspension was slowly dripped into isopropanol (800 mL) to precipitate the polymer. The pink-colored precipitate was filtrated and rinsed with isopropanol. The product was then dissolved again in 50 mL of water (purple solution), once again precipitated in isopropanol (800 mL), filtrated, rinsed with isopropanol and vacuum-dried ($2 \cdot 10^{-3}$ mbar). To remove all byproducts, the polymer was purified using 24-hour dialysis (dialysis tube by Sigma-Aldrich, molecular weight exclusion=3000); after removing the solvent and vacuum-drying at 50° C. ($2 \cdot 10^{-3}$ mbar), a purple solid (3.66 g, M=519.73 g/mol Na$^+$-form=7.04 mmol) was obtained.

Solubility:
Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, methylene chloride, acetone.

$^1$H-NMR (300 MHz, DMSO-d$_6$): δ=8.10, 7.73, 7.62, 7.59, 7.51, 7.24, 6.78.
$^{13}$C-NMR (75.5 MHz, DMSO-d$_6$): δ=145.4, 145.1, 144.8, 144.6, 144.1, 141.3, 140.0, 139.1, 138.6, 137.3, 136.9, 136.7, 136.6, 135.3, 134.2, 133.3, 132.7, 128.9, 128.6, 128.5, 127.5, 126.7, 126.5.

II. Oxidation (n=0.8):

Sulfonated poly(1,4-phenylene-sulfone-1,4-phenylene-sulfone-1,3-phenylene-sulfone): 3.066 g (5.90 mmol, M=519.73 g/mol) of solid from the above reaction were suspended in 50 mL of concentrated sulfuric acid 6 mL of a 36% hydrogen peroxide solution (appox. 60 mmol $H_2O_2$) were slowly dripped into this green solution, resulting in a color shift towards pale yellow. This mixture was agitated for 1 d at room temperature. After diluting the mixture with 200 mL of water, the sulfuric acid was removed by dialysis (dialysis tube by Sigma-Aldrich, molecular weight exclusion=3000). The water was removed using a rotary evaporator and the product vacuum-dried at 50° C. ($2 \cdot 10^{-3}$ mbar). The yield was 2.21 g (4.0 mmol, M=548.56 g/mol) of a pale yellow solid.

Solubility: virtually insoluble in all solvents in $H_2O$ (swelling)

Exchange Capacity:
experimental: 2.680 mmol/g (373.13 g/mol) for $H^+$-form
theoretical: 2.624 mmol/g (381.10 g/mol) assumption: 4.5$H_2O$/$SO_3H$
theoretical: 2.677 mmol/g (373.55 g/mol) assumption: 4.0$H_2O$/$SO_3H$
theoretical: 2.919 mmol/g (342.58 g/mol) assumption: 0.0$H_2O$/$SO_3H$ Density: 1.648 g/cm$^3$ for $H^+$-form Analysis:
experimental: C: 31.83; H: 3.12; S: 21.24 for $H^+$-form
theoretical: C: 39.41; H: 2.20; S: 26.88, with 0.0$H_2O$/$SO_3H$
theoretical: C: 31.87; H: 3.92; S: 21.74, with 4.5$H_2O$/$SO_3H$ $^1$H-NMR (300 MHz, DMSO-d$_6$): δ=8.45 (br, CH), 8.08 (br, CH), 7.84 (br, CH), 6.19 (br, CH), 5.66 (br, CH), 4.04 ($H_2O$).

$^{13}$C-NMR: unknown, due to very low solubility

Molecular weight: unknown, due to very low solubility

Example 6

Synthesis of a poly(sulfonic acid phenylene sulfone) with variable exchange capacity: Sulfonated poly(1,4-phenylene-sulfone-1,4-phenylene-sulfone-1,4-phenylene-oxide) with n=1.0

Dithiol component: 4,4'-oxobisbenzolthiol (bis-(4-mercapto-phenyl)oxide)

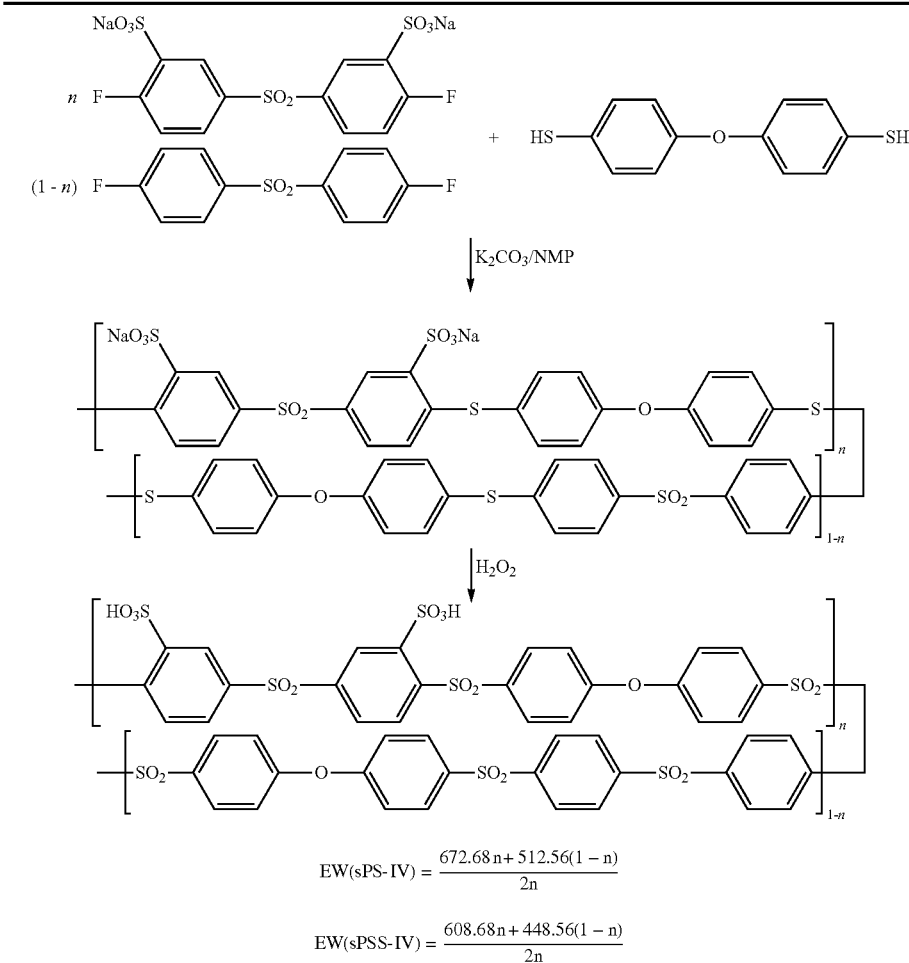

$$EW(sPS\text{-}IV) = \frac{672.68n + 512.56(1-n)}{2n}$$

$$EW(sPSS\text{-}IV) = \frac{608.68n + 448.56(1-n)}{2n}$$

| | N | | | | | |
|---|---|---|---|---|---|---|
| | 1.0 | 0.9 | 0.8 | 0.7 | 0.6 | 0.5 |
| IEC(sPS-IV) | 2.9732 | 2.7411 | 2.4974 | 2.2413 | 1.9716 | 1.6874 |
| EW(sPS-IV) | 336.34 | 364.82 | 400.41 | 446.17 | 507.19 | 592.62 |
| MW(sPS-IV) | 672.68 | 656.67 | 640.66 | 624.64 | 608.63 | 592.62 |

-continued

| | | | | | |
|---|---|---|---|---|---|
| IEC(sPSS-IV) | 3.2858 | 3.0371 | 2.7746 | 2.4971 | 2.2033 | 1.8917 |
| EW(sPSS-IV) | 304.34 | 329.26 | 360.41 | 400.46 | 453.86 | 528.62 |
| MW(sPSS-IV) | 608.68 | 592.67 | 576.66 | 560.64 | 544.63 | 528.62 |
| MW(sPSS-IV-Na) | 652.64 | 632.23 | 611.82 | 591.42 | 571.01 | 550.60 |

I. Polymerization:

Sulfonated poly(1,4-phenylene-sulfone-1,4-phenylene-sulfide-1,4-phenylene-oxide-1,4-phenylene-sulfide): The polymerization was carried out in a heated 100 mL round flask filled with argon and equipped with an argon inlet, a magnetic agitator and a Dean-Stark trap provided with a cooler. 2.2566 g (4.404 mmol) of disodium-3,3'-disulfonate-4,4'-difluorodiphenylsulfone-trihydrate, 1.0320 g (4.404 mmol) of 4,4'-oxobisbenzolthiol and 0.852 g (6.16 mmol) of dried potassium carbonate were filled into this flask. This mixture was vacuum-dried for 2 h at 70° C. ($2 \cdot 10^{-3}$ mbar). Then, 18 ml of dried 1-methyl-2-pyrrolidone (NMP) and 40 ml of dried toluene were added under argon, and the reaction mixture was heated in an oil bath for 4 h until it had reached 145° C., to remove all traces of water (dehydrator). The toluene was then removed by draining the Dean-Stark trap (distilled) and the reaction was continued for 15 h at 185° C. After cooling it to room temperature, the black suspension was slowly dripped into isopropanol (600 mL) to precipitate the polymer. The brown precipitate was filtrated and rinsed with isopropanol. The product was then dissolved again in 100 mL of water, once again precipitated in isopropanol (600 mL), filtrated and rinsed with isopropanol and vacuum-dried ($2 \cdot 10^{-3}$ mbar). To remove all byproducts, the polymer was purified using 12-hour dialysis (dialysis tube by Sigma-Aldrich, molecular weight exclusion=8000); after removing the solvent and vacuum-drying at 50° C. ($2 \cdot 10^{-3}$ mbar), a dark brown solid (2.89 g, M=652.64 g/mol Na$^+$-form=4.43 mmol) was obtained. A portion of the sodium salt (batch 38) (approx. 1.0 g) was transformed by an ion exchanger (Dowex® Marathon® C) into the H$^+$-form.

Solubility:

Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in aqueous 1M-NaCl solution, methanol, ethanol, isopropanol, toluene, tetrahydrofuran (THF), chloroform, acetone, ethyl acetate, trifluoroacetic acid.

Exchange Capacity:

experimental: 3.190 mmol/g (313.48 g/mol) for H$^+$-form theoretical: 3.102 mmol/g (322.36 g/mol) assumption: 1.0H$_2$O/SO$_3$H theoretical: 3.286 mmol/g (304.34 g/mol) assumption: 0.0H$_2$O/SO$_3$H Density: 1.4974 g/cm$^3$ for H$^+$-form Analysis:

experimental: C: 36.78; H: 3.94; S: 20.76; Cl: 0.79 theoretical: C: 47.35; H: 2.65; S: 26.33; Cl: 0.00 with 0.0H$_2$O/SO$_3$H theoretical: C: 37.39; H: 4.45; S: 20.79; Cl: 0.00 with 4.5H$_2$O/SO$_3$H theoretical: C: 37.05; H: 4.41; S: 20.60; Cl: 0.91 with 4.5H$_2$O/SO$_3$H and polymerization rate=10, Cl end groups $^1$H-NMR (300 MHz, DMSO-d$_6$): δ=8.08 (s, 2H, CH), 7.56 (d, 2H, CH, J$_{HH}$=8.4 Hz), 7.47 (d, 4H, CH, J$_{HH}$=8.2 Hz), 7.13 (d, 4H, CH, J$_{HH}$=8.2 Hz), 6.74 (d, 2H, CH, J$_{HH}$=8.4 Hz).

$^{13}$C-NMR (75.5 MHz, DMSO-d$_6$): δ=158.1 (s), 145.9 (s), 144.5 (s), 138.5 (s), 136.9 (s), 128.3 (s), 127.7 (s), 126.6 (s), 125.9 (s), 121.3 (s).

Molecular weight: M$_n$=2217, M$_w$=3402 g/mol, D=1.5346 (GPC) for Na$^+$-form

II. Oxidation:

Sulfonated poly(1,4-phenylene-sulfone-1,4-phenylene-sulfone-1,4-phenylene-oxide): 1.55 g (2.37 mmol, M=652.64 mol/g) finely mortared solid from the above reaction were suspended in 50 mL of pure acetic acid and 5 mL of concentrated sulfuric acid. The dark brown reaction mixture was heated to 55° C. while slowly dripping in 4 mL of a 36% hydrogen peroxide solution (approx. 40 mmol H$_2$O$_2$). This mixture was agitated for 5 h at 55° C., during which time the solid became gradually lighter. Subsequently, the mixture was briefly heated to 110° C. to remove any excess peroxide. Then the mixture was diluted with 150 mL of pure acetic acid. The pale yellow solid was filtrated and rinsed several times in pure acetic acid. To remove all byproducts, the polymer was purified using 48-hour dialysis (dialysis tube by Sigma-Aldrich, molecular weight exclusion=8000); after removing the solvent and vacuum-drying at 50° C. ($2 \cdot 10^{-3}$ mbar), a light brown solid (1.45 g, M=672.68 g/mol=2.16 mmol) was obtained.

Solubility:

Soluble in water, dimethyl sulfoxide (DMSO), dimethylformamide (DMF), 1-methyl-2-pyrrolidone (NMP), N,N'-dimethyl acetamide (DMAc), concentrated sulfuric acid; insoluble in methanol, ethanol, isopropanol, toluene, tetrahydrofuran (THF), chloroform, acetone.

Exchange Capacity:

experimental: 1.930 mmol/g (518.13 g/mol) for H$^+$-form theoretical: 1.936 mmol/g (516.49 g/mol) assumption: 10.0H$_2$O/SO$_3$H theoretical: 2.973 mmol/g (336.34 g/mol) assumption: 0.0H$_2$O/SO$_3$H Density: 1.662 g/cm$^3$ for H$^+$-form $^1$H-NMR (300 MHz, DMSO-d$_6$): δ=8.47 (s, 2H, CH), 8.44 (d, 2H, CH, J$_{HH}$=7.7 Hz), 8.11 (d, 2H, CH, J$_{HH}$=7.7 Hz), 7.84 (d, 4H, CH, J$_{HH}$=7.9 Hz), 7.17 (s, 5H, H$_2$O), 7.04 (d, 2H, CH, J$_{HH}$=7.9 Hz).

$^{13}$C-NMR (75.5 MHz, DMSO-d$_6$): δ=159.9 (s), 149.5 (s), 144.1 (s), 143.4 (s), 136.9 (s), 133.9 (s), 132.2 (s), 129.8 (s), 129.7 (s), 119.3 (s).

Example 7

Synthesis of a poly(sulfonic acid phenylene sulfone) with variable exchange capacity: Sulfonated poly(1,4-phenylene-sulfone-1,4-phenylene-sulfone-1,4-phenylene-sulfone-1,4-phenylene-oxide-1,4-phenylene-sulfone-1,4-phenylene-oxide-1,4-phenylene-sulfone-1,4-phenylene-sulfone) with n=0.7

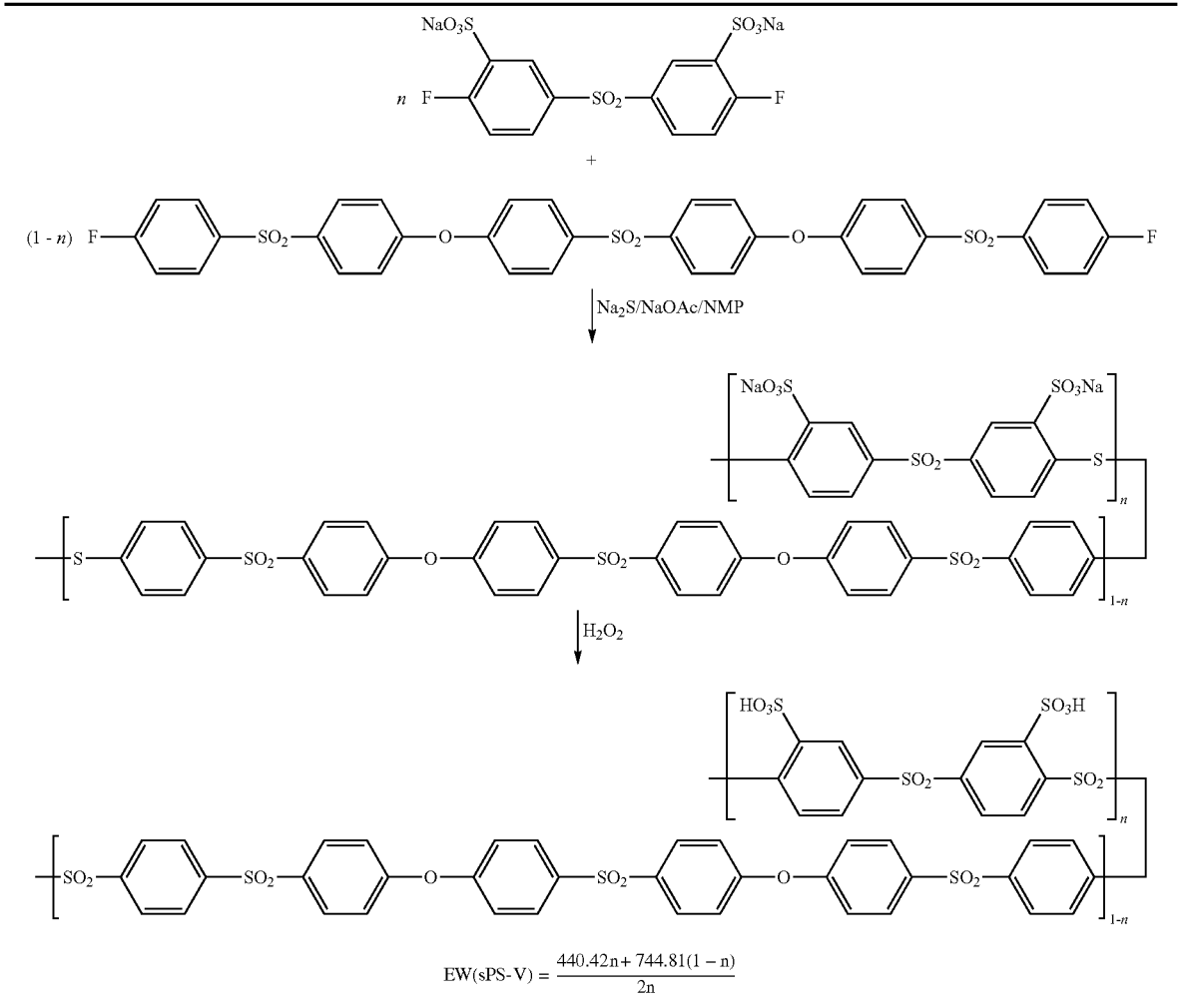

| | N | | | | | |
|---|---|---|---|---|---|---|
| | 1.0 | 0.9 | 0.8 | 0.7 | 0.6 | 0.5 |
| IEC(sPS-V) | 4.5411 | 3.8228 | 3.1917 | 2.6329 | 2.1346 | 1.6874 |
| EW(sPS-V) | 220.21 | 261.59 | 313.31 | 379.81 | 468.48 | 592.62 |
| MW(sPS-V) | 440.42 | 470.86 | 501.30 | 531.74 | 562.18 | 592.62 |
| IEC(sPSS-V) | 4.8968 | 4.1015 | 3.4093 | 2.8014 | 2.2634 | 1.7837 |
| EW(sPSS-V) | 204.22 | 243.82 | 293.32 | 356.96 | 441.82 | 560.63 |
| MW(sPSS-V) | 408.43 | 438.87 | 469.31 | 499.75 | 530.19 | 560.63 |
| MW(sPSS-V-Na) | 452.39 | 478.43 | 504.48 | 530.52 | 556.56 | 582.61 |

I. Polymerization:

Poly(1,4-phenylene-sulfone-1,4-phenylene-sulfide-1,4-phenylene-sulfone-1,4-phenylene-oxide-1,4-phenylene-sulfone-1,4-phenylene-oxide-1,4-phenylene-sulfone-1,4-phenylene-sulfide): The polymerization was carried out in a heated 100 mL round flask filled with argon and equipped with an argon inlet, a magnetic agitator and a Dean-Stark trap provided with a cooler. 3.7680 g (7.35 mmol) of disodium-3,3'-disulfonate-4,4'-difluoro-diphenyl-sulfone-trihydrate, 2.2650 g (3.15 mmol) of bis-(4-fluorophenyl-sulfophenyloxophenyl)sulfone, 0.8199 g (10.50 mmol) of sodium sulfide ($Na_2S$) and 0.861 g (10.50 mmol) of dried sodium acetate were filled into this flask. This mixture was vacuum-dried for 2 h at 70° C. ($2 \cdot 10^{-3}$ mbar). Then, 18 ml of dried 1-methyl-2-pyrrolidone (NMP) and 40 ml of dried toluene were added under argon, and the reaction mixture was heated in an oil bath for 4 h until it had reached 150° C., to remove all traces of water (dehydrator). The toluene was then removed by draining the Dean-Stark trap (distilled) and the reaction was continued for 15 h at 190° C. After cooling it to room temperature, the dark green suspension was slowly dripped into isopropanol (600 mL) to precipitate the polymer. The dark green precipitate was filtrated and rinsed with isopropanol. The product was then suspended in 200 mL of water; to remove all byproducts, it was purified using 24-hour dialysis (dialysis tube by Sigma-Aldrich, molecular weight exclusion=8000); after removing the solvent and vacuum-drying at 50° C. (2·10⁻³ mbar) a dark brown solid (2.44 g, M 530.52 g/mol Na⁺-form=4.60 mmol) was obtained.

Solubility:
Soluble in dimethyl sulfoxide (DMSO), dimethylformamide (DMF), 1-methyl-2-pyrrolidone (NMP), N,N'-dimethyl acetamide (DMAc); insoluble in water (swelling), methanol, ethanol, isopropanol, toluene, tetrahydrofuran (THF), chloroform, acetone.

$^1$H-NMR (300 MHz, DMSO-$d_6$): δ=8.21 (s, CH), 7.89, 7.86, 7.72, 7.69, 7.44, 7.17 (without assignment of signals), 3.25 (s, $H_2O$).

$^{13}$C-NMR (75.5 MHz, DMSO-$d_6$): δ=160.1 (s), 148.7 (s), 141.7 (s), 141.1 (s), 140.9 (s), 139.0 (s), 137.3 (s), 136.8 (s), 135.0 (s), 132.1 (s), 130.9 (s), 129.3 (s), 128.9 (s), 127.0 (s), 120.6 (s), 117.0 (s).

II. Oxidation:

Sulfonated poly(1,4-phenylene-sulfone-1,4-phenylene-sulfone-1,4-phenylene-sulfone-1,4-phenylene-oxide-1,4-phenylene-sulfone-1,4-phenylene-oxide-1,4-phenylene-sulfone-1,4-phenylene-sulfone) 1.56 g (2.94 mmol) finely mortared solid from the above reaction were suspended in 30 mL of pure acetic acid and 2.7 mL of concentrated sulfuric acid. The dark brown reaction mixture was heated to 55° C. while slowly dripping in 1.5 mL of a 36% hydrogen peroxide solution (approx. 15 mmol $H_2O_2$). This mixture was agitated for 3 h at 55° C., during which time the solid became gradually lighter. Subsequently, the mixture was briefly heated to 110° C. to remove any excess peroxide. Then the mixture was diluted with 150 mL of pure acetic acid. The slightly brownish solid was filtrated and rinsed several times in pure acetic acid. To remove all byproducts, the polymer was purified using 48-hour dialysis (dialysis tube by Sigma-Aldrich, molecular weight exclusion=8000); after removing the solvent and vacuum-drying at 50° C. (2·10⁻³ mbar), a slightly brownish solid (0.977 g, 1.84 mmol, M=531.74 g/mol) was obtained.

Solubility:
Soluble in dimethyl sulfoxide (DMSO), dimethylformamide (DMF), 1-methyl-2-pyrrolidone
(NMP), N,N'-dimethyl acetamide (DMAc); insoluble in water (swelling), methanol, ethanol, isopropanol, toluene, tetrahydrofuran (THF), chloroform, acetone.

Exchange Capacity:
experimental: 1.595 mmol/g (627.00 g/mol) for H⁺-form
theoretical: 1.786 mmol/g (559.96 g/mol) assumption: $10.0H_2O/SO_3H$
theoretical: 2.633 mmol/g (379.81 g/mol) assumption: $0.0H_2O/SO_3H$ Density: 1.570 g/cm³ for H⁺-form $^1$H-NMR (300 MHz, DMSO-$d_6$): δ=8.33, 8.16, 8.09, 7.99, 7.87 (strong signal), 7.64, 7.49, 7.39, 7.15 (strong signal) (all signals without assignment), 4.48 (s, $H_2O$).

$^{13}$C-NMR (75.5 MHz, DMSO-$d_6$): δ=160.8 (s), 160.1 (s, strong signal), 159.8 (s), 148.6 (s), 147.7 (s), 146.8 (s), 144.7 (s), 143.8 (s), 143.4 (s), 142.5 (s), 142.1 (s), 137.3 (s, strong signal), 135.4 (s), 132.9 (s), 131.5 (s), 130.9 (s, strong signal), 130.1 (s), 129.6 (s), 129.0 (s), 128.6 (s), 128.1 (s), 127.7 (s), 120.9 (s), 120.6 (s, strong signal), 116.9 (s).

Example 8

Synthesis of a poly(sulfonic acid phenylene sulfone ketone) with variable exchange capacity: Sulfonated poly(1,4-phenylene-ketone-1,4-phenylene-sulfone)

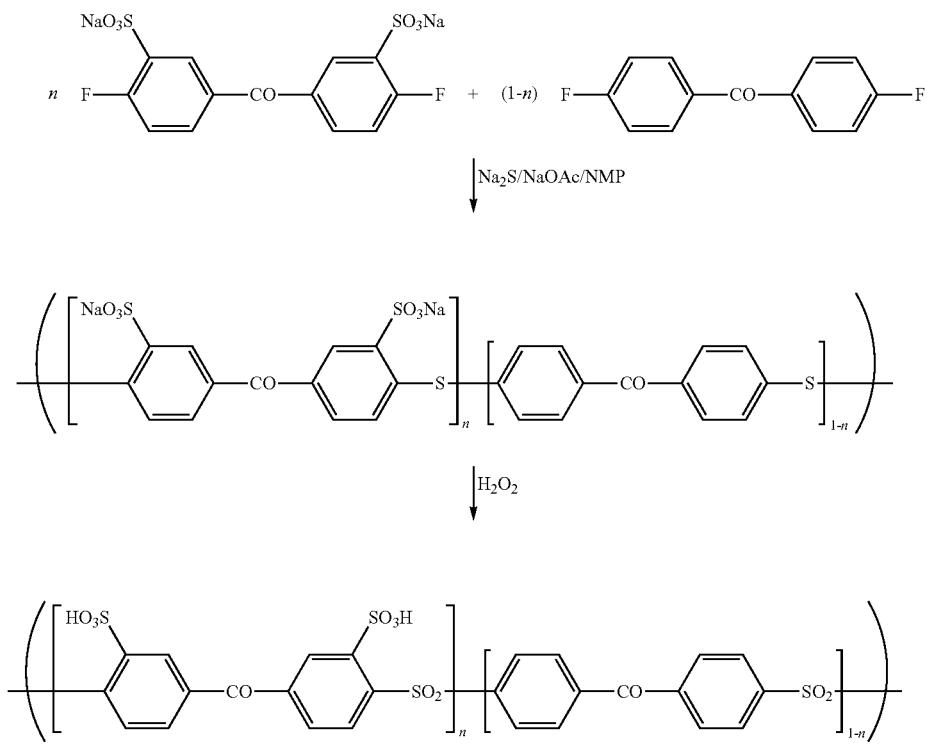

Example 9

Synthesis of a block-co-polymer consisting of a poly(sulfonic acid phenylene sulfone) and a α,ω-dihydroxy-component HO—W—OH

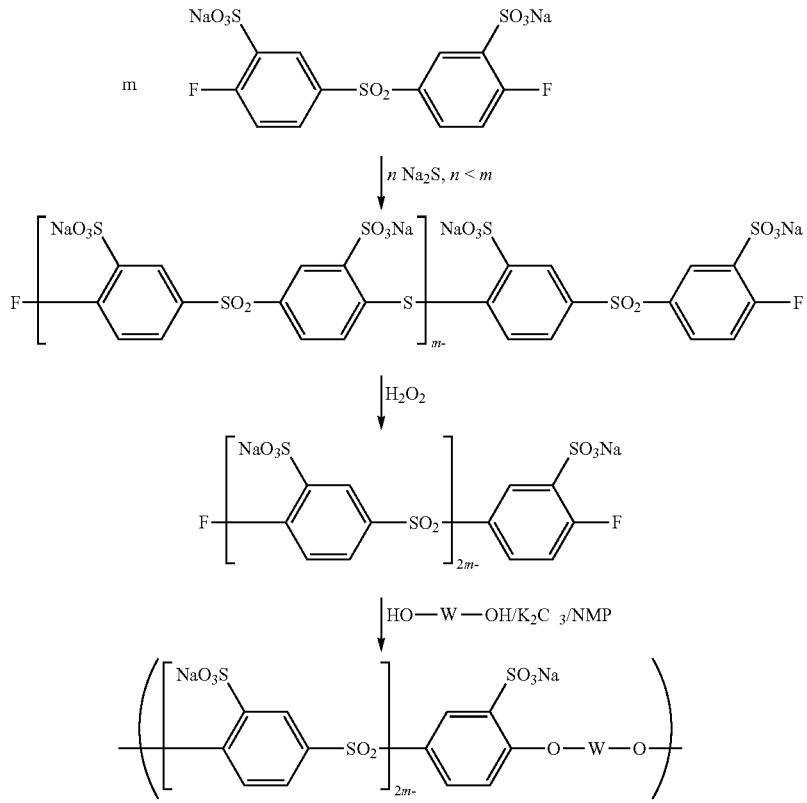

During the reaction with alkali sulfide, the reaction solution will contain additives such as alkali metal carboxylates (e.g. sodium acetate, lithium acetate), alkali metal carbonates (e.g. lithium carbonate), alkali metal sulfonates, lithium borate, lithium chloride.

Preferred solvents for the reaction with HO—W—OH are aprotic, polar, high-boiling solvents, such as 1-methyl-2-pyrrolidone (NMP), dimethyl sulfoxide (DMSO), dimethylformamide (DMF), dimethyl acetamide (DMAc), sulfolane, diphenyl sulfone, 1,3-dimethyl-2-imidazolidinone.

The reaction temperature is typically 100-250° C., preferably 140-200° C.

The reaction time is typically 5-24 h, preferably 12-18 h.

Example 10

Synthesis of a block-co-polymer consisting of a poly(sulfonic acid phenylene sulfone) and a α,ω-dihalogen-component Hal-W-Hal

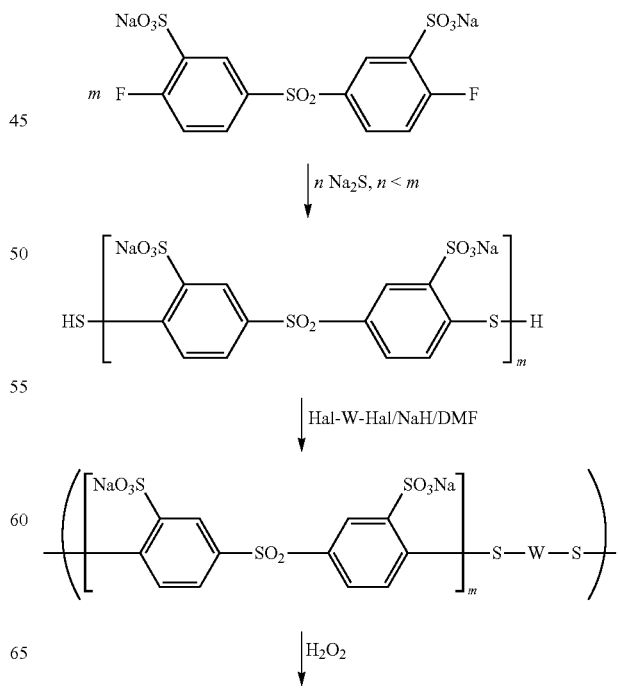

-continued

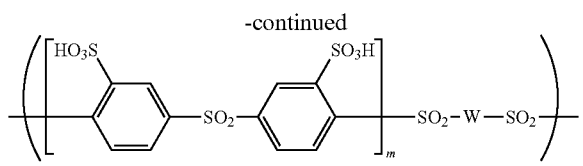

A preferred reaction temperature for the reaction with sodium hydride (NaH) in DMF is 0-30° C.

The reaction time is typically 1-24 h.

Example 11

Synthesis of poly(sulfonic acid 1,4-phenylene-sulfone)

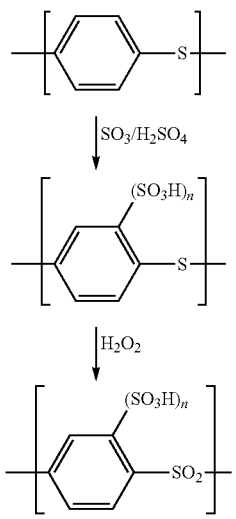

I. Sulfonation of poly(1,4-phenylene-sulfide):

Sulfonated poly(1,4-phenylene-sulfide): The sulfonation was carried out in a heated 100 mL round flask filled with argon and equipped with an argon inlet and a magnetic agitator. In this flask, 4.04 g (37.4 mmol) of poly(1,4-phenylene-sulfide) (Aldrich, $M_n$=15000, M=108.15 g/mol) were suspended in 50 mL of concentrated sulfuric acid. Under strong agitation, 10 mL of a 60% $SO_3$ solution in sulfuric acid (oleum, approx. 150 mmol $SO_3$) were slowly dripped into this suspension, resulting in a dark green solution. This solution was agitated for 12 h at room temperature. The solution was then slowly poured into 400 mL of pure acetic acid (cooled to 0° C. in an ice bath), during which process the polymer was precipitated as a greenish solid. This solid was filtrated and vacuum-dried ($2 \cdot 10^{-3}$ mbar) for 2 h. A slightly greenish solid was obtained.

Solubility:
Soluble in dimethyl sulfoxide (DMSO), dimethylformamide (DMF), 1-methyl-2-pyrrolidone (NMP), N,N'-dimethyl acetamide (DMAc); insoluble in water (swelling), methanol, ethanol, isopropanol, toluene, tetrahydrofuran (THF), chloroform, acetone.

Density: 1.720 g/cm$^3$ for H$^+$-form $^1$H-NMR (300 MHz, DMSO-d$_6$): δ=7.8-7.4 (br m), 7.19 (br m), 3.72 (s, H$_2$O).

II. Oxidation of sulfonated poly(1,4-phenylene-sulfide):

Sulfonated poly(1,4-phenylene-sulfone): 5.0 g (26.6 mmol, M=188.21 mol/g) finely mortared solid from the above reaction were suspended in 100 mL of pure acetic acid and 10 mL of concentrated sulfuric acid. The dark brown reaction mixture was heated to 55° C., and then 10 mL of a 36% hydrogen peroxide solution (approx. 100 mmol H$_2$O$_2$) were slowly dripped in. This mixture was agitated for 12 h at 55° C. Subsequently, the pale yellow mixture was briefly heated to 110° C. to remove any excess peroxide. The mixture was then diluted with 300 mL of pure acetic acid, and the solid was filtered out, to be suspended in 100 mL of water. To remove all byproducts (sulfuric acid, acetic acid), the suspension was purified using 72-hour dialysis (dialysis tube by Sigma-Aldrich, molecular weight exclusion=8000); after removing the solvent and vacuum-drying at 50° C. ($2 \cdot 10^{-3}$ mbar), a pale yellow solid (4.5 g, M=220.21 g/mol) was obtained.

Solubility:
Soluble in dimethyl sulfoxide (DMSO), dimethylformamide (DMF), 1-methyl-2-pyrrolidone (NMP), N,N'-dimethyl acetamide (DMAc); insoluble in water (swelling), methanol, ethanol, isopropanol, toluene, tetrahydrofuran (THF), chloroform, acetone.

Exchange Capacity:
experimental: 1.780 mmol/g (561.80 g/mol) for H$^+$-form
Sulfonation rate=29.1% (n=0.291) assumption: 0.0H$_2$O/SO$_3$H
Sulfonation rate=34.2% (n=0.342) assumption: 4.0H$_2$O/SO$_3$H
Density: 1.636 g/cm$^3$ for H$^+$-form $^1$H-NMR (300 MHz, DMSO-d$_6$): δ=8.1 (br m), 5.18 (s, H$_2$O).

$^{13}$C-NMR (75.5 MHz, DMSO-d$_6$): δ=145.7 (s), 145.2 (s), 139.8 (s), 134.6 (s), 130.2 (s), 128.7 (s).

III. Oxidation of sulfonated poly(1,4-phenylene-sulfide) with IEC=1.6 mmol/g:

Sulfonated poly(1,4-phenylene-sulfone): 5.00 g (0.04 mol, M=124.2 mol/g, IEC=1.6 mmol/g) finely mortared sulfonated poly(1,4-phenylene-sulfide) from a different batch were suspended in 300 mL of pure acetic acid and 15 mL of concentrated sulfuric acid. Then, 12 mL of a 30% hydrogen peroxide solution (approx. 0.12 mol H$_2$O$_2$) were slowly dripped in. This mixture was agitated for 36 h at RT. The white solid was then filtrated and rinsed in 200 mL of water. Afterwards, it was vacuum-dried for 12 h at 60° C. The result was a white solid (5.73 g, 91.1%) that was virtually insoluble in all solvents used. A film formation from hot NMP was not possible.

Solubility:
Negligible solubility in hot 1-methyl-2-pyrrolidone (NMP). Insoluble in water, DMSO, methanol, ethanol, isopropanol, toluene, tetrahydrofuran (THF), chloroform, acetone.

Exchange Capacity:
experimental: 0.96 mmol/g (1041 g/mol) for H$^+$-form
theoretical 1.28 mmol/g (781 g/mol) assumption: 0.0H$_2$O/SO$_3$H Analog to the reactions described in EXAMPLE 11, additional polymers with varying exchange capacities (sulfonation rate) were produced using various ratios of the initial polymer poly(1,4-phenylene-sulfide) and oleum (SO$_3$). The reaction conditions were analog.

SPECIAL REFERENCES

[1] T. D. Dang, Z. Bai, M. J. Dalton, E. Fossum *Polymer Preprints* 2004, 45, 22

[2] Z. Bai, L. D. Williams, M. F. Durstock, T. D. Dang *Polymer Preprints* 2004, 45, 60

[3] K. B. Wiles, V. A. Bhanu, F. Wang, M. A. Hickner, J. E. McGrath *Polymer Preprints* 2003, 44, 1089

[4] F. Wang, J. Mecham, W. Harrison, J. E. McGrath *Polymer Preprints* 2000, 41, 1401

[5] K. B. Wiles, V. A. Bhanu, F. Wang, J. E. McGrath *Polymer Preprints* 2002, 43, 993

[6] K. B. Wiles, C. M. de Diego, J. E. McGrath *Polymer Preprints* 2004, 45, 724

[7] J. Studinka, R. Gabler (Uitikon-Waldegg, CH), Polyarylene Sulphonates from Sulphonated Polyarylene Sulphide by Two-Stage Oxidation in Acid Medium DE 1938806A1 (1970)

[8] D. Fleischer, H. Strutz, J. Kulpe, A. Schleicher (Ticona GmbH, Germany), Oxidized Polyarylene Sulfides U.S. Pat. No. 6,020,442 (2000)

[9] D. Zierer, H. Scheckenbach (Ticona GmbH, Germany), Oxidation of Polyarylene Sulfides U.S. Pat. No. 6,013,761 (2000)

[10] D. Fleischer, H. Strutz, J. Kulpe, A. Schleicher (Hoechst Aktiengesellschaft, Germany), Process for Oxidizing Polyarylene Compounds Containing Thioether Groups U.S. Pat. No. 5,496,916 (1996)

[11] D. Fleischer, H. Strutz, J. Kulpe, A. Schleicher (Hoechst Aktiengesellschaft, Germany), Two-Stage Oxidation of Polyarylene Sulfides U.S. Pat. No. 5,496,917 (1996)

Although the apparatus and methods have been described in connection with specific forms thereof, it will be appreciated that a wide variety of equivalents may be substituted for the specified elements described herein without departing from the spirit and scope of this disclosure as described in the appended claims.

The subject matter of all reference publications mentioned herein is incorporated by reference.

What is claimed is:

1. A method of producing a sulfonated poly(arylene sulfone) comprising:
   a) providing sulfonated aryl monomer $F_1$-AS-$F_2$, where AS represents a sulfonated aryl system comprising one or more aromatic rings with each aromatic ring substituted by at least one $SO_3M$ group and functional groups $F_1$ and $F_2$ can be identical or different from each other and can enter into a condensation reaction with a sulfide group;
   b) polycondensing the sulfonated aryl monomer of a) with an alkali sulfide during formation of a sulfonated poly(arylene sulfide sulfone); and
   c) oxidizing S— bridging groups of the sulfonated poly(arylene sulfide sulfone) of b) to —$SO_2$— bridging groups to obtain a sulfonated poly(arylene sulfone) having each aromatic ring substituted by at least one $SO_3M$ group.

2. The method according to claim 1, wherein the polycondensation, in addition to one or several sulfonated aryl monomers $F_1$-AS-$F_2$, involves one or several aryl monomers $F_1$-ANS-$F_2$, ANS representing an aryl system consisting of one or several aromatic rings not substituted with a sulfonic acid group, and functional groups $F_1$ and $F_2$, can be identical or different from each other, during which process a partially sulfonated poly(arylene sulfide sulfone) having at least one electron-donor substituent at the sulfonated aromatic rings is formed, and oxidation of the partially sulfonated poly(arylene sulfide sulfone) into a partially sulfonated poly(arylene sulfone) having exclusively electron-acceptor substituents at the sulfonated aromatic rings.

3. The method according to claim 1, wherein the sulfonated aryl monomer has structural formula $F_1$—$Ar_a$—$SO_2$—$Ar_b$—$F_2$, wherein $Ar_a$ and $Ar_b$ can be identical or different from each other and each represent an aromatic or heteroaromatic ring system with 5-18 ring atoms, provided that $Ar_a$ and $Ar_b$ are substituted by the at least one $SO_3M$ group, M being a monovalent cation.

4. The method according to claim 1, wherein the functional groups $F_1$ and $F_2$, which can be identical or different, are at least one selected from the group consisting of fluorine, chlorine, bromine and iodine.

5. The method according to claim 1, wherein the sulfonated poly(arylene sulfone) contains one or more structural element(s) of formula —X—Ar($SO_3M$)$_n$-Y—, wherein X and Y, which are identical or different from each other, each represent an electron-acceptor group and Ar represents an aromatic or heteroaromatic ring system with 5-18 ring atoms; wherein the aromatic or heteroaromatic ring system, in addition to the $SO_3M$ group and the substituents X and Y, does not feature additional substituents; M represents a monovalent cation and n means an integral number between 1 and 4; and wherein X, Y, Ar, M and n can be identical or different in different structural elements, independently of each other.

6. The method according to claim 1, wherein oxidation is effected with $H_2O_2$.

* * * * *